United States Patent
Hofele

(10) Patent No.: US 12,386,061 B2
(45) Date of Patent: Aug. 12, 2025

(54) APPARATUS AND METHOD FOR IDENTIFYING OBJECTS IN RADAR SIGNALS

(71) Applicant: HENSOLDT SENSORS GMBH, Taufkirchen (DE)

(72) Inventor: Franz-Xaver Hofele, Donzdorf (DE)

(73) Assignee: HENSOLDT SENSORS GmbH, Taufkirchen (DE)

( * ) Notice: Subject to any disclaimer, the term of this patent is extended or adjusted under 35 U.S.C. 154(b) by 656 days.

(21) Appl. No.: 17/647,860

(22) Filed: Jan. 13, 2022

(65) Prior Publication Data

US 2022/0244376 A1 Aug. 4, 2022

(30) Foreign Application Priority Data

Jan. 13, 2021 (EP) .................... 21151319
Jan. 13, 2021 (EP) .................... 21151334
Jan. 13, 2021 (EP) .................... 21151340
Jan. 13, 2021 (EP) .................... 21151343
Jan. 13, 2021 (EP) .................... 21151350

(51) Int. Cl.
*G01S 13/88* (2006.01)
*G01S 7/41* (2006.01)
(Continued)

(52) U.S. Cl.
CPC .................... *G01S 13/88* (2013.01)

(58) Field of Classification Search
CPC . G01S 13/88; G01S 7/41; G01S 7/415; G01S 7/417; G01S 7/04; G01S 13/50; G06N 20/20
(Continued)

(56) References Cited

U.S. PATENT DOCUMENTS

| 5,376,940 A | 12/1994 | Abatzoglou | |
| 2013/0041856 A1* | 2/2013 | Benitez | G01S 13/867 342/28 |
| 2018/0106889 A1* | 4/2018 | Schuck | G01S 13/886 |

OTHER PUBLICATIONS

A New Algorithm for Automatic Radar Target Classification Using Feature Extraction Having Special Regard to Drones (Year: 2019).*
(Continued)

*Primary Examiner* — Vladimir Magloire
*Assistant Examiner* — Remash R Guyah
(74) *Attorney, Agent, or Firm* — PATENT PORTFOLIO BUILDERS PLLC

(57) ABSTRACT

An apparatus for automatically identifying an object in radar signals based on multiple predefined object-specific tests. The object-specific tests are based on features of spectral data of the radar signals, the spectral data including a spectrum as function of frequencies and a cepstrum as function of quefrencies. The apparatus includes a visualization module that visualizes feature-specific structures in the spectrum by at least one of the following: generating a first modified spectrum by keeping a predefined number of data points with largest amplitude values in the spectrum, while setting all other amplitude values to a default value, defining a threshold based on a statistical upper limit for variations of the spectrum in a range spaced from a maximal value. The apparatus also includes a classification module that identifies the object based on predefined tests testing a presence of multiple features, the testing being performed on a result of visualization module.

5 Claims, 17 Drawing Sheets

(51) Int. Cl.
  *G01S 13/50* (2006.01)
  *G06N 20/20* (2019.01)
(58) Field of Classification Search
  USPC .......................................................... 342/90
  See application file for complete search history.

(56) References Cited

OTHER PUBLICATIONS

Hofele; "A New Algorithm for Automatic Radar Target Classification Using Feature Extraction Having Special Regard to Drones;" The International Radar Symposium IRS 2019; Jun. 26-28, 2019; Ulm, Germany.
Hofele; "Automatic Radar Target Classification A New Method Having Special Regard to Drones;" 2019 International Radar Conference (RADAR2019); Sep. 23-27, 2019; Toulon, France.
Search Report dated Jun. 16, 2021 in related/corresponding EP Application No. 21151319.7.
Search Report dated Jun. 18, 2021 in related/corresponding EP Application No. 21151334.6.
Search Report dated Jun. 18, 2021 in related/corresponding EP Application No. 21151340.3.
Search Report dated Jun. 18, 2021 in related/corresponding EP Application No. 21151343.7.
Search Report dated Jun. 24, 2021 in related/corresponding EP Application No. 21151350.2.

* cited by examiner

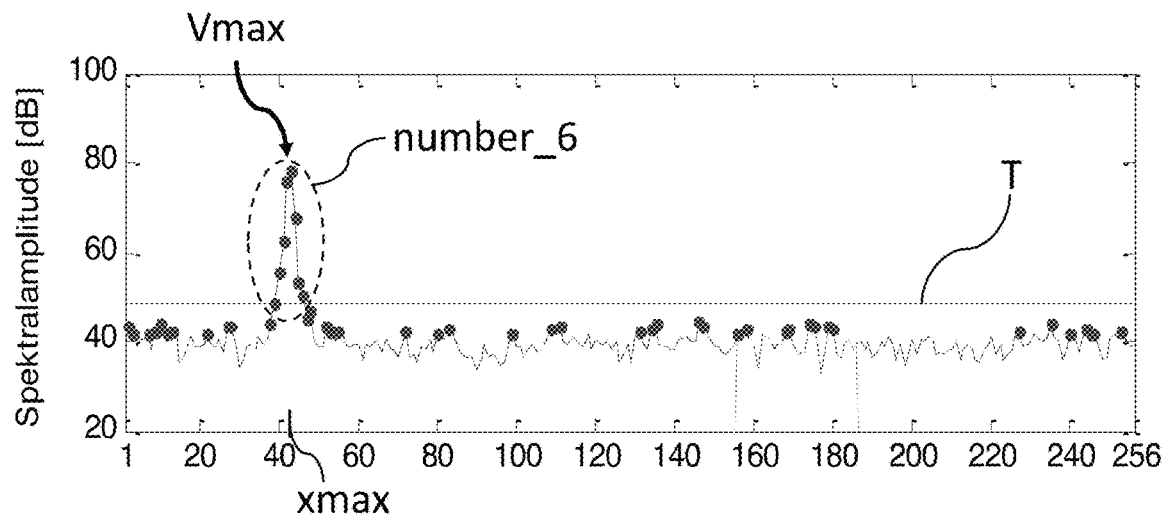
Fig. 5A (bird)
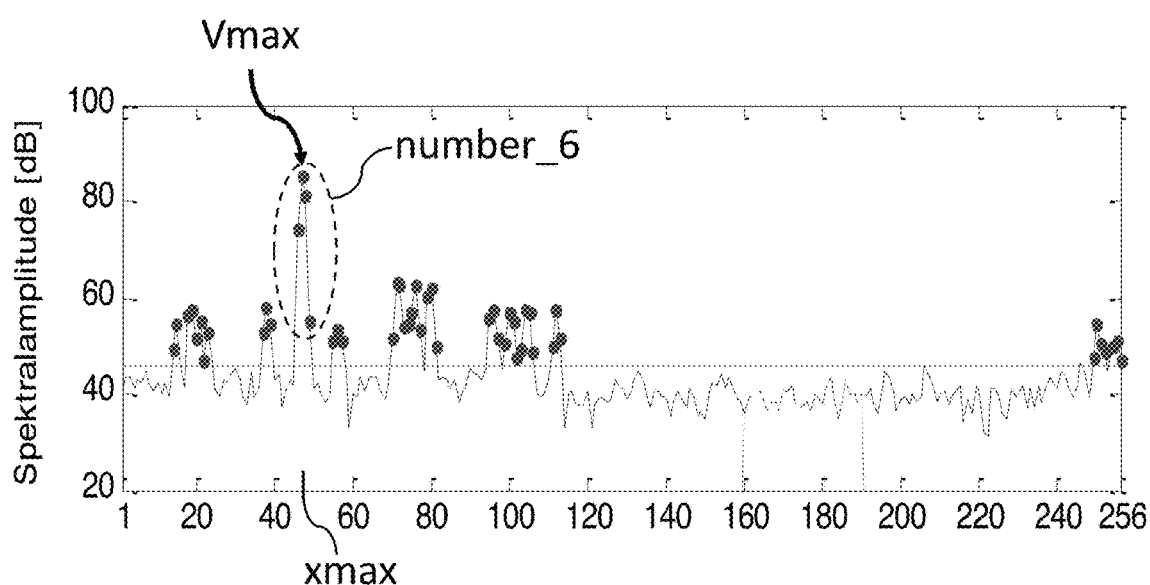
Fig. 5B (drone)

(bird)

(bird)

(bird)

(bird)

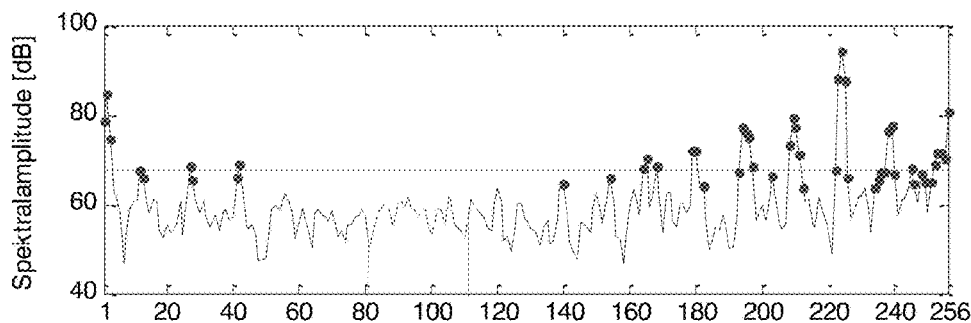
Fig. 7A (drone)
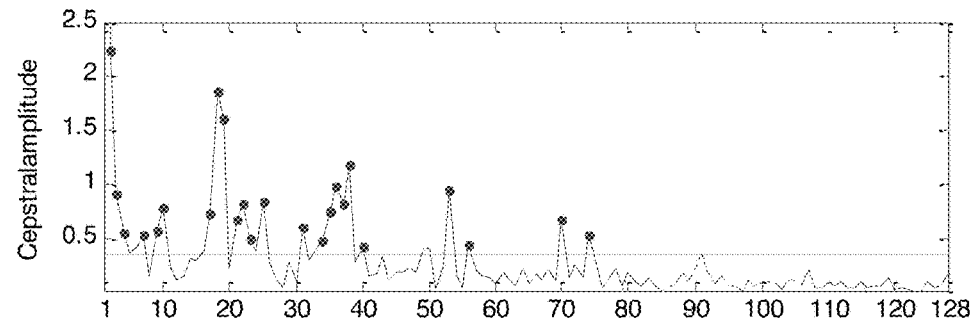
Fig. 7B (drone)
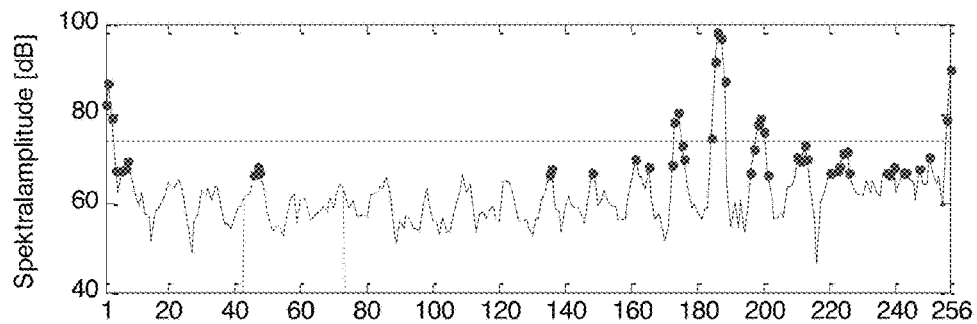
Fig. 7C (drone)
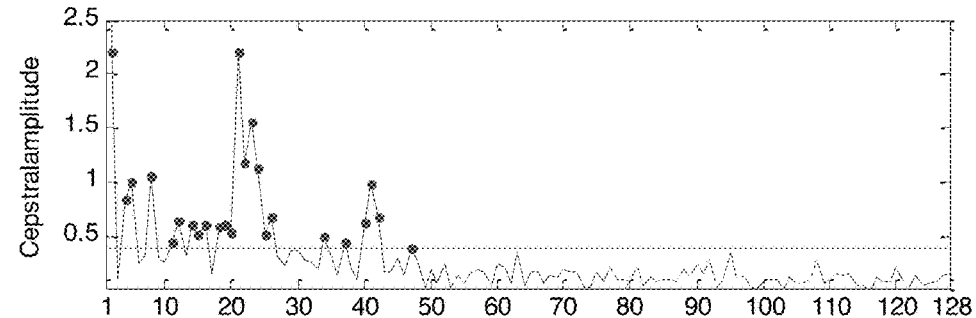
Fig. 7D (drone)

(drone)

(drone)

(pedest.)

(pedest.)

(pedest.)

(pedest.)

(pedest.)

(pedest.)

(vehicle)

(vehicle)

(vehicle)

(vehicle)

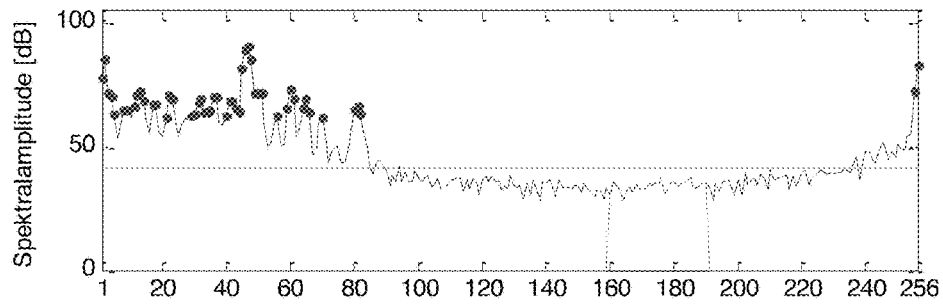
Fig. 9E (vehicle)
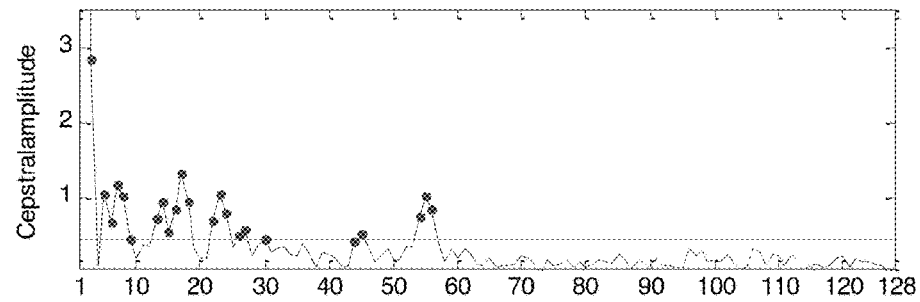
Fig. 9F (vehicle)
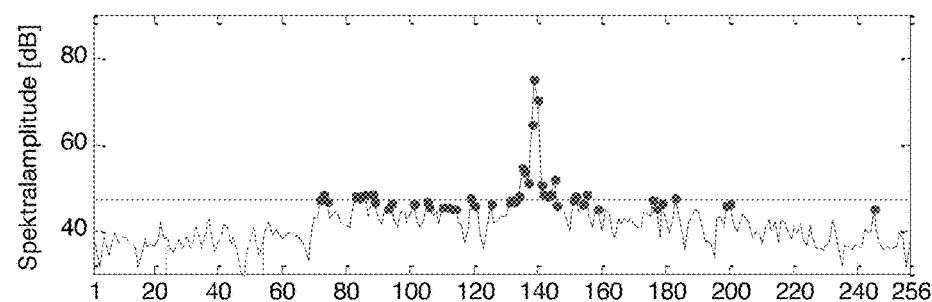
Fig. 10A (helicopt.)
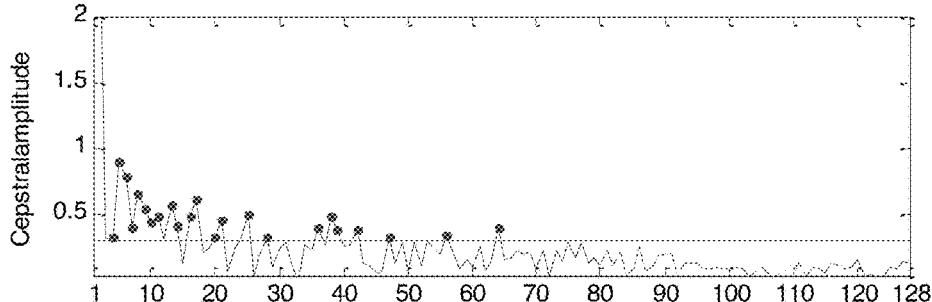
Fig. 10B (helicopt.)

(helicopt.)

(helicopt.)

(helicopt.)

(helicopt.)

APPARATUS AND METHOD FOR IDENTIFYING OBJECTS IN RADAR SIGNALS

CROSS-REFERENCE TO RELATED APPLICATIONS

This application claims priority under 35 U.S.C. § 119 to European Patent Applications EP 21 151 319.7, EP 21 151 334.6, EP 21 151 340.3, EP 21 151 343.7, and EP 21 151 350.2, all of which were filed on Jan. 13, 2021, and all of which are herein expressly incorporated by reference.

FIELD OF THE INVENTION

Exemplary embodiments of the present invention relate to an apparatus and a method for identifying objects in radar signals and, in particular, to a new algorithm for automatic radar target classification using feature extraction having special regard to a helicopter, a bird, a pedestrian, a drone (unmanned aerial vehicles; UAVs) and a vehicle as objects to be identified.

BACKGROUND

Conventional classification algorithms generally use neural informatics in any wise. This means a field of research in the intersection between artificial intelligence and cognitive science, serving catchwords like artificial neural networks, pattern recognition, image understanding, and machine learning.

Completely detached from this conventional approach, one also can converge totally guileless to the problem of "Automatic Radar Target Classification" by ignoring previous knowledge and asking oneself the question how to derive features from the radar receive signal, which are specific for particular target types.

A classification of different radar target types—such as pedestrians, vehicles, drones (UAVs), helicopters and birds—is only possible if these radar targets show special features in the radar receive signal or in therefrom derived physical values. Additionally, these features should preferably be different from the features of other target types. Hence, as a consequence, the radar target classification is always to be considered in the context to the classification of all other potentially occurring target types.

In view of this background, there is a demand to identify and extract features of all potentially occurring target types, especially for helicopters, birds, pedestrians, drones, vehicles, without taking any previous knowledge as a basis.

Classification processes using neural networks or the like are a kind of black box. Applying such techniques, it is never possible to predict exactly, why they do, what they do, why they decide, and how they decide. It is always a little bit unattractive, if things happen and it is not possible to get to the bottom of these things in every detail, why they happen in this way.

Therefore, there is a demand for an algorithm implemented, for example, in an apparatus and which is anything but a "black box". In particular, there is a demand for an apparatus for identifying drones or other objects in radar signals, wherein each decision is comprehended and explained in every detail using features that are unique characteristics of target types and therefrom derived questions are always fitted to specific target types.

SUMMARY OF THE INVENTION

Embodiments relate to an apparatus for an automatic identification of an object in radar signals based on multiple predefined object-specific tests. The object is one or more of the following: a drone, a helicopter, a bird, a pedestrian, and a vehicle. The object-specific tests are based on features of spectral data of the radar signals, the spectral data including a spectrum as function of frequencies and a cepstrum as function of quefrencies. The apparatus comprises a visualization module and a classification module. The visualization module is configured to visualize feature-specific structures in the spectrum by at least one of the following:
- generating a first modified spectrum by keeping a predefined number, number_50, of data points with largest amplitude values in the spectrum, while setting all other amplitude values to a default value (e.g., zero),
- defining a threshold based on a statistical upper limit for variations of the spectrum in a range spaced from a maximal value.

The classification module is configured to identify the object based on predefined tests testing a presence of multiple features, the testing being performed at least in part on a result of visualization module.

According to embodiments the visualization performed by the visualization module can be understood as filter for selecting important features and ignoring other features (e.g., by keeping only specific spectral or cepstral values). Furthermore, it can be understood as a pre-processing to make the object-specific features more apparent by making, e.g., specific transformations. Furthermore, the phrase "based on" may be understood as "that depends on". For example, the threshold depends on the statistical upper limit for variations of the spectrum in a range spaced from a maximal value.

Embodiments further relate to a method for automatically identifying an object in radar signals based on multiple predefined object-specific tests. The object is one or more of the following: a drone, a helicopter, a bird, a pedestrian, and a vehicle, the object-specific tests are based on features of spectral data of the radar signals. The spectral data includes a spectrum as function of frequencies and a cepstrum (cep) as function of quefrencies, the method comprises:
- visualizing, by a visualization module, feature-specific structures in the spectrum by performing at least a generating a first modified spectrum by keeping a predefined number of data points with largest amplitude values in the spectrum, while setting all other amplitude values to a default value (e.g., zero); and
- identifying, by a classification module, the object based on predefined tests testing a presence of at least one feature and being performed on a result of visualization module.

There are many object-specific features, which rely on the spectral data, wherein each object manifests itself by different features. It is understood that the apparatus may combine all object-specific tests that are disclosed in the following to allow an identification not only of a single object type, but different objects.

Therefore, according to further embodiments, object-specific features are tested by the apparatus to identify the specific objects (helicopters, birds, pedestrians, drones, vehicles). The object-specific tests implemented in embodiments can be summarized as follows:

I. Embodiments for the Identification of Helicopters

According to these embodiments, the apparatus is configured for automatic identification of a helicopter in radar signals based on features of spectral data of the radar signals. The spectral data includes a cepstrum as function of quefrencies and a spectrum as function of frequencies, wherein the spectrum includes a power of two samples, and the cepstrum includes another power of two samples.

The visualization module is configured to visualize feature-specific structures by performing one or more of the following:
- generating a first modified cepstrum by keeping a predefined number (e.g., 25 or 20%) of data points with largest amplitude values in the cepstrum, while setting all other amplitude values to a default value (e.g., zero),
- determining how often cepstral values in the first modified cepstrum are greater than the default value between the $55^{th}$ and $60^{th}$ cepstral values and between the $60^{th}$ and $70^{th}$ cepstral values and between the $70^{th}$ and $80^{th}$ cepstral values and adding up resulting values to a sum-value,
- ignoring first three samples and last three samples of the spectrum as ground clutter,
- generating a first modified spectrum by keeping a predefined number (e.g., 50 or 20%) of data points with largest amplitude values in the spectrum (spe), while setting all other amplitude values to a default value,
- determining a maximum of the first modified spectrum at a frequency and building a tesk-function by 161 (or about 63% of) spectral values, whose frequencies are closest to the frequency of the maximum when ordered in a circular buffer.

The $55^{th}$, $60^{th}$, $70^{th}$, $80^{th}$ cepstral value relates to a total number of 128 cepstral values so that for a different total number of cepstral values, these numbers have to be multiplied by the total number of cepstral values divided by 128.

The tesk-function can here and in the following be understood as a file of particular values that are selected from spectral data.

The classification module is configured to identify the helicopter if at least one of the following holds:
- the sum-value is greater than zero,
- a maximum of a first sum and a second sum is at least 24, if the first sum is defined by a sum over the first 80 values of the tesk-function and second sum is defined by a sum over the last 80 values of the tesk-function defining a helicopter-feature-1,
- the maximum of the first sum and the second sum is at least 23,
- a sum of the first sum (li_sum) and the second sum (re_sum) is at least 43 defining a helicopter-feature-2.

The default value can be any value (e.g., zero) that are sufficiently different from all other radar signals or data points to be clearly identifiable. It is understood that the apparatus provides a simple classification whether the detected object is a helicopter or not. As will be described in more detail below, according to further embodiments, other tests can be performed by the apparatus as well. In particular, the apparatus may also be configured to positively identify other objects like drones, vehicle, birds, helicopters and provide a classification of all detected objects. In the following the terms "object" and "target" are interchangeable terms denoting—if not otherwise stated—the same.

The visualization module and/or the classification module may be implemented by software in a data preprocessing unit. In addition, the apparatus may be configured for pattern recognition and may have access to a database, storage media, or other peripheral devices to implement any kind of exchange of data.

Data points may be spectral values of the spectrum as function of frequencies. Similarly, further embodiments may use a cepstrum derived from the spectrum, wherein data points of the cepstrum are spectral/cepstral values (in general functional values) as function of quefrencies.

Here and in the following the range for determining thresholds may relate to a portion of the spectrum that is not taken in account for the forming of the first/second modified spectrum. Furthermore, when also considering the cepstrum, another threshold for the cepstrum can be formed in the similar/same way as for the spectrum, but now relying on the cepstral values.

The predefined number of data points may be 20% of a total number and the power of 2 may be 5, 6, 7, 8, 9, . . . resulting in 32, 64, 128, 256, 512, . . . samples, but shall not be limited to these values. Most of the following description will assume 256 samples in the spectrum and 128 values in the cepstrum. However, further embodiments assume other values. If other values are considered, the parameters used in the tests also have to adjusted accordingly. For example, the ratio of a new value to the total number of samples is the same as for the case with 256 samples for the spectrum and 128 samples for the cepstrum mentioned explicitly in the description.

In the following, abscissa values refer to frequencies or possibly normalized frequency, where the sampled frequencies in the underlying radar frequency band are numbered from the first to last sampled frequency (being a power of two). It is understood that the used frequencies are not limited to particular frequency bands, any radar frequency band can be employed in embodiments. It is further understood that the tests may include a comparison with thresholds (e.g., predetermined) or with other data sets to confirm that object-specific features are fulfilled and a particular target is identified. The term "file" will be used in the following to encompass any kind of data set or a field build by functional values associated with particular abscissa values (e.g., frequencies, quefrencies).

Optionally, the classification module is configured to identify the helicopter if a helicopter-feature-5 is fulfilled which is defined in that at least one of the following is true:
- a first value is at most 8,
- a second value is at least 15,
- a third value is at least 13, wherein the first value is defined as vdfanzwerte=$\Sigma_{i=p_o}^{100}$ vdfn(i), wherein vdfn is a function defined as a distribution density function of the tesk-function and $p_0$ is the first zero of the function vdfn. The second value is defined by counting how many consecutive values of the tesk-function are uninterrupted at a maximum length greater than zero. The third value is defined by counting how many values of the tesk-function around the maximum are continuously greater than zero.

Optionally, the classification module is further configured to identify the helicopter if a helicopter-feature-6 is fulfilled which is defined in that at least one of the following is true:
- a fourth value is at least 10,
- a fifth value is at least 20,
  wherein the fourth value is a maximum value of the distribution density function of the tesk-function, and wherein the fifth value is defined by counting how many consecutive values of the tesk-function are uninterrupted at a maximum length equal to zero.

Optionally, the classification module is further configured to identify the helicopter if a helicopter-feature-7 is fulfilled which is defined by: a minimum of the first 4% of cepstral values (e.g., 5) of the cepstrum is smaller than 1.

Optionally, the visualization module is further configured to visualize feature-specific structures by: defining a threshold based on a statistical upper limit for variations of the spectrum in a range spaced from a maximal value. The classification module may further be configured to identify the helicopter based on at least one of the following:

a number_1 of data points of the spectrum that are all smaller than the threshold, a number_2 of data points of the first modified spectrum that are smaller than the threshold, a number_3 of data points of the spectrum that are smaller than the threshold, but larger than a value defined by the threshold minus 17, a number_6 of data points around a maximum in the first modified spectrum that are all greater or equal to the threshold or all greater than the default value, a number_7 of data points in the first modified spectrum counted from a first value upwards and from a last value downwards and which, without interruption, are all greater or equal to the threshold or all greater than the default value, a number_12 defining a number of spectral values of the first modified spectrum that are greater than the threshold in a range that is outside the first 16% and the last 16% of values in the first modified spectrum, a number_16 defining a standard deviation of data points of the spectrum while omitting the first three and last three data points and omitting data points that, starting from maximal value, are larger than the threshold in an uninterrupted order.

The classification module may be further configured to identify the helicopter if:

the number_12 is greater than 12 and the number_7 is equal to zero defining a helicopter-feature-1a, the number_16 is at least 2.6 and the number_16 is at most 4.1 defining a helicopter-feature-2a, the number_7 is equal to zero defining a helicopter-feature-3a, the number_6 is at least 3 and the number_6 is at most 8 defining a helicopter-feature-4a, the number 1 is at least number 2 and number 2 is at least number 3 and number_1 is at least 221 defining a helicopter-feature-5a.

Optionally, the classification module is configured to identify further objects in the radar signals based on multiple predefined object-specific tests, the further objects include: drones, pedestrian, vehicles, bird.

Further embodiments relate to a method for automatic identification of a helicopter in radar signals based on features of spectral data of the radar signals, the spectral data including a cepstrum as function of quefrencies and a spectrum as function of frequencies, the spectrum including a power of two samples (e.g., 64, 128, 256, 512, . . . ), and the cepstrum includes a power of two samples (e.g., 32, 64, 128, 256, 512, . . . ). The method comprising a step of visualizing, by a visualization module, of feature-specific structures in the spectrum by performing one or more of the following steps:

generating a first modified cepstrum by keeping a predefined number (e.g., 25 or 20%) of data points with largest amplitude values in the cepstrum, while setting all other amplitude values to a default value, determining how often cepstral values in the first modified cepstrum are greater than zero between the 55$^{th}$ and 60$^{th}$ cepstral values and between the 60$^{th}$ and 70$^{th}$ cepstral values and between the 70$^{th}$ and 80$^{th}$ cepstral values and adding up resulting values to a sum-value, ignoring first three samples and last three samples of the spectrum as ground clutter, generating a first modified spectrum by keeping a predefined number (e.g., 50 or 20%) of data points with largest amplitude values in the spectrum, while setting all other amplitude values to a default value (zero), determining a maximum of the first modified spectrum at a frequency and building a tesk-function by 161 spectral values (or about 63% of all values), whose frequencies are closest to the frequency of the maximum when ordered in a circular buffer.

The 55$^{th}$, 60$^{th}$, 70$^{th}$, 80$^{th}$ cepstral value relates to a total number of 128 cepstral values so that for a different total number of cepstral values, these numbers have to be multiplied by the total number of cepstral values divided by 128. The method further includes the step of identifying, by a classification module, the helicopter if at least one of the following is true:

the sum-value is greater than zero, a maximum of a first sum and a second sum is at least 24, if the first sum is defined by a sum over the first 80 values of the tesk-function and second sum is defined by a sum over the last 80 values of the tesk-function defining a helicopter-feature-1, the maximum of the first sum and the second sum is at least 23, a sum of the first sum and the second sum is at least 43 defining a helicopter-feature-2.

It is understood that the order of steps may be different as long as the desired effect is achievable. Furthermore, any function described in conjunction with the apparatus may be implemented by further optional method steps. In addition, this method may also be implemented in software on a computer program product. Therefore, embodiments also relate to a computer program having a program code for performing the method, when the computer program is executed on a processor.

II. Embodiments for the Identification of Birds

According to these embodiments, the apparatus is configured for an automatic identification of a bird in radar signals based on features of spectral data of the radar signals. The spectral data includes a spectrum as function of frequencies.

The visualization module is configured to visualize feature-specific structures in the spectrum by performing one or more of the following:

generating a first modified spectrum by keeping a predefined number of data points with largest amplitude values in the spectrum, while setting all other amplitude values to a default value, generating a second modified spectrum by repeated averaging of consecutive amplitude values in the first modified spectrum, defining a threshold based on a statistical upper limit for variations of the spectrum in a range spaced from a maximal value.

The classification module is configured to identify the bird based on predefined tests testing a presence of at least one feature and being performed on a result of visualization module. The predefined tests are based on at least one of the following values:

a number_6 of data points around a maximum in the first modified spectrum that are all greater or equal to the threshold or all greater than the default value, a number_7 of data points at least one spectral edge in the first modified spectrum that are all greater or equal to the threshold or all greater than the default value further, a number_15 given by a sum of differences, wherein, when the spectrum is split into multiple blocks, each difference is a difference between a maximum and a minimum of amplitude values within a respective block, a number_5 of crossings of the threshold in the spectrum, a number_16 based on a standard deviation of data points of the spectrum while omitting data points that starting from maximal value are larger than the threshold in an uninterrupted order;

entries at one or more predetermined positions in an ordered statistic, wherein the data points of the spectrum are ordered in size.

The default value can be any value (e.g., zero) that are sufficiently different from all other radar signals or data points to be clearly identifiable. It is understood that the apparatus provides a simple classification whether the detected object is a bird or not. As will be described in more detail below, according to further embodiments, other tests can be performed by the apparatus as well. In particular, the apparatus may also be configured to positively identify other objects like drones, vehicle, pedestrians, helicopters and provide a classification of all detected objects. In the following the terms "object" and "target" are interchangeable terms denoting—if not otherwise stated—the same.

The visualization module and/or the classification module may be implemented by software in a data preprocessing unit. In addition, the apparatus may be configured for pattern recognition and may have access to a database, storage media or other peripheral devices to implement any kind of exchange of data.

Data points may be spectral values of the spectrum as function of frequencies. Similarly, further embodiments may use a cepstrum derived from the spectrum, wherein data points of the cepstrum are spectral/cepstral values (in general functional values) as function of quefrencies.

Here and in the following the range for determining thresholds may relate to a portion of the spectrum that is not taken in account for the forming of the first/second modified spectrum. Furthermore, when considering also the cepstrum, another threshold for the cepstrum can be formed in the similar/same way as for the spectrum, but now relying on the cepstral values.

The predefined number of data points may be 20% of a total number and the power of 2 may be 5, 6, 7, 8, 9, . . . resulting in 32, 64, 128, 256, 512, . . . samples, but shall not be limited to these values. Most of the following description will assume 256 samples in the spectrum and 128 values in the cepstrum. However, further embodiments assume other values. If other values are considered, also the parameters used in the tests have to adjusted accordingly. For example, the ratio of a new value to the total number of samples is the same as for the case with 256 samples for the spectrum and 128 samples for the cepstrum mentioned explicitly in the description.

In the following, abscissa values refer to frequencies or possibly normalized frequency, where the sampled frequencies in the underlying radar frequency band are numbered from the first to last sampled frequency (being a power of two). It is understood that the used frequencies are not limited to particular frequency bands, any radar frequency band can be employed in embodiments. It is further understood that the tests may include a comparison with thresholds (e.g., predetermined) or with other data sets to confirm that object-specific features are fulfilled and a particular target is identified. The term "file" will be used in the following to encompass any kind of data set or a field build by functional values associated with particular abscissa values (e.g., frequencies, quefrencies).

Optionally, the spectral data includes further a cepstrum as function of quefrencies. The visualization module may then be configured:

to visualize feature-specific structures in the cepstrum by generating a first modified cepstrum by keeping a predefined number of data points with largest amplitude values in the cepstrum, while setting all other amplitude values to a default value, and to define the threshold by: $T=\mu+3.5*\sigma$, with $\mu$ as mean value and $\sigma$ as standard deviation of spectral values in the range yielding a spectral threshold or of cepstral values in a cepstral range yielding a cepstral threshold.

The cepstral range may be defined by the cepstral values from 80 to 115, and the spectral range may be defined by spectral values from S−15 to S+15, for S=M+x, M=xmax being a frequency of the maximal value and x=128 for M<90, x=−128 for M>170, x=100 for 90≤M≤128, and x=−100 for 128≤M≤170, when the spectrum comprises 256 samples.

Optionally, the classification module is further configured to identify the bird if:

the number_6 is at least 4 and a z-value is at most 1, wherein the z-value is minimum of a z1-value and a z2-value, wherein the z1-value indicates how many of a first set of pedestrian features are met and the z2-value indicates how many of a second set of pedestrian features are met.

The first set of pedestrian features includes the following:

in a region between the $35^{th}$ and the $221^{st}$ quefrency are no values of the first modified spectrum, which are greater than the spectral threshold plus a value of 0.5 dB defining a pedestrian-feature-4, all values in the first modified cepstrum are greater than default value in a region including at least the first 10 cepstral values defining a pedestrian-feature-5, all values in first modified cepstrum besides the first 20 cepstral values are lower than the cepstral threshold plus a valued of 0.5 dB defining a pedestrian-feature-6.

The second set of pedestrian features includes the following:

a maximal spectral value in the spectrum is in a region from the $4^{th}$ to $15^{th}$ frequency or from the $243^{rd}$ to $253^{rd}$ frequency in the spectrum, when given by 256 samples defining a pedestrian-feature-1, a sum of a first count value and a second count value is at least 20 and the previous pedestrian-feature-1 is met, wherein the first count value counts values in first modified spectrum, which are greater than the default value, counting up from a lowest frequency, and wherein the second count value counts values in first modified spectrum, which are greater than the default value, counting down from a highest frequency defining a pedestrian-feature-2, an averaging over three successive values in the first modified cepstrum results a cepstrum which, when starting from a lowest quefrency, includes at least seven drops, where a successor is smaller than a predecessor defining a pedestrian-feature-7.

Optionally, the classification module is further configured to identify the bird if at least one of the following feature is satisfied:

the number_16 is at least 2.2 and at most 4.1 defining a bird-feature-1a, the number_15 is at least 63 and at most 95 defining a bird-feature-2a, the number_15 is at least 63 and at most 79 defining a bird-feature-3a, a number_4 is at least 1 and at most 9, wherein the number_4 is the number of spectral values in the range used to define the threshold (T) defining a bird-feature-4a, the number_5 is at least zero and at most 6 defining a bird-feature-5a, an entry at position 30, e.g., of the ordered statistic is greater than 2.7 and less than 3.8 defining a bird-feature-9a, an entry at position 50, e.g., of the ordered statistic is greater than 1.8 and less than 2.5 defining a bird-feature-10a.

Optionally, the classification module is further configured to identify the bird, according to bird-features 17a, 18a, 22a, and 23a, if at least one of the following drone-features is not satisfied:

the number_5 is at least 10 or the number_15 is at least 110 defining a drone-feature-2a, the number_16 is at least 4.2 or it holds: number_15 is at least 80 and number_7 is at most 3 defining a drone-feature-8a, the number_6 is at least 3 and at most 6 defining a drone-feature 3a, or number_15 is smaller than 84 defining a drone-feature-7a, a number_11 is at most 4 or the number_16 is at least 5.5, the number_11 counting data points at both spectral edges in the first modified spectrum that are all greater than the default value defining a drone-feature 5a, or an entry at position 30, e.g., of the ordered statistic is greater than 4.4 and less than 11.4 defining a drone-feature-10a.

Optionally, the spectral data further including a cepstrum as function of quefrencies, the classification module being further configured to identify the bird, according to bird-feature-20a, if at least one of the following drone-feature is satisfied:

the entry, e.g., at position 50 of the ordered statistic is greater than 2.0 and less than 7.1 defining a drone-feature-9a, it holds: an entry, e.g., at position 30 in an ordered cepstral statistic is at least 0.5 and at most 0.67, and it holds: an entry, e.g., at position 50 in an ordered cepstral statistic is at least 0.34 and at most 0.49, wherein the ordered cepstral statistic includes data points of the cepstrum ordered in size defining a drone-feature-13a.

Optionally, the classification module is configured to identify further objects in the radar signals based on multiple predefined object-specific tests, the further objects include: drones, pedestrian, vehicles, helicopters.

Further embodiments relate to a method for automatic identification of a bird in radar signals based on features of spectral data of the radar signals, the spectral data including a spectrum as function of frequencies. The method comprises a step of visualizing, by a visualization module, of feature-specific structures in the spectrum by performing one or more of the following steps:

generating a first modified spectrum by keeping a predefined number of data points with largest amplitude values in the spectrum, while setting all other amplitude values to a default value (e.g., zero), generating a second modified spectrum by repeated averaging of consecutive amplitude values in the first modified spectrum, defining a threshold based on a statistical upper limit for variations of the spectrum in a range spaced from a maximal value; and The method further includes the step of identifying, by a classification module, the bird based on predefined tests testing a presence of at least one feature and being performed on a result of visualization module. The predefined tests use at least one of the following values:

a number_6 of data points around a maximum in the first modified spectrum that are all greater or equal to the threshold or all greater than the default value defining a test-5, a number_7 of data points at least one spectral edge in the first modified spectrum that are all greater or equal to the threshold or all greater than the default value further defining the test-5, a number_15 given by a sum of differences, wherein, when the spectrum is split into multiple blocks, each difference is a difference between a maximum and a minimum of amplitude values within a respective block defining a test-15, a number_5 of crossings of the threshold in the spectrum defining a test-6, a number_16 based on a standard deviation of data points of the spectrum while omitting data points that starting from maximal value are larger than the threshold in an uninterrupted order defining a test-16;

entries at one or more predetermined position(s) in an ordered statistic, wherein the data points of the spectrum are ordered in size defining a test-17.

It is understood that the order of steps may be different as long as the desired effect is achievable. Furthermore, any function described in conjunction with the apparatus may be implemented by further optional method steps. In addition, this method may also be implemented in software on a computer program product. Therefore, embodiment relate also to a computer program having a program code for performing the method, when the computer program is executed on a processor.

III. Embodiments for the Identification of Pedestrians

According to these embodiments, the apparatus is configured for an automatic identification of a pedestrian in radar signals based on features of spectral data of the radar signals. The spectral data includes a spectrum as function of frequencies, wherein the spectrum includes a power of 2 samples.

The visualization module is configured to visualize feature-specific structures in the spectrum by performing one or more of the following:

assigning first three samples and last three samples of the spectrum as ground clutter, generating a first modified spectrum by keeping a predefined number of data points with largest amplitude values in the spectrum, while setting all other amplitude values to a default value, defining a threshold based on a statistical upper limit for variations of the spectrum in a range spaced from a maximal value.

The classification module is configured to identify the pedestrian if a pedestrian-feature-1 is fulfilled which is defined by:

a maximal value in the spectrum is located in a range that is not assigned to the ground clutter and includes the first 5% and the last 5% of spectral values.

The default value can be any value (e.g., zero) that are sufficiently different from all other radar signals or data points to be clearly identifiable. It is understood that the apparatus provides a simple classification whether the detected object is a pedestrian or not. As will be described in more detail below, according to further embodiments, other tests can be performed by the apparatus as well. In particular, the apparatus may also be configured to positively identify other objects like drones, vehicle, birds, helicopters and provide a classification of all detected objects. In the following the terms "object" and "target" are interchangeable terms denoting—if not otherwise stated—the same.

The visualization module and/or the classification module may be implemented by software in a data preprocessing unit. In addition, the apparatus may be configured for pattern recognition and may have access to a database, storage media or other peripheral devices to implement any kind of exchange of data.

Data points may be spectral values of the spectrum as function of frequencies. Similarly, further embodiments may use a cepstrum derived from the spectrum, wherein data points of the cepstrum are spectral/cepstral values (in general functional values) as function of quefrencies.

Here and in the following the range for determining thresholds may relate to a portion of the spectrum that is not taken in account for the forming of the first/second modified spectrum. Furthermore, when considering also the cepstrum, another threshold for the cepstrum can be formed in the similar/same way as for the spectrum, but now relying on the cepstral values.

The predefined number of data points may be 20% of a total number and the power of 2 may be 5, 6, 7, 8, 9, . . . resulting in 32, 64, 128, 256, 512, . . . samples, but shall not be limited to these values. Most of the following description will assume 256 samples in the spectrum and 128 values in the cepstrum. However, further embodiments assume other values. If other values are considered, also the parameters used in the tests have to adjusted accordingly. For example, the ratio of a new value to the total number of samples is the same as for the case with 256 samples for the spectrum and 128 samples for the cepstrum mentioned explicitly in the description.

In the following, abscissa values refer to frequencies or possibly normalized frequency, where the sampled frequencies in the underlying radar frequency band are numbered from the first to last sampled frequency (being a power of two). It is understood that the used frequencies are not limited to particular frequency bands, any radar frequency band can be employed in embodiments. It is further understood that the tests may include a comparison with thresholds (e.g., predetermined) or with other data sets to confirm that object-specific features are fulfilled and a particular target is identified. The term "file" will be used in the following to encompass any kind of data set or a field build by functional values associated with particular abscissa values (e.g., frequencies, quefrencies).

Optionally, the visualization module is further configured to visualize feature-specific structures in the spectrum by:
counting values in a first modified spectrum (spe1) that are greater than zero from 1 upwards,
aborting the count if more than 5 zeros (or about 2% of the number of samples) occur consecutively,
repeating the counting and aborting by starting from a last value in the first modified spectrum downwards,
wherein the classification module is further configured to identify the pedestrian if a pedestrian-feature-2 is fulfilled which is defined by a sum of both counts is at least 20 (or about 8% of the number of samples).

Optionally, the classification module is further configured to identify the vehicle if a pedestrian-feature-3 is fulfilled which is defined by: there are no 5 consecutive values (or about 2% of the number of samples) greater than zero in a range that is not assigned to the ground clutter and is outside the first 16% and the last 16% values in the first modified spectrum.

Optionally, the classification module is further configured to identify the pedestrian if a pedestrian-feature-4 is fulfilled which is defined by: there is no value greater than the threshold plus a value of 0.5 dB and in a range that not assigned to the ground clutter and is outside the first 13% and the last 13% of values in the first modified spectrum.

Optionally, the spectral data further includes a cepstrum as function of quefrencies and the visualization module may further be configured to visualize feature-specific structures in the cepstrum by performing: generating a first modified cepstrum by keeping a predefined number (e.g. about 20% of the number) of data points with largest amplitude values in the cepstrum, while setting all other amplitude values to a default value (e.g., zero). The classification module may further be configured to identify the pedestrian if a pedestrian-feature-5 is fulfilled which is defined by: at least the first 10 cepstral values (or first 10%) of the first modified cepstrum ascending from value 1 onwards are greater than zero.

Optionally, the spectral data further including a cepstrum as function of quefrencies. The visualization module may further be configured to visualize feature-specific structures in the cepstrum by performing:
generating a first modified cepstrum by keeping a predefined number (e.g., about 20%) of data points with largest amplitude values in the cepstrum, while setting all other amplitude values to a default value (e.g. zero),
defining a cepstral threshold based on a statistical upper limit for variations of the cepstrum in a range spaced from a maximal value of the cepstrum.

The classification module may further be configured to identify the pedestrian if a pedestrian-feature-6 is fulfilled which is defined by: there is no value, in the first modified cepstrum, greater than the cepstral threshold plus a value of 0.5 dB in a cepstral range starting with the $20^{th}$ value (or the first value after skipping the first 15% of values) in the first modified cepstrum.

Optionally, further features are based on at least one of the following:
a number_16 defining a standard deviation of data points of the spectrum while omitting data points that starting from maximal value are larger than the threshold in an uninterrupted order,
a number_15 given by a sum of differences, wherein, when the spectrum is split into multiple blocks, each difference is a difference between a maximum and a minimum of amplitude values within a respective block,
a number_12 given by a number of spectral values of the first modified spectrum that are greater than the threshold in a range that is outside the first 16% and the last 16% values in the first modified spectrum,
a number_10 being 100, if a sum of the values in a block 1 is the largest sum otherwise number_10 is zero, wherein 8 sums of spectral values for 8 blocks are formed, each block including 32 spectral values of the spectrum, the block 1 includes 32 spectral values 1 to 16 and 241 to 256 and blocks 2 to 8 include each successive 32 spectral values starting with spectral value 17 (the number "8" may be replaced by "1/32" if the total number of values is not 256).

Then, the classification module may further be configured to identify the pedestrian if at least one of the following features is satisfied:
- the number_16 is at least 2.3 and number_16 is at most 4.3 and at least two further pedestrian features are met (defines a pedestrian-feature-1a),
- the number_15 is at least 63.6 and number_15 is at most 86.4 and at least two further pedestrian features are met (defines a pedestrian-feature-2a),
- the number_12 is zero (defines a pedestrian-feature-3a),
- the number_10 is 100 or number_12 is zero (defines a pedestrian-feature-4a),
- the number_4 is at most 3, or if number_10 is 100 and number_12 is zero (defines a pedestrian-feature-5a).

Optionally, the classification module is configured to identify further objects in the radar signals based on multiple predefined object-specific tests, the further objects include: drones, bird, vehicles, helicopters.

Embodiments relate also to a method for automatic identification of a pedestrian in radar signals based on features of spectral data of the radar signals, the spectral data including a spectrum as function of frequencies, the spectrum including a power of two samples. The method comprising:
- visualizing, by a visualization module, of feature-specific structures in the spectrum by performing one or more of the following steps:
- assigning first three samples and last three samples of the spectrum as ground clutter,
- generating a first modified spectrum by keeping a predefined number of data points with largest amplitude values in the spectrum, while setting all other amplitude values to a default value,
- defining a threshold based on a statistical upper limit for variations of the spectrum in a range spaced from a maximal value; and
- identifying, by a classification module, the pedestrian if a pedestrian-feature-1 is fulfilled which is defined by:
- a maximal value in the spectrum is located in a range that is not assigned to the ground clutter and includes the first 5% and the last 5% of spectral values.

It is understood that the order of steps may be different as long as the desired effect is achievable. Furthermore, any function described in conjunction with the apparatus may be implemented by further optional method steps. In addition, this method may also be implemented in software on a computer program product. Therefore, embodiment relate also to a computer program having a program code for performing the method, when the computer program is executed on a processor.

IV. Embodiments for the Identification of Drones

According to these embodiments, the apparatus is configured for an automatic identification of a drone in radar signals based on features of spectral data of the radar signals. The spectral data may include a spectrum as function of frequencies. The visualization module is configured to visualize feature-specific structures in the spectrum by performing one or more of the following:
- generating a first modified spectrum by keeping a predefined number of data points with largest amplitude values in the spectrum, while setting all other amplitude values to a default value,
- generating a second modified spectrum by repeated averaging of consecutive amplitude values in the first modified spectrum,
- defining a threshold based on a statistical upper limit for variations of the spectrum in a range spaced from a maximal value.

The classification module is configured to identify the drone based on predefined tests testing a presence of at least one feature and being performed on a result of visualization module. The predefined tests are based on at least one of the following values:
- a number_6 of data points around a maximum in the first modified spectrum that are all greater or equal to the threshold or the default value,
- a number_15 given by a sum of differences, wherein, when the spectrum is split into multiple blocks, each difference is a difference between a maximum and a minimum of amplitude values within a respective block,
- a number_5 of crossings of the threshold in the spectrum,
- a number_16 based on a standard deviation of data points of the spectrum while omitting data points that starting from maximal value are larger than the threshold in an uninterrupted order,
- entries at one or more predetermined position(s) in an ordered statistic, wherein the data points of the spectrum are ordered in size,
- at least one difference of distances from high points in the second modified spectrum to its maximal value.

The default value can be any value (e.g., zero) that are sufficiently different from all other radar signals or data points to be clearly identifiable. It is understood that the apparatus provides a simple classification whether the detected object is a drone or not. As will be described in more detail below, according to further embodiments, other tests can be performed by the apparatus as well. In particular, the apparatus may also be configured to positively identify other objects like pedestrian, vehicle, birds, helicopters and provide a classification of all detected objects. In the following the terms "object" and "target" are interchangeable terms denoting—if not otherwise stated—the same.

The visualization module and/or the classification module may be implemented by software in a data preprocessing unit. In addition, the apparatus may be configured for pattern recognition and may have access to a database, storage media or other peripheral devices to implement any kind of exchange of data.

Data points may be spectral values of the spectrum as function of frequencies. Similarly, further embodiments may use a cepstrum derived from the spectrum, wherein data points of the cepstrum are spectral/cepstral values (in general functional values) as function of quefrencies. The range for determining the threshold may relate to a portion of the spectrum that is not taken in account for the forming of the first/second modified spectrum. Furthermore, when considering also the cepstrum, another threshold for the cepstrum can be formed in the similar/same way as for the spectrum, but now relying on the cepstral values.

The predefined number of data points may be 20% of a total number and the power of 2 may be 5, 6, 7, 8, 9, . . . resulting in 32, 64, 128, 256, 512, . . . samples, but shall not be limited to these values. Most of the following description will assume 256 samples in the spectrum and 128 values in the cepstrum. However, further embodiments assume other values. If other values are considered, also the parameters used in the tests have to adjusted accordingly. For example, the ratio of a new value to the total number of samples is the same as for the case with 256 samples for the spectrum and 128 samples for the cepstrum mentioned explicitly in the description.

In the following, abscissa values refer to frequencies or possibly normalized frequency, where the sampled frequencies in the underlying radar frequency band are numbered from the first to last sampled frequency (being a power of two). It is understood that the used frequencies are not limited to particular frequency bands, any radar frequency band can be employed in embodiments. It is further understood that the tests may include a comparison with thresholds (e.g., predetermined) or with other data sets to confirm that object-specific features are fulfilled and a particular target is identified. The term "file" will be used in the following to encompass any kind of data set or a field build by functional values associated with particular abscissa values (e.g., frequencies, quefrencies).

Optionally, the visualization module is further configured to form a file, ux, of data points by:
  selecting all spectral values in a region of frequencies around a maximum-frequency for the maximal spectral value of the second modified spectrum, and
  setting all spectral value to the default value which are lower than a fraction of the maximal spectral value of the second modified spectrum.

The file ux may thus include the values obtained by this selecting and setting procedure.

The classification module may then be configured to perform a distance test defined by:
  testing whether the file ux includes at least one pair of associated high points between which the maximal spectral value is located and which have a same distance up to a tolerance of +/−2 abscissa values, and, if so,
  determining for each pair: a difference in frequency distances of the associated high points to the maximum frequency, and a difference in spectral values, and
  identifying the drone: if the determined difference in the frequency distances is at most 2, and if the determined difference in the spectral values is at most 20.

Optionally, the visualization module is configured to form the file by considering only spectral values of the second modified spectrum which are at least four frequency values away from a lowest and a highest frequency so that global maxima at boundaries of the spectrum are disregarded from the distance test.

Optionally, the classification module is further configured to identify the drone if at least one of the following drone-features is satisfied:
  a number_4 is at most 5, wherein the number_4 is the number of spectral values in the range used to identify the threshold,
  the number_5 is at least 10,
  the number_15 is more than 110 or more than 120,
  the number_6 is at least 3 and at most 6,
  a number_7 is at most 3 or the number_16 is at least 5.5, wherein number_7 counts data points in the first modified spectrum that, starting from a first value upwards and from a last value downwards, are without interruption greater than the default value (e.g. zero),
  the number_15 is greater than 100 or number_7 is at most 3,
  the number_15 is greater than 84,
  the number_16 is greater than 4.2 or it hold: number_15 is at least 80 and number_7 is at most 3.

Optionally, the visualization module is further configured to form a file, ux, of data points by:
  selecting all spectral values in a region of frequencies around a maximum-frequency for the maximal spectral value of the second modified spectrum, and
  setting all spectral value to the default value which are lower than a fraction of the maximal spectral value of the second modified spectrum.

The classification module may then be configured to identify the drone if the following symmetry test is satisfied:
  a count value is at least 25, wherein the count value is defined as a number of pairs of data points in the file that have a same distance to the maximal spectral value and are at the same time greater than the default value or equal to the default value, and
  a number of high points in the file is at least 3 or a number of changes is at least 6, wherein the number of changes counts how often a value in the file changes from a value greater than the default value to the default value and vice versa.

Optionally, the spectral data further include a cepstrum as function of quefrencies and the visualization module may then be configured to visualize feature-specific structures in the cepstrum by generating a first modified cepstrum by keeping a predefined number of data points with largest amplitude values in the cepstrum, while setting all other amplitude values to a default value. The classification module may then be configured to identify the drone if one or more of pedestrian features are not fulfilled, wherein the pedestrian features include at least the following:
  a maximal spectral value in the spectrum is in a region of the smallest or greatest 15 (or 10 or 20) frequencies in the spectrum,
  all values in the first modified cepstrum are greater than the default value (e.g. zero) in a region including at least the first 10 quefrencies,
  all values in first modified cepstrum, besides the first 20 quefrencies, are lower than the threshold plus 0.5 dB,
  in a region including quefrencies larger than the first three quefrencies, at most one value in the cepstrum is greater than a CFAR-threshold defined by:

$$CFAR - \text{threshold}(i) = \sum_{k=i-4}^{i+4} \frac{cep(k)}{9} + 0,3.$$

Optionally, the classification module is configured to identify a drone if the following condition is fulfilled: a count number is at most 4, wherein the count number defines a number of frequencies in the first modified spectrum on each side of the maximum frequency that have a value higher than an average of the threshold value and the maximal spectral value.

Optionally, the classification module is configured to identify the drone if the following condition is fulfilled: when considering the first modified spectrum, at latest a third spectral value in one or both directions from the maximal spectral value has the default value (e.g., zero).

Optionally, the classification module is configured to identify the drone if the following conditions are satisfied for the second modified spectrum: a maximum of sums is at least 4, wherein the sums include all sums of three successive values in a distribution density function, DDF, of distances of high points, and a number of high points is at least 10.

Optionally, if the spectral data further includes a cepstrum as function of quefrencies, the classification module may be configured to identify a drone if the following condition is satisfied: a standard deviation is at least 0.175, where the standard deviation is calculated for quefrencies in the cepstrum while omitting the first 11% and last 68% of quefrencies.

Optionally, the classification module is configured to identify the drone (or another object) based on at least 20 tests, wherein the 20 tests are specific for the drone or the other objects.

Optionally, the classification module is configured to identify further objects in the radar signals based on multiple predefined object-specific tests, the further objects include: birds, pedestrian, vehicles, helicopters.

Embodiments relate also to a method for automatic identification of a drone in radar signals based on features of spectral data of the radar signals, wherein the spectral data include a spectrum as function of frequencies. The method comprises:

visualizing, by a visualization module, of feature-specific structures in the spectrum by performing one or more of the following steps:
generating a first modified spectrum by keeping a predefined number of data points with largest amplitude values in the spectrum, while setting all other amplitude values to a default value,
generating a second modified spectrum by repeated averaging of consecutive amplitude values in the first modified spectrum,
defining a threshold based on a statistical upper limit for variations of the spectrum in a range spaced away from a maximal spectral value; and identifying, by a classification module, the drone based on predefined tests testing a presence of at least one feature and being performed on a result of visualization module, wherein the predefined tests use at least one of the following values:
a number_6 of data points around a maximum in the first modified spectrum that are all greater or equal to the threshold or the default value,
a number_15 given by a sum of differences, wherein, when the spectrum is split into multiple blocks, each difference is a difference between a maximum and a minimum of amplitude values within a respective block,
a number_5 of crossings of the threshold in the spectrum,
a number_16 based on a standard deviation of data points of the spectrum while omitting data points that starting from maximal value are larger than the threshold in an uninterrupted order,
entries at one or more predetermined position(s) in an ordered statistic, wherein the data points of the spectrum are ordered in size,
at least one difference of distances from high points in the second modified spectrum to its maximal value.

It is understood that the order of steps may be different as long as the desired effect is achievable. Furthermore, any function described in conjunction with the apparatus may be implemented by further optional method steps. In addition, this method may also be implemented in software on a computer program product. Therefore, embodiment relate also to a computer program having a program code for performing the method, when the computer program is executed on a processor.

V. Embodiments for the Identification of Vehicles

According to these embodiments, the apparatus is configured for an automatic identification of a vehicle in radar signals based on features of spectral data of the radar signals. The spectral data includes a cepstrum (cep) as function of quefrencies.

The visualization module is configured to visualize feature-specific structures in the cepstrum by performing one or more of the following:
generating a first modified cepstrum by keeping a predefined number of data points (e.g., 20% or 25 data points) with largest amplitude values in the cepstrum, while setting all other amplitude values to a default value,
generating a second modified cepstrum by repeated averaging of consecutive amplitude values in the first modified cepstrum,
determining, in the second modified cepstrum, positions of high points and low points in a cepstral range of quefrencies starting with a second lowest quefrency to ⅓ of all quefrencies (e.g., values 2 . . . 40 for exemplary 128 samples),
determining distances of successive high points and distances of successive low points in the second modified cepstrum,
determining a first distribution density function for the distances of the high points and a second distribution density function for the distances of the low points.

The classification module is configured to identify the vehicle based on predefined tests testing a presence of at least one feature and being performed on a result of visualization module, wherein the predefined tests are based on at least one of the following values:
a number of high points in the cepstral range,
a number of low points in the cepstral range,
a difference between the distances.

The default value can be any value (e.g., zero) that are sufficiently different from all other radar signals or data points to be clearly identifiable. It is understood that the apparatus provides a simple classification whether the detected object is a pedestrian or not. As will be described in more detail below, according to further embodiments, other tests can be performed by the apparatus as well. In particular, the apparatus may also be configured to positively identify other objects like drones, vehicle, birds, helicopters and provide a classification of all detected objects. In the following the terms "object" and "target" are interchangeable terms denoting—if not otherwise stated—the same.

The visualization module and/or the classification module may be implemented by software in a data preprocessing unit. In addition, the apparatus may be configured for pattern recognition and may have access to a database, storage media or other peripheral devices to implement any kind of exchange of data.

Data points may be spectral values of the spectrum as function of frequencies. Similarly, further embodiments may use a cepstrum derived from the spectrum, wherein data points of the cepstrum are spectral/cepstral values (in general functional values) as function of quefrencies.

Here and in the following the range for determining thresholds may relate to a portion of the spectrum that is not taken in account for the forming of the first/second modified spectrum. Furthermore, when considering also the cepstrum, another threshold for the cepstrum can be formed in the similar/same way as for the spectrum, but now relying on the cepstral values.

The predefined number of data points may be 20% of a total number and the power of 2 may be 5, 6, 7, 8, 9, . . . resulting in 32, 64, 128, 256, 512, . . . samples, but shall not be limited to these values. Most of the following description will assume 256 samples in the spectrum and 128 values in the cepstrum. However, further embodiments assume other values. If other values are considered, also the parameters used in the tests have to adjusted accordingly. For example, the ratio of a new value to the total number of samples is the same as for the case with 256 samples for the spectrum and 128 samples for the cepstrum mentioned explicitly in the description.

In the following, abscissa values refer to frequencies or possibly normalized frequency, where the sampled frequencies in the underlying radar frequency band are numbered from the first to last sampled frequency (being a power of two). It is understood that the used frequencies are not limited to particular frequency bands, any radar frequency band can be employed in embodiments. It is further understood that the tests may include a comparison with thresholds (e.g., predetermined) or with other data sets to confirm that object-specific features are fulfilled and a particular target is identified. The term "file" will be used in the following to encompass any kind of data set or a field build by functional values associated with particular abscissa values (e.g., frequencies, quefrencies).

Optionally, the cepstrum comprises a power of 2 samples (e.g., 64, 128, 256, . . . ) and the cepstral range includes the quefrencies 2 to 40 (or the first ⅓ ignoring the first value) in an ordered sequence and the classification module may be configured to identify the vehicle if a vehicle-feature-2 is fulfilled which is defined by: there are at least three (or 8% of the values) high points in the cepstral range.

Optionally, the classification module is further configured to identify the vehicle if a vehicle-feature-3 is fulfilled which is defined by: cepstral values of the at least three (or the 8% of the values) high points, HP, are monotonically decreasing with increasing quefrencies.

Optionally, the classification module is further configured to identify the vehicle if a vehicle-feature-4 is fulfilled which is defined by: there are at least three (or 8% of the values) low points, LP, in the cepstral range, and at least two distances of consecutive high points and at least two distances of the consecutive low points differ by a maximum of 3.

Optionally, the visualization module configured: to add first distribution density function and second distribution density function resulting in a new distribution density function, and/or to define a modified distribution density function as function of x by adding numbers of four successive digits, x−1, x, x+1, x+2, for x=2, 3, . . . for the new distribution density function. The classification module may be further configured to identify the vehicle if a vehicle-feature-5 is fulfilled which is defined by: there are at least two high points and at least two low points in the cepstral range, and a sum of the first 50 (or the first 40% of) values that are at least 4 of the modified distribution density function is at least 8.

Optionally, the spectral data further includes a spectrum as function of frequencies, the spectrum including a power of 2 samples, wherein the first three samples and the last three samples thereof are assigned to ground clutter. The classification module may be further configured to identify the vehicle if a vehicle-feature-1 is fulfilled which is defined by: a position of a maximal value in the spectrum lies in a spectral region of the first 33% of samples or the last 22% of samples in the spectrum.

Optionally, the predefined tests are further based on: entries at one or more predetermined positions (e.g., the 5th, 50th) in an ordered statistic where data points of the spectrum are ordered in size, and/or a number_77 defining a standard deviation over cepstral values of the cepstrum excluding the first three samples and last three samples in the cepstrum. The classification module may then be further configured to identify the vehicle if at least one of the following vehicle features is satisfied:
an entry at one of the predetermined positions (e.g., the $50^{th}$) of the ordered statistic is greater than 6.7 or the number_77 is less than 0.23 defining a vehicle-feature-1a,
an entry at one of the predetermined positions (e.g., the $50^{th}$) of the ordered statistic is less than 2.8 or the number_77 is greater than 0.21 defining a vehicles-feature-2a,
an entry at another of the predetermined positions (e.g., the $5^{th}$) of the ordered statistic is greater than 1.7 or the number_77 is less than 0.23 defining a vehicle-feature-3a,
an entry at another of the predetermined positions (e.g., the $5^{th}$) of the ordered statistic is less than 1.03 or the number_77 is greater than 0.21 defining a vehicle-feature-4a.

Optionally, the classification module is configured to identify further objects in the radar signals based on multiple predefined object-specific tests, the further objects include: drones, pedestrian, bird, helicopters.

Further embodiments relate to a method for automatic identification of a vehicle in radar signals based on features of spectral data of the radar signals, the spectral data further including a cepstrum as function of quefrencies. The method comprises a step of visualizing, by a visualization module, of feature-specific structures in the cepstrum by performing one or more of the following steps:
generating a first modified cepstrum by keeping a predefined number (e.g., 25 or 20%) of data points with largest amplitude values in the cepstrum, while setting all other amplitude values to a default value,
generating a second modified cepstrum by repeated averaging of consecutive amplitude values in the first modified cepstrum,
determining, in the second modified cepstrum, positions of high points and low points in a cepstral range of quefrencies starting with a second lowest quefrency to ⅓ of all quefrencies (e.g., values 2 . . . 40 for exemplary 128 samples),
determining distances of successive high points and distances of successive low points in the second modified cepstrum,
determining a first distribution density function for the distances of the high points and a second distribution density function for the distances of the low points.

The method further includes a step of identifying, by a classification module, the vehicle based on predefined tests testing a presence of at least one feature and being performed on a result of visualization module, wherein the predefined tests use at least one of the following values:
a number of high points (HP) in the cepstral range,
a number of low points (LP) in the cepstral range,
a difference between the distances.

It is understood that the order of steps may be different as long as the desired effect is achievable. Furthermore, any function described in conjunction with the apparatus may be implemented by further optional method steps. In addition, this method may also be implemented in software on a computer program product. Therefore, embodiment relate also to a computer program having a program code for performing the method, when the computer program is executed on a processor.

In comparison to the conventional methods for radar target classification, embodiments advantageously differ at least by the following aspects. Conventional classifications assume only a few parameters for the individual target types. These few parameters are subjected to the usual training and learning algorithms resulting in identifications of different target types. What happens in the training and learning algorithms in detail cannot be traced. The conventional processes are therefore a kind of black box, wherein the internal processing remains unknown so that the results may suddenly change.

In contrast hereto, the tests according to embodiments are pre-defined, it is exactly known what happens why. The pre-defined tests lead to increasingly correct target types with the number of tests employed. The pre-defined tests may be further improved by a learning algorithm, but there is no need for doing so. The tests alone are sufficient to infer the correct target types. Therefore, conventional methods are based on few parameters accompanied with training and learning algorithms applied to them. Embodiments of the present invention can combine many tests, so no learning algorithms are needed.

Embodiments provide the particular advantage of guaranteeing a high reliability, because the tests are under full control. Drone in particular can be identified reliably. An automatic radar target classification is made possible by using target-typical characteristics and features from the spectrum and/or the cepstrum. The underlying algorithm is anything but a "black box". According to embodiments, each decision is comprehended and explained in every detail. The features include unique characteristics of target types and therefrom derived questions are always fitted to specific target types.

A further and essential advantage of embodiments is also—in contrast to cameras and direction finders—the ability to classify extreme quickly many targets in a large area.

BRIEF DESCRIPTION OF DRAWINGS

Various embodiments of the present invention will be described in the following by way of examples only, and with respect to the accompanying drawings, in which:

FIGS. 5A, 5B show two exemplary pictures for a typical spectrum for birds and drones.

FIG. 7A-7F illustrates a typical spectrum/cepstrum for drones.

FIG. 9A-9F illustrates a typical spectrum/cepstrum for vehicles.

FIG. 10A-10F illustrates a typical spectrum/cepstrum for helicopters.

DETAILED DESCRIPTION

Various examples will now be described more fully with reference to the accompanying drawings in which some examples are illustrated.

Accordingly, while examples are capable of various modifications and alternative forms, the illustrative examples in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

The terminology used herein is for the purpose of describing illustrative examples only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements and/ or components, but do not preclude the presence or addition of one or more other features, steps, operations, elements, components and/or groups thereof.

Figure 1:
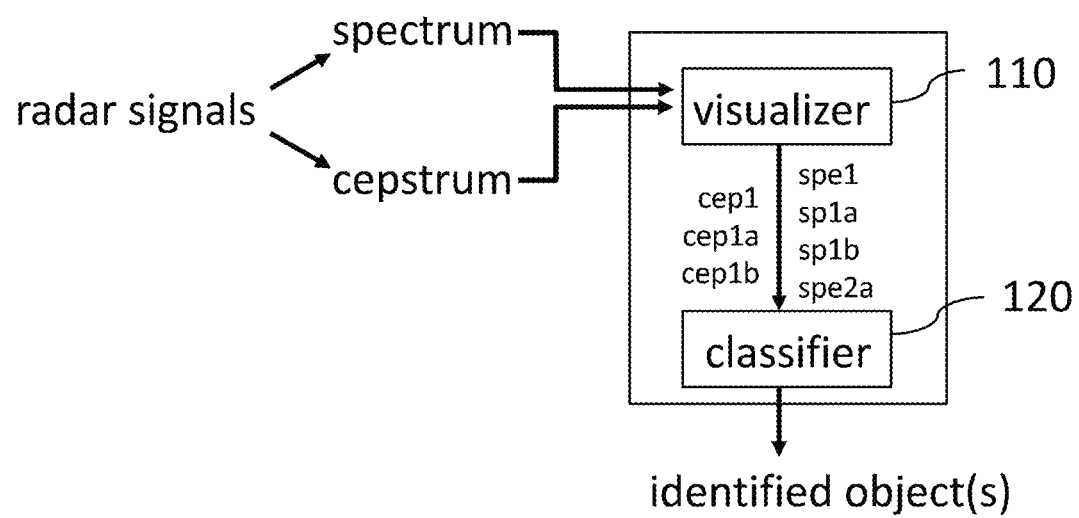
FIG. 1 depicts an apparatus for automatic identification of a drone according to an embodiment of the present invention.

FIG. 1 depicts an apparatus for an automatic identification of an object (or target) in radar signals based on multiple predefined object-specific tests is disclosed. The object is one or more of the following: a drone, a helicopter, a bird, a pedestrian, and a vehicle, the object-specific tests are based on features of spectral data of the radar signals, the spectral data including a spectrum spe as function of frequencies and a cepstrum cep as function of quefrencies.

The apparatus comprises a visualization module 110 (visualizer) configured to visualize feature-specific structures in the spectrum spe and a classification module 120 configured to identify the object based on predefined tests testing a presence of multiple features (e.g., more than 10, or more than 30, or more than 40), the testing being performed on a result of visualization module 110.

The visualization module 110 may be configured to visualize feature-specific structures in the spectrum spe by performing at least one of the following data modifications: 1) generating a first modified spectrum spe1 by keeping a predefined number (e.g., 50) of data points V1 with largest amplitude values of the spectrum spe, while setting all other amplitude values to a default value (e.g., zero); 2) generating a second modified spectrum spe1a, spe1b, spe2a by repeated averaging of consecutive amplitude values in the first modified spectrum spe1; 3) defining a threshold based on a statistical upper limit for variations of the spectrum spe in a range spaced from a maximal value Vmax.

The classification module 120 may be configured to identify the object based on predefined tests which are designed to test a presence or absence of at least one feature (e.g., using specific thresholds). These tests can be performed on results of the visualization module 110 based on at least one of the following values:

a number_6 of data points around a maximum in the first modified spectrum spe1 that are all greater or equal to the threshold [see test 5], a number_15 given by a sum of differences, wherein, when the spectrum spe is split into multiple blocks, each difference is a difference between a maximum and a minimum of amplitude values within a respective block [see test 15], a number_5 of crossings of the threshold in the spectrum spe [see test 6], a number_16 based on a standard deviation of data points of the spectrum spe while omitting data points that, starting from maximal value, are larger than the threshold in an uninterrupted order [see test 16], entries at one or more predetermined position(s) in an ordered statistic, wherein the data points of the spectrum spe are ordered in size [see test 17], at least one difference (hpdix, hpdiy) of distances from high points in the second modified spectrum spe2a to its maximal value [see distance test].

Optionally, the classification module 120 is further configured to identify other objects like pedestrian, vehicle, birds, helicopters and provide a classification of all detected objects.

According to yet another embodiment, the visualization module 110 may further include a processing unit for one or more of the following: preprocessing time signals, a pulse compression, and a Doppler filtering. The spectra are derived therefrom. However, there are also easily conceivable other physical values for the feature extraction. Optionally, a cepstrum cep or a modification thereof can used to derive further features.

For each target type the extracted features are converted into questions. In optimum case, the classification algorithm will answer all questions positive for the current target type. And it will decide the questions negative for preferably all other target types. For example, asking 10, 20 or 40 questions for a target type, each positive replied question will be estimated with 10%, 5% and 2.5%, respectively. In consequence, in an optimum case, for the current target type 100% can be attained. Of course, optionally, another weighting of the questions than the uniform weighting is also easily conceivable.

Embodiments provide a solution for the challenge to extract features being characteristically for a specific target type, but at the same time not typically for other target species. The tests nevertheless differentiate between similar target types, such as drones in comparison with helicopters but also in comparison with birds or vehicles or pedestrians. The invented typical features for one type (e.g., for drones) enable a clear distinction against other types (e.g., helicopters and birds).

Principally, the procedure can be implemented for all radars possessing Doppler-high-resolution, as it will usually be found in ground radars. Besides the Doppler-high-resolution the used systems require adequate sub-clutter-visibility. That allows for example the visualization of the rotor blades of drones in the spectral representation. The algorithm is adapted for Pulse-Doppler-radars as well as for FMCW-radars (FMCW=frequency modulated continuous wave).

Since present classification algorithm was specifically designed for the identification of drones, the algorithm will be suitable for the identification of drones. Advantageously, it will be even possible to classify several drone types with the present algorithm.

According to yet another embodiment, the reliability is further improved by a combination of the present algorithm with classification models and their learning- and training styles such as: Classification Tree Method, K-Nearest-Neighbor-Algorithm, Support Vector Machine (SVM), Ensemble Learning and Discriminant Analysis. The classification gained by the process according to embodiments will be further stabilized in the subsequent tracking. For example, a flight path of the identified object may be tracked. This tracking provides further hints or confirmation of the detected object. For example, birds, helicopters, drones have distinct flight paths. Similarly, vehicle or pedestrians can be clearly separated from flying objects by tracking their paths. In particular, the classification can be compared with the kinematics of the target (velocity, direction changes etc.). Hereby, the probability of a correct classification will be further increased.

Next, the details of embodiments for the automatic radar target classification algorithm using feature extraction will be described in more detail. For this, the visualization module 110 may be configured to perform (a) a preprocessing and (b) a subsequent a structure visualization. The classification module 120 may be configured to perform various tests to recognize the structure and therewith to identify object-specific features. Finally, the tracking can be used to confirm the object identification.

A. Preprocessing and Visualization of Object-Specific Structures (a) The Preprocessing The signal is branched off in a receive train after a pulse compression and before a Doppler filtering. After plot forming, it is passed to the classification module as an I/Q-signal. For example, the classification module 120 represents a spectral-based classification on plot level with a subsequently thereon constructed track-based classification.

The features and questions or tests are especially based on the spectrum and/or the cepstrum of the underlying I/Q-signal (output of an In-phase-&-Quadrature procedure). This I/Q-signal may present a length of 2 to the power of n ($=2^n$), as it is generally required from an FFT or IFFT. Without loss of generality, on plot level an FFT length of 256 is used. When other lengths are used, the algorithm can be adjusted accordingly (e.g., if the length doubles/halves the various values defined below can also double/halve and so on). On track level, this FFT length is reduced to 64 in accordance with a shorter update-rate.

On plot level, the input of the classification algorithm is composed of four complex I/Q-time signals of length 256, based on four bursts. Each of these four time signals is subjected to a windowing, a FFT and an absolute value forming. Thereafter, the four spectra (absolute value) will be averaged. Then, the averaged spectrum, named "lin" for linear, may be subjected to the logarithmic calculation specification using the formula: log a=20*$\log_{10}$(lin) and to an IFFT with subsequent absolute value calculation. That implies the so-called cepstrum. It is symmetrical to its center. In consequence, the output of the preprocessing is composed of 256 spectral values and 128 cepstral values, in sum 384 values, on which the feature extraction is based in the end.

(b) Visualization of Structures

Figure 2:
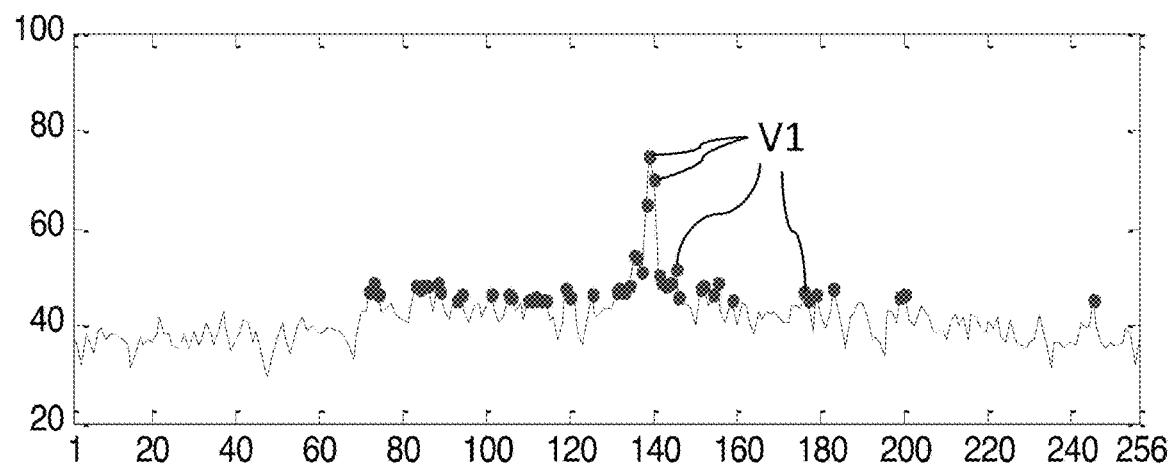
FIG. 2 illustrates an exemplary 50-analysis for the spectrum, which embodiments use to visualize features.

For visualizing specific structures and formations in the spectrum and/or cepstrum, several simple implements and self-made artifacts will be performed. For this, three examples are described in more detail:

(a) a so-called 50/25 analysis
(b) a smoothing by averaging
(c) a thresholds analysis FIG. 2 illustrates first an exemplary 50-analysis for the spectrum, wherein the spectrum shows the amplitude values (in dB) as function of normalized frequencies with 256 values for an exemplary helicopter. The 50-analysis relies on the assumption that the important values in the spectrum or cepstrum should be the highest values. In consequence, the 50 highest spectral values V1 of 256 spectral values and the 25 highest cepstral values of 128 cepstral values are kept and the remaining values are set identically to zero. Instead of zero, any other predefined default value can be used, at least as long as it can clearly be separated from the other values in the spectrum/cepstrum. The exemplary 256 values (normalized frequencies) related to output of the fast Fourier transformation (FFT), where the frequency values on the abscissa cover the region from zero to the sample frequency which can be selected freely.

Thereby, now and again target-typically formations and structures are formed, which are interesting for the feature extraction in many respects. This procedure will be called "50/25-Analysis". As set out before, if more (or less) spectral values are considered, the number of important values can also be adjusted accordingly.

Figures 3A, 3B:
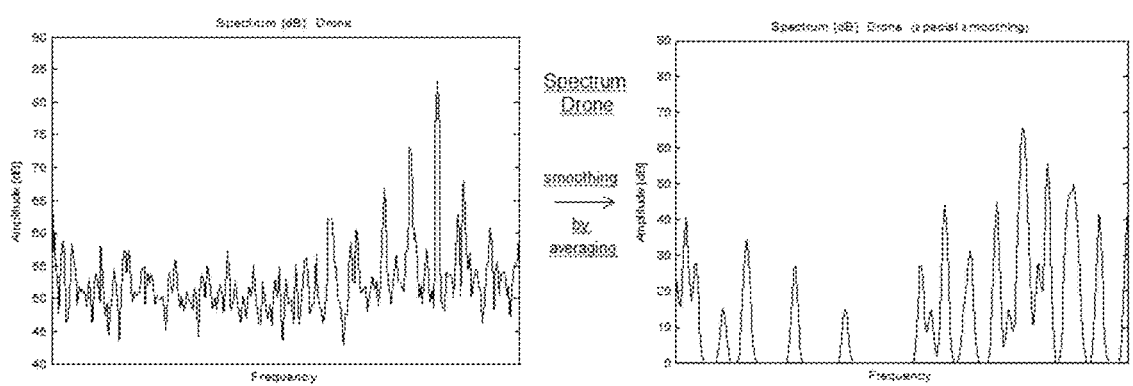
FIGS. 3A, 3B depict an exemplary spectrum of a drone and the result of an averaging over three consecutive values in the spectrum, which embodiments use to visualize features.

FIG. 3A depicts an exemplary spectrum of a drone and FIG. 3B shows the result of an averaging over three consecutive values in the spectrum (or similarly in the cepstrum) and multiple (2, 4, . . . 6, 7, . . . times) repetition of this averaging. It is understood that the averaging can be performed, instead over three also over other number consecutive values (e.g., 4, 5, 6, . . . ). Thus, a desired smoothing is achieved, because the averaging rounds off edges in the functional running and in this way quite interesting formations are developed as well as specific maximums, which are used for the feature extraction in many cases.

Figure 4A:
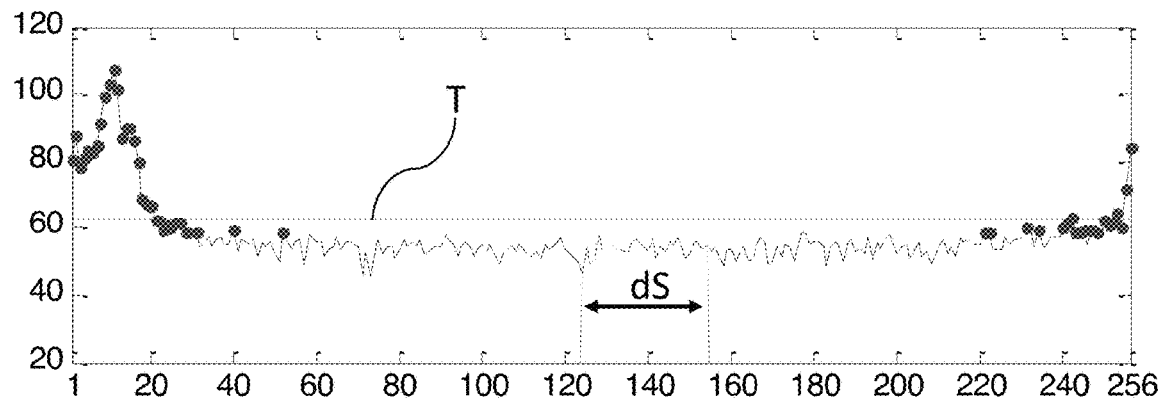
FIGS. 4A, 4B illustrate the definition of appropriate thresholds according to embodiments.
Figure 4B:
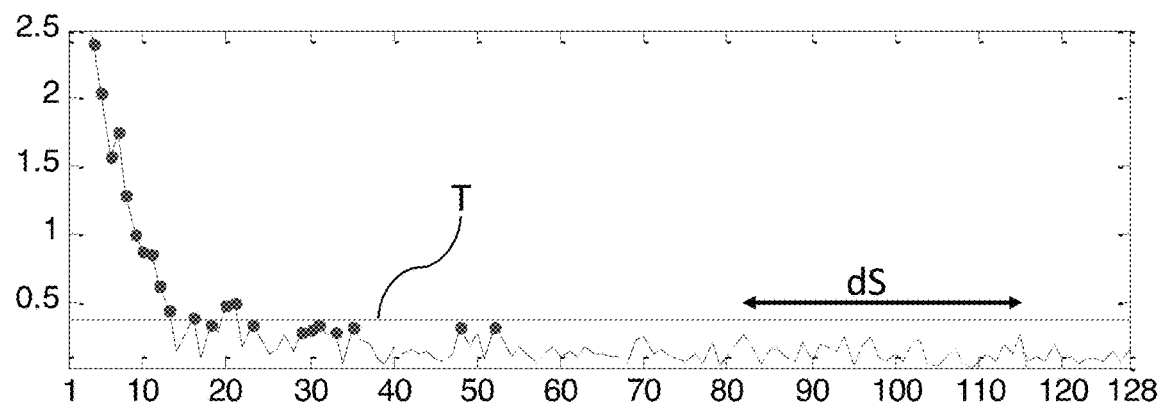

FIG. 4A and FIG. 4B illustrate the definition of appropriate thresholds T, wherein for the spectrum and for the cepstrum constant (different) thresholds T are calculated, which are equally used for the feature extraction from time to time. The threshold T can be defined by $$T = \mu + 3.5 * \sigma, \quad (1)$$

where $\mu$ is the mean value and $\sigma$ is the standard deviation and both values are calculated in the spectrum and/or cepstrum for zones (ranges) dS without any potential target amplitude (from objects to be detected). For example, for the cepstrum (see FIG. 4B) the constant values zone dS between the values 80 to 115 can be used. For the spectrum (see FIG. 4A), we take the values range S−15 to S+15, where S=M+x. M is the abscissa value (3 to 254: omitting margins as ground clutter) of the spectral maximum (around 10). x is given by the case discrimination: x=128 for M<90, x=−128 for M>170, x=100 for 90≤M≤128 and x=−100 for 128<M≤170.

As the following figures show, these three exemplary visualization steps make object-specific features visible.

FIG. 5A and FIG. 5B show two exemplary pictures for a typical spectrum for birds (see FIG. 5A) and for drones (see FIG. 5B). The depicted pictures are representative of many other pictures (see FIG. 6 to FIG. 10 below), which were all considered and these two are extracted as representing a typical characteristic.

For the recognition of a drone it is important in the visualisation to clearly separate birds, because 80% of the objectives of maritime surveillance are birds and 90% of the objectives of land surveillance are birds. Therefore, the "bird background" has to be distinguished from the desired identification of drones and the criteria (a), (b) and (c) obviously achieve this: the spectra can be differentiated based on important points V1 (enlarged points) including a maximal value Vmax at the abscissa value xmax and/or the thresholds T. A possible smoothing will not change the result.

It is apparent from FIG. 5A and FIG. 5B that the depicted spectra can be distinguished by at least one step performed by the classification module 120. Therefore, the claimed subject matter is actually able to achieve the desired differentiation between the exemplary birds and drones, for which the tests were particularly designed.

B. Tests to Distinguish Individual Target Objects

First, the above introduced tests (i) to (v) are described in more detail.

As for test (i): The spectrum after the 50-analysis includes the 50 largest values, all others are set to zero (or to another clearly distinguishable default value). Obviously, if one considers the number_6 of values that, around the spectral maximum Vmax, are continuously above the threshold T (or above zero), this number_6 in the bird spectrum in FIG. 5A is larger than in the spectrum for drones in FIG. 5B.

As for test (ii): According to this test, optionally, values 1-3 and 254-256 may be omitted (because they are prone to possible ground clutter). Further, the remaining 250 values may be divided into 10 blocks of 25 values and 10 differences max-min over the blocks may be build. Again, the two largest differences may be omitted (because they may belong to target body or Vmax). The remaining eight differences are added resulting in number_15, which apparently is higher for drones (see FIG. 5B) than for birds (see FIG. 5A). For birds, the important points V1 have mostly the same level.

As for test (iii): This test determines first a number_5 of changes in the spectrum from "greater threshold T" to "lower threshold T" and vice versa. Since there are more changes for drones (see FIG. 5B) than for birds (see FIG. 5A), the determined number_5 can be used to identify a drone based on the size of number_5.

As for test (iv): This test determines a number_16 based on the scattering value over spectral values, wherein again the values 1-3 and 254-256 may be omitted (possibly ground clutter). In addition, all values can be omitted that are, starting from the spectral maximum Vmax, on both sides continuously above the threshold T (target body). Then, since a drone spectrum (see FIG. 5B) exhibits a higher scatter value than a spectrum obtained from birds (see FIG. 5A), the number_16 can actually be used to identify drones.

As for test (v): This test relies on an ordered statistic, where the spectral values (256 in the example) are ordered according to size. Next, from each value after this ordering the 128th largest value may be subtracted. This yields an optional normalization. The 128th largest value is zero. Thereafter, the 30th largest and 50th largest values may be considered (or other predetermined values). Comparable experiments have shown that these values are larger for drone values than the corresponding bird values. This is understandable by the fact that the spectrum for drone has more higher values than the spectrum for birds.

These five possible tests or criteria are dealt with in more detail below by tests 5, 6, 15, 16 and 17 and go into the following features:

drone-features: 1a to 10a, 21a to 23a, 25a to 27a
bird-features: 1a to 3a, 5a to 6a, 9a to 10a, 17a to 18a, 10a, 22a to 23a.

Accordingly, there are plenty of concrete features based on these five differentiation criteria between drones and birds. The criteria can be seen on the spectral images. The features were ultimately verified in a statistical evaluation with a lot of real data.

However, according to further embodiments, a series of further tests can be performed to generate additional characteristics for the individual target types. These tests define various numbers that can be compared to different values that are specific for the objects to be identified.

Test 1: It is asked how many of the exemplary 256 spectral values spe are smaller than Threshold T as introduced above with FIG. 4A and FIG. 4B. This number is called "number_1".

Test 2: It is asked how many of the 256 spectral values after the "50-Analysis", i.e., how many values of spe1 (as defined in description of FIG. 1 above), are smaller than the Threshold T as introduced in Test 1. This number is called "number_2".

Test 3: It is asked how many of the 256 spectral values spe are smaller than Threshold T and at the same time larger than the threshold value minus 17. Threshold T is defined as in Test 1. This number is called "number_3".

Test 4: This test considers the following value:

$$S = M + x,$$

wherein M is the abscissa value of the spectral maximum in the range 4 to 253 (the edges are omitted as possible ground clutter) and x is given by the following case distinction:

$$x = 128 \text{ for } M < 90,$$
$$x = -128 \text{ for } M > 170,$$
$$x = 100 \text{ for } 90 \leq M \leq 128, \text{ and}$$
$$x = -100 \text{ for } 128 < M \leq 170.$$

The motivation for this definition is that the constant Threshold T as described with FIGS. 4A, 4B should be calculated for an area dS that does not contain target amplitudes (of an object to be detected). This range dS may be the interval S−15 to S+15 for the spectral Threshold T.

Next, in test 4 it is asked how many of the 256 spectral values after the "50-Analysis", i.e., how many values of the first modified spectrum spe1, are greater than zero in the range S−15 to S+15. This number is called "number_4".

Test 5: This test relates the test (i) as defined before and considers the exemplary 256 spectral values, wherein the values 1 to 3 and 254 to 256 may not be considered (possible ground clutter). Then, it is asked how many spectral values after the "50-Analysis", i.e., how many values of the first modified spectrum spe1, are greater than or equal to the Threshold T around the spectral maximum without interruption. Threshold T is defined as in Test 1. This number is called "number_6".

Furthermore, it is asked how many spectral values after the "50-Analysis", i.e., how many values of first modified spectrum spe1, at the spectral edges, i.e. from the first value upwards and from the 256th value downwards together, without interruption are greater than or equal to the Threshold T. Threshold T is defined as in Test 1. This number is called "number_7".

Test 6: This test relates to test (iii) as defined before and determines how many changes in the spectrum spe (values from 1 to 256) from spe(i)>Threshold T to spe(i+1)<Threshold T and vice versa occur for i=1, . . . , 255. Ground clutter can be deducted. This number is called "number_5".

Test 7: In this test from the 256 cepstral values cep the standard deviation is calculated over the cepstral values 4 to 253. This number is called "number_77".

The Tests 1 to 7 are selected tests for the target type "birds".

Test 8: This test considers 81 spectral values of the spectrum spe, namely the values spe(sm−40) to spe(sm+40), where sm is the location (abscissa value) of the spectral maximum Vmax, calculated as in Test 5, i.e. without possible ground clutter. If the spectral maximum is at a position <41 or >215, the values are filled cyclically, i.e., from 256 downwards or from 1 upwards.

For the newly created 81-valued spectral file "neu_file" with the spectral maximum at the point 41, it is then asked how many changes from neu-file(i)>Threshold T to neu_file (i+1)<Threshold T and vice versa occur for i=1, . . . , 80. This number is called "number_8".

Test 9: For the cepstral values cep, a value k is increased from k=1 as long as cep(k)>cep (k+1). With the then specified k it is asked how many cepstral values in the range [k,128] are greater than 1.5*Threshold T. This number is called "number_9".

Threshold T is the cepstral threshold as described with FIGS. 4A, 4B.

The Tests 8 and 9 are selected Tests for the target "drone".

Test 10: This test computes the 8 sums of eight blocks, each block including 32 spectral values spe. Block 1 includes the 32 spectral values 1 to 16 and 241 to 256, Block 2 includes the 32 spectral values 17 to 48, Block 3 includes the 32 spectral values 49 to 80 and so on, and finally Block 8 includes the 32 spectral values 209 to 240.

If now the sum of the values of Block 1 is the largest sum, one defines "number_10" as 100, otherwise as zero.

Test 11: It is asked how many spectral values after the "50-Analysis", i.e., how many values of the first modified spectrum spe1, are greater zero at the spectral edges without interruption, i.e. from the first value upwards and from the 256th value downwards together. This number is called "number_11".

Test 12: It is asked how many spectral values after the "50-Analysis", i.e. how many values of the first modified spectrum spe1, are greater than Threshold T for the spectral values 40 to 216. T is defined as in Test 1. This number is called "number_12".

Test 13: This test considers 61 spectral values of the spectrum after the fifties "50-Analysis", i.e. from first modified spectrum spe1, namely the values spe1(*sm*−30) to spe1(*sm*+30), where sm is the location (abscissa value) of the spectral maximum, as in Test 5 (i.e. without possible ground clutter). If the spectral maximum is at a position <31 or >225, the values are filled cyclically, i.e. from 256 downwards or from 1 upwards.

For the thus newly created 61-value spectral file "new file" with the spectral maximum at the point 31, it is then asked how many of the 61 values are greater than zero. This number is called "number_13".

Test 14: This test determines sm as the location of the spectral maximum without the values 1 to 3 and without the values 254 to 256.

If sm≥107, then "Start"=max(20, 2*sm+5) and "End"=220. Next, from "Start" to "End", the number of values is counted for which the spectrum after the 50-Analysis, i.e. the first modified spectrum spe1, is greater than the Threshold T as defined with FIGS. 4A, 4B. This number is called "number_14".

If sm≥141, "Start"=20 and "End"=min(220, 256−2*(256−sm)). As above, from "Start" to "End", the number of values of spe1 that are greater than Threshold are counted. In this case, this number is called "number_14".

If 107<sm<141, then "number_14" is set to 100.

The Tests 13 and 14 are selected Tests for the target type, "vehicle".

Test 15: This test relates to test (ii) as defined before and considers the spectrum, wherein the edges of the spectrum with the values 1 to 3 and 254 to 256 may be omitted from the spectrum. The remaining 250 spectral values are divided into 10 blocks of 25 values each. Block 1 then includes the values 4 to 28, block 2 the values 29 to 53, and so on. Finally, block 10 includes the values 229 to 253. For each of the 10 blocks, the test forms the difference between the maximum and minimum spectral values.

Next, the 10 differences are arranged in size. The two largest values, which probably include the target body, are omitted. The remaining 8 differences are added. This number is called "number_15".

Test 16: This test relates to test (iv) as defined before and defines a "number_16" as the standard deviation (or related thereto) over the exemplary 256 spectral values spe. Here, the following spectral values may be ignored: the spectral edges 1 to 3 as well as 254 to 256 as well as all spectral values from the spectral maximum to the left and right, which are larger than the Threshold T in an uninterrupted order, wherein the Threshold T is used as described with FIGS. 4A, 4B.

Test 17: This test relates to the test (v) as defined before and may consider the 256 spectral values of the spectrum spe, which are arranged in size (Ordered Statistic). Then, from each of the values the 128th largest value may be subtracted. This corresponds to a kind of normalization. This results in 256 ordered values starting with the largest value and decreasing to the smallest value. The 128th largest value has the value zero. Next, the test considers, for example, the 5th, 7th, 10th, 30th, and 50th largest value of these magnitude-ordered spectral values and call them spe_sort(5), spe_sort(7), spe_sort(10), spe_sort(30) and spe_sort(50). A comparison of these values may be used for the identification of objects.

Test 18: This test considers the 128 cepstral values cep and arranges these 128 values in size (Ordered Statistic). Since the smallest values all end at the value zero, no normalization is needed here. This results in 128 ordered values (starting with the largest value and decreasing to the smallest value). Next, the test considers, for example, the 5th, 7th, 10th, 30th, and 50th largest value of these ordered cepstral values and name them cep_sort(5), cep_sort(7), cep_sort(10), cep_sort(30), and cep_sort(50). Again, a comparison of these value may be used for the identification of objects.

Test 19: This test considers the 256 spectral values spe, which are normalized so that values between 0 and 100 are created. Then these values are rounded to integers 1 to 100. Of these 256 integer values, the Distribution Density Function (DDF) is determined, that is, the function of frequency of occurrence over the amplitudes 1 to 100. In other words, the distribution density function gives the frequency of occurrence, e.g., of amplitude values in the spectrum. For example, for a normal distribution it is given by Gaussian distribution function (bell curve). It is also known as the probability density function.

The test determines the location of the maximum of the DDF referred to herein as "vdfspex" as well as the maximum of the frequency of occurrence in the DDF referred to herein as "vdfspey". Furthermore, the test determines the location of the first zero before the maximum of the DDF and the location of the first zero after the location of the maximum of the DDF and referred to herein as zeros ns1 and ns2. It is defined: "nsdiff"=ns2−ns1. Furthermore, the test determines the sum of the frequencies of occurrence from ns2 to 100 referred to herein as "sumhauf". The number of low points between the zeros ns1 and ns2 is determined and called "anztp".

Finally, the test determines the width of the DDF at the frequencies of occurrence 5, 7, and 10 referred to herein as "wide5," "wide7," and "wide10."

Test 20: This test considers the 128 cepstral values cep. The first high cepstral values are limited or assigned to the value 2. The cepstral values are then normalized from 0 to 2 or, after multiplication with 50, to give values between 0 and 100. Then, these values are rounded to integers 1 to 100. Next, the Distribution Density Function (DDF) is determined of these 128 integer values, that is, the function of frequency of occurrence over the amplitudes 1 to 100.

Then, the test determines the width of the DDF at the frequencies of occurrence 5, 7, and 10 and call them "breitcep5", "breitcep7" and "breitcep10".

According to embodiments, from these 20 tests, further characteristics and features for the individual target types are derived.

C. Features for Special Target Types (Objects to be Identified)

FIG. 6A to FIG. 10F illustrate typical spectra/cepstra for the target species bird (FIGS. 6A-6D), drone (FIGS. 7A-7F), pedestrian (FIGS. 8A-8F), vehicle (FIGS. 9A-9F) and helicopter (FIGS. 10A-10F). The spectra show spectral amplitude as function of the normalized doppler frequency (after an FFT of an exemplary length 256) and the cepstra show the cepstral amplitude as function of the normalized quefrencies. As in FIGS. 5A and 5B the threshold T is drawn by horizontal line the highest spectral values V1 (e.g., the 50 largest points) are again depicted by enlarged points.

Figure 6A:
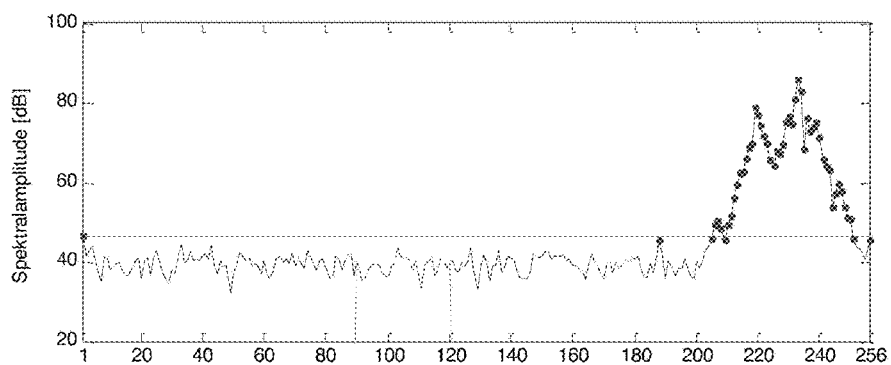
FIG. 6A-6D illustrates a typical spectrum/cepstrum for birds.
Figure 6B:
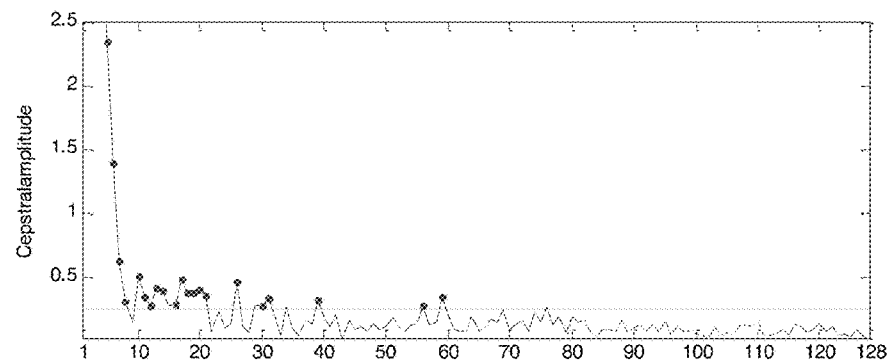
Figure 6C:
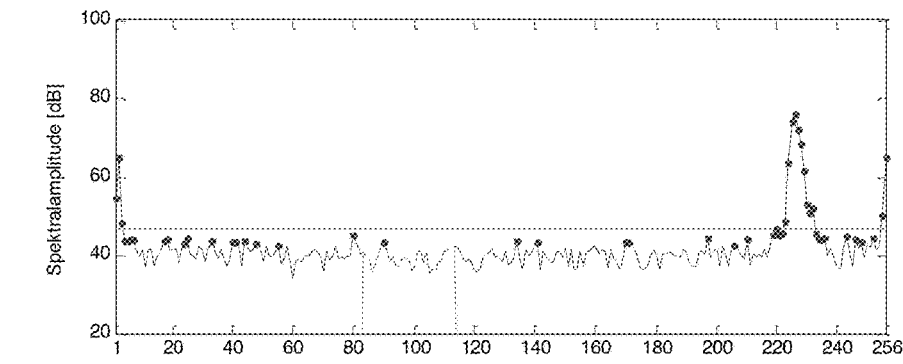
Figure 6D:
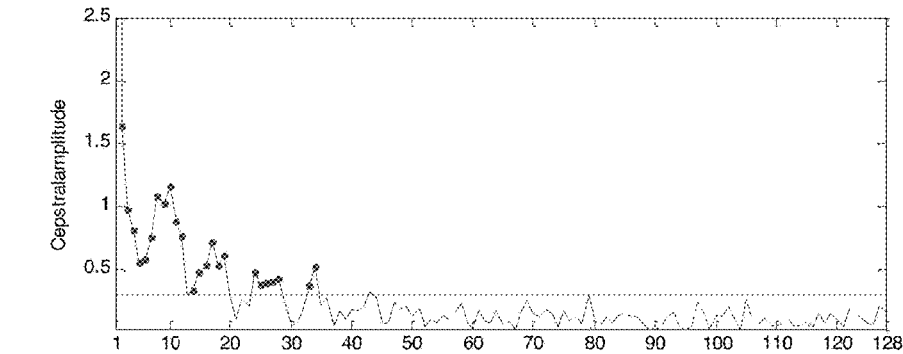
Figure 7E:
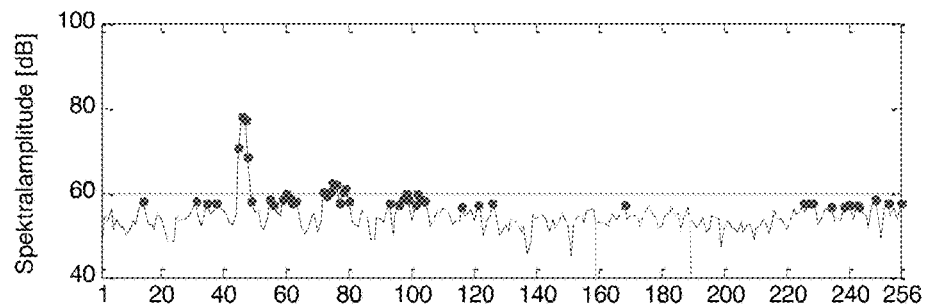
Figure 7F:
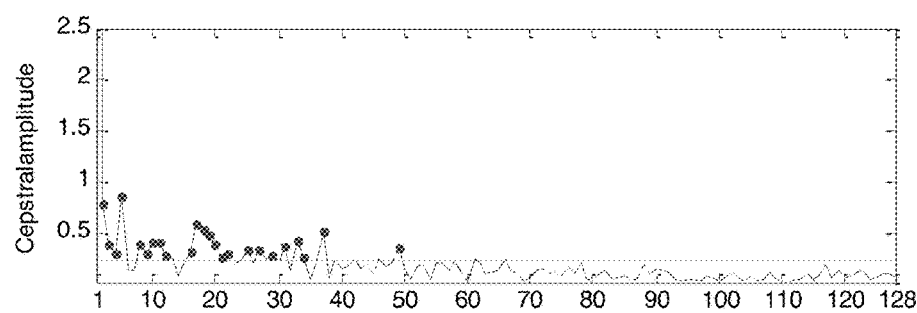
Figure 8A:
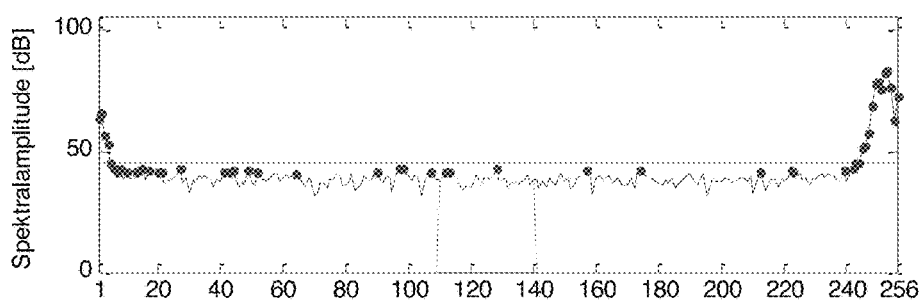
FIG. 8A-8F illustrates a typical spectrum/cepstrum for pedestrians.
Figure 8B:
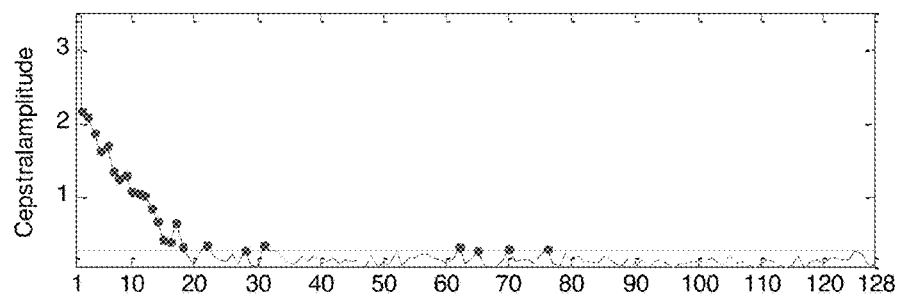
Figure 8C:
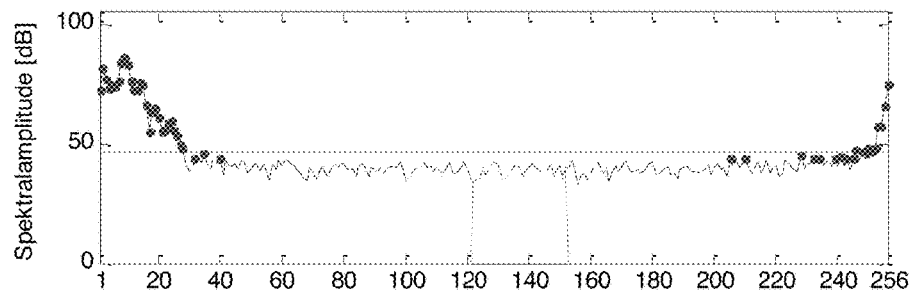
Figure 8D:
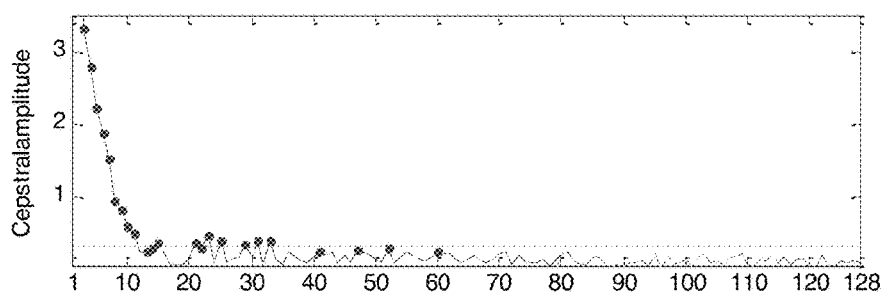
Figure 8E:
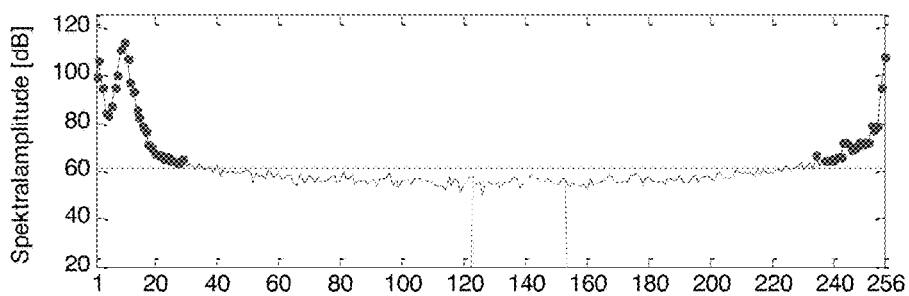
Figure 8F:
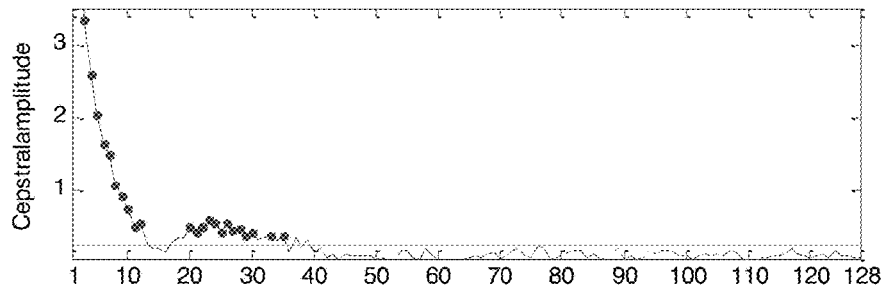
Figure 9A:
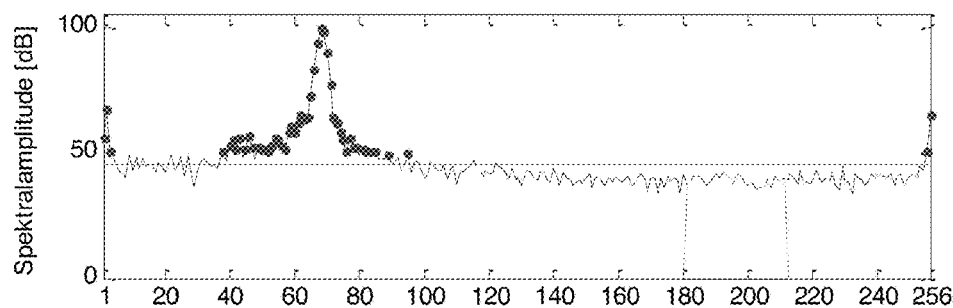
Figure 9B:
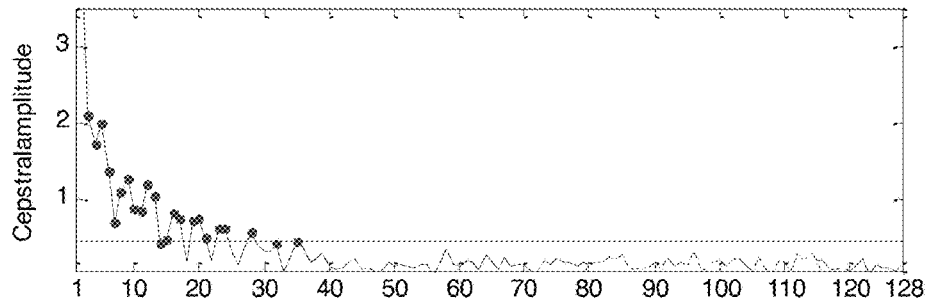
Figure 9C:
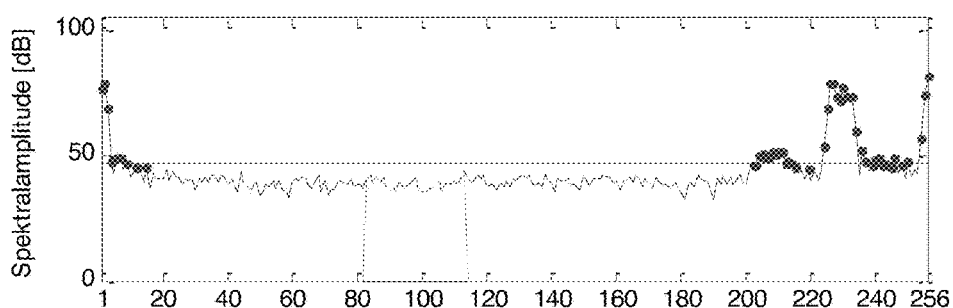
Figure 9D:
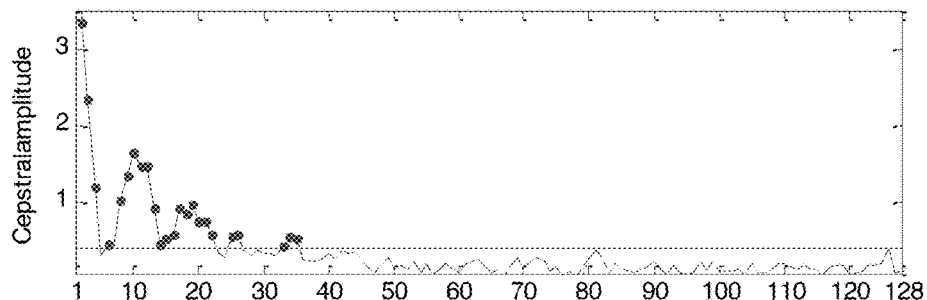

In detail, FIG. 6A, 6B show data for a raven, and FIG. 6C, 6D show data for a falcon. FIG. 7A, 7B show data for a Phantom drone, FIG. 7C, 7D show data for an Inspire drone, and FIG. 7E, 7F show data for a Bebop drone. FIG. 8A to 8F show data for various pedestrians. FIG. 9A, 9B show data for a first vehicle, FIG. 9C, 9D show data for a second vehicle, and FIG. 9E, 9F show data for a third vehicle. FIG.

Figure 10C:
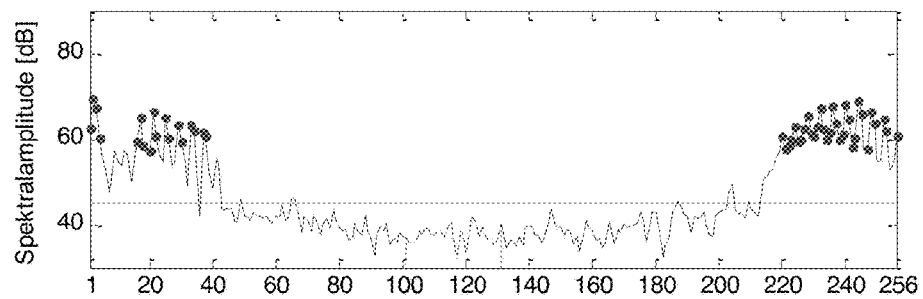
Figure 10D:
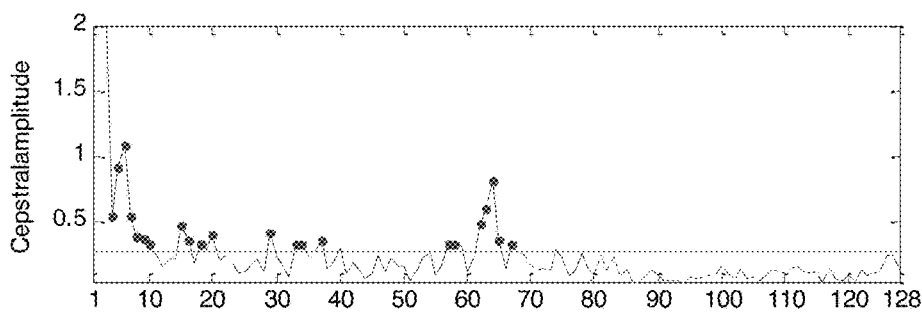
Figure 10E:
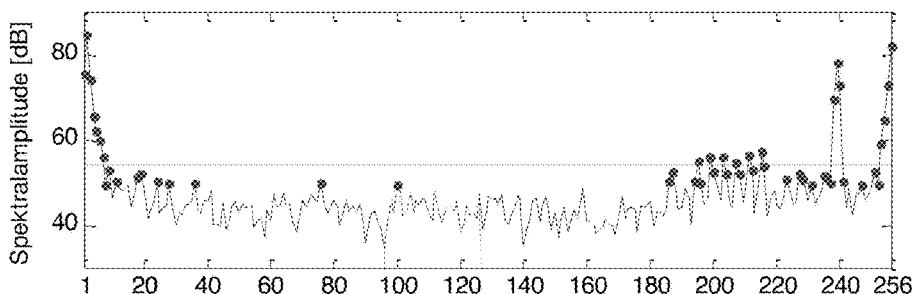
Figure 10F:
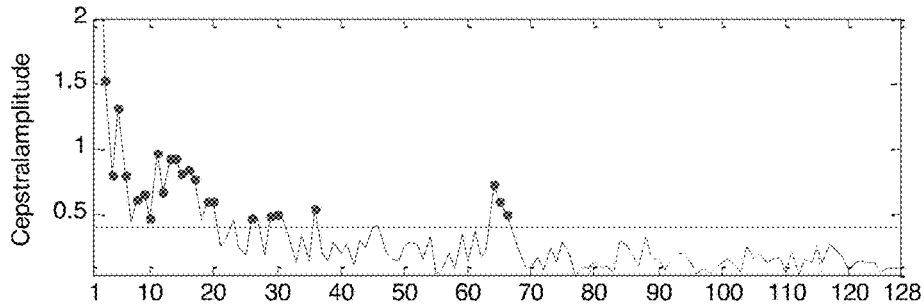

10A, 10B show data for a first helicopter, FIG. 10C, 10D show data for a second helicopter, and FIG. 10E, 10F show data for a third helicopter.

The visual comparison in combination with experience gained relating to spectra and cepstra reveals absolutely strong distinctions in the spectra and cepstra for several target types. Consequently, it is possible to extract target-specific features. The concrete object-specific features are described explicitly in the sequel.

It should be understood, the algorithm implemented in embodiments is not based on simulated data. This would not make sense and this would not be effective. All figures shown here are therefore based on real recorded data.

For the target types pedestrian, vehicle, drone (UAV), helicopter and birds, more than 35 features each are currently known and implemented in embodiments of the algorithm. To each feature belongs a question (test) which is usually responded positive by the algorithm for the associated target type, but may also be negative in the exception.

It can be clearly stated from experience: the reliability increases significantly with the number of tests. Only a few (3 or 4) tested features for individual target types may not be sufficient for a reliable target type distinction, for a reliable classification as many as possible (e.g., more than 35) features are of advantage. The number of features can be continuously extended for each target type in the algorithm. Such supplementation of the algorithm with additional features undoubtedly further on increases the reliability of the method in a systematic manner. Consequently, the following description will indicate only a selection of features for the above-mentioned five target types, not least because it is possible to supplement the current features at any time.

In addition, the supplementation of features is not limited to spectra and cepstra, but features with respect to other additional physical values are also conceivable. Therefore, embodiments provide the advantage of providing a tremendous potential of the disclosed classification.

Finally, according to yet other embodiments, the presented algorithm can be extended with features for further target types. For example, conceivable are air targets such as glider, airplane and jet plane and water targets such as swimmers, rowboat and motorboat, but also a split into wheeled vehicles and tracked vehicles.

In the specific examples presented in the following, so-called "Identical" features are to be distinguished from "Negation" features. If a feature of a specific target type also applies to another target type, then it is a so-called "Identical"-Feature for this other target type. If a feature of a specific target type is absolutely not applicable to another target type, then it is a so-called "Negation"-Feature for this other target type. For each studied target type, a whole series of "Identical"- and "Negation"-Features will be described. In particular, "Negation"-Features are very interesting because they produce distinguishing criteria in comparison to other target types.

In the following, a whole series of features implemented in embodiments for underlying algorithm will be explicitly specified. The features are formulated for the FFT length 256. For longer FFT lengths than 256, the features can be transferred directly in ratio. For shorter FFT lengths than 256, the features must be reworded in certain circumstances.

Each feature is formulated as a question which is fulfilled or not fulfilled. If satisfied, the question is worth x points or percent. The sum of these points over all questions results in the optimal case 100% (all questions fulfilled). The distribution of points over questions can be equally distributed or weighted in a special way.

C.1 Features for Pedestrians

Figure 11:
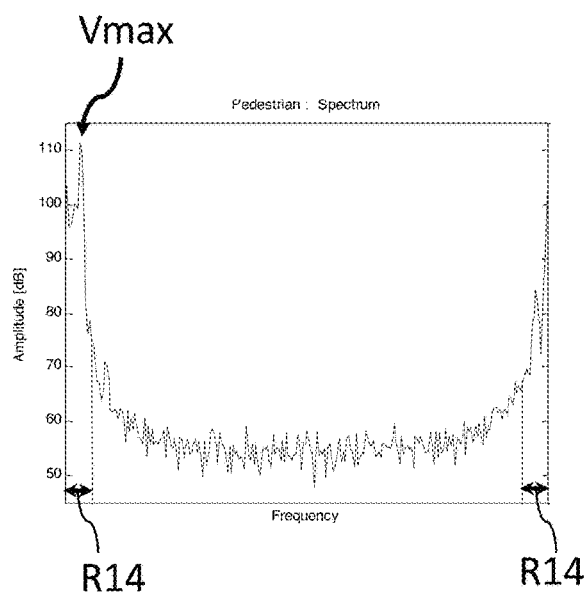
FIG. 11 depicts another pedestrian spectrum.

Pedestrian-Feature 1 (Velocity-Test in the Spectrum):

FIG. 11 depicts a typical pedestrian spectrum. Without limitation of generality, the spectrum consists of 256 samples. The values 1 . . . 3 and 254 . . . 256 are not considered as possible ground clutter and are neglected. For speed reasons of a typical pedestrian, the maximum value of the spectrum is located in the value regions R14 including the values 4 . . . 15 or 243 . . . 253 (close to the spectral boundary of highest and lowest frequencies).

Therefore, this feature (or test) is satisfied if the maximum value Vmax is in the defined region R14.

Pedestrian-Feature 2:

In the first modified spectrum spe1 (including 256 samples and after the 50-analysis, see description of FIG. 2), values that are greater than zero are counted from 1 upwards. It will be aborted if more than 5 zeros occur consecutively. The same procedure is performed from 256 downwards and both counting results are added. If the counted value is 20 or higher and, in addition, if pedestrian feature 1 is met, then feature 2 is satisfied.

Pedestrian-Feature 3:

Again, starting from the first modified spectrum spe1, this feature is met, if there are no 5 consecutive values >0 for the spectral values 40 to 216 (no gaps allowed).

Pedestrian-Feature 4:

Again, starting from the first modified spectrum spe1, this feature is met, if no values >0, which are higher than the threshold T+5 dB, occur for the spectral values 35 to 221. The threshold T was defined in equation (1).

Figure 12:
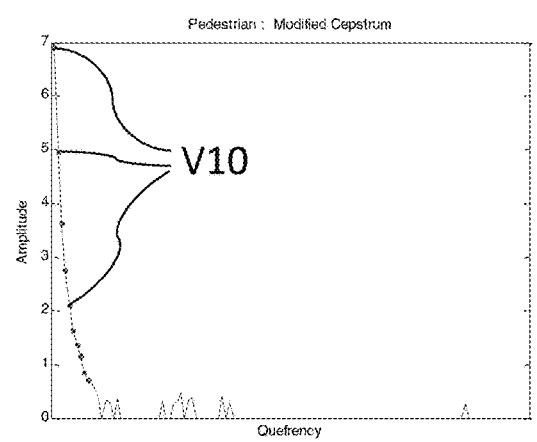
FIG. 12 depicts a typical first modified cepstrum, cep 1, for a pedestrian.

Pedestrian-Feature 5 (Width-Test in the Cepstrum):

FIG. 12 depicts a typical first modified cepstrum cep 1 for a pedestrian (128 values after the 25-analysis; see description of FIG. 2). If, ascending from the first quefrency value onwards, the first 10 (or more) cepstral values V10 are >0 (which means at least the cepstral values 1 . . . 10), then this feature is fulfilled. This behavior is caused by the pedestrian's own speed component.

Pedestrian-Feature 6:

Again, starting from the first modified cepstrum cep1, if there are no values which are higher than threshold T+0.5 dB for the cepstral values 20 to 128 (128 is the last cepstral value), this feature is met. The threshold T means the threshold defined in equation (1).

Pedestrian-Feature 7:

Again, consider the first modified cepstrum cep1 and including a simple averaging over three successive values. If this cepstrum, from the first value upwards, has at least 7 drops (successor s predecessor, i.e., a drop over at least 8 consecutive values), then this feature is fulfilled.

Pedestrian-Feature 8:

Again, consider the first modified spectrum spe1 including the 50-analysis and the spectral threshold T according to equation (1). If from the spectral values 1 . . . 30 and 226 . . . 256 at least 9 values are greater than a value defined by threshold value+0.5*(maximum value of spe1−threshold value), then this feature is fulfilled.

Pedestrian-Feature 9:

Consider the spectrum after 50-analysis and after triple averaging (e.g., three consecutive averaging steps over e.g., 3 neighboring values), which means the second modified spectrum spe1a, which is then again subjected to a further 50-analysis, resulting in the modified spectrum spe1b. This feature is fulfilled if for spe1b at least 30 values from the values 1 . . . 20 and 240 . . . 256 are higher than zero.

Pedestrian-Feature 10:

Consider the second modified cepstrum cep1$a$ (which means the cepstrum after 25-analysis and after 3-fold averaging according to the description for FIGS. 2, 3A, 3B). If this modified cepstrum cep1$a$, from 1 upwards, has at least 11 drops (successor s predecessor, which means a drop over at least 12 consecutive values), then the feature is fulfilled.

Pedestrian-Feature 11:

Consider the cepstrum cep. For the cepstral values 4 . . . 128 (128 is the last cepstral value) at most one value is higher than the CFAR threshold defined by:

$$CFAR - \text{threshold}(i) = \sum_{k=i-4}^{i+4} \frac{cep(k)}{9} + 0,3, \quad (2)$$

then this feature is fulfilled.

To these 11 pedestrian features are further added: 12 so-called "Identical" and "Negation" features, which depend on further object-specific features as defined below.

Pedestrian-Feature 12: Vehicle-Feature 8 is fulfilled;
Pedestrian-Feature 13: Vehicle 5 not fulfilled or
  Vehicle 6 not fulfilled or
  Vehicle 7 not fulfilled;
Pedestrian-Feature 14: Vehicle-Feature 3 not fulfilled or
  Vehicle-Feature 7 not fulfilled;
Pedestrian-Feature 15: Drone-Feature 1 is not fulfilled;
Pedestrian-Feature 16: Drone-Feature 3 is not fulfilled;
Pedestrian-Feature 17: Drone-Feature 5 is not fulfilled;
Pedestrian-Feature 18: Drone-Feature 8 is not fulfilled;
Pedestrian-Feature 19: Drone-Feature 4 not fulfilled or
  Drone-Feature 9 not fulfilled;
Pedestrian-Feature 20: Helicopter-Feature 2 not fulfilled or
  Helicopter-Feature 3 not fulfilled;
Pedestrian-Feature 21: Helicopter-Feature 5 is fulfilled;
Pedestrian-Feature 22: Helicopter-Feature 6 is fulfilled;
Pedestrian-Feature 23: Bird-Feature 5 not fulfilled or
  Bird 8 not fulfilled or
  Bird 9 not fulfilled;

There are further features for pedestrian relying on the tests as defined in Section B.

Pedestrian-Feature 1a: feature is fulfilled, if number_16≥22.3 and number_16≤4.3 and v≥2.
  v indicates how many of the three Pedestrian Features 4, 5, and 6 (i.e. 1, 2, or 3) are met.
Pedestrian-Feature 2a: feature is fulfilled, if number_15≥63.6 and number_15≤86.4 and v≥2.
  v is defined as in Pedestrian Feature 1a.
Pedestrian-Feature 3a: feature is fulfilled, if number_12=0.
Pedestrian-Feature 4a: feature is fulfilled, if number_10=100 or number_12=0.
Pedestrian-Feature 5a: feature is fulfilled, if number_4≤3 or [number_10=100 and number_12=0].
Pedestrian-Feature 6a: feature is fulfilled, if number_5≤14 and v≥2.
  v is defined as in Pedestrian Feature 1a.
Pedestrian-Feature 7a: feature is fulfilled, if [number_6≥8 and number_6≤23] or [anzahl_10=100 and anzahl_12=0].
Pedestrian-Feature 8a: feature is fulfilled, if [number_9≥4 and number_9≤11] or [number_10=100 and number_12=0].
Pedestrian-Feature 9a: feature is fulfilled, if cep_sort(5)>2.2 or spe_sort(50)<2.2.
Pedestrian-Feature 10a: feature is fulfilled, if vdfspey≥30 and vdfspey≤41.
Pedestrian-Feature 11a: feature is fulfilled, if number_77>0.25 or spe_sort(50)<2.2.
Pedestrian-Feature 12a: feature is fulfilled, if spe_sort(5)>31.5 or spe_sort(50)<2.2.
Pedestrian-Feature 13a: feature is fulfilled, if spe_sort(30)<3.5 or number_77>0.25.

In addition, there are further Identical- and Negation-Features for Drones relying on the tests as defined in Section B:

Pedestrian-Features 14a: Drone-Feature 1a is fulfilled.
Pedestrian-Features 15a: Drone-Feature 2a is not fulfilled or
  Drone-Feature 7a is not fulfilled.
Pedestrian-Features 16a: Drone-Feature 3a is not fulfilled or
  Drone-Feature 8a is not fulfilled.
Pedestrian-Features 17a: Drone-Feature 9a is fulfilled.
Pedestrian-Features 18a: Drone-Feature 2a is not fulfilled or
  Drone-Feature 5a is not fulfilled.
Pedestrian-Features 19a: Drone-Feature 4a is not fulfilled or
  Drone-Feature 13a is not fulfilled.
Pedestrian-Features 20a: Bird-Feature 2a is fulfilled.
Pedestrian-Features 21a: Bird-Feature 3a is fulfilled.
Pedestrian-Features 22a: Bird-Feature 6a is not fulfilled or Bird-Feature 9a is not fulfilled.
Pedestrian-Features 23a: Bird-Feature 7a is not fulfilled or Bird-Feature 12a is not fulfilled.
Pedestrian-Features 24a: Bird-Feature 6a is not fulfilled or Bird-Feature 10a is not fulfilled.
Pedestrian-Features 25a: Bird-Feature 8a is not fulfilled or Bird-Feature 12a is not fulfilled.
Pedestrian-Features 26a: Helicopter-Feature 9a is fulfilled.
Pedestrian-Features 27a: Helicopter-Feature 1a is not fulfilled.
Pedestrian-Features 28a: Helicopter-Feature 6a is not fulfilled.
Pedestrian-Features 29a: Helicopter-Feature 7a is not fulfilled.
Pedestrian-Features 30a: Helicopter-Feature 8a is not fulfilled.
Pedestrian-Features 31a: Helicopter-Feature 11a is not fulfilled or
  Helicopter-Feature 14a is not fulfilled.
Pedestrian-Features 32a: Helicopter-Feature 3a is not fulfilled or
  Helicopter-Feature 11a is not fulfilled.

C.2 Features for Drones:

Drone-Feature 1: Distance-Test (Maxima and Minima Coming from the Rotor Blades of the Drone)

Consider the first modified spectrum spe1 (meaning the spectrum spe after the 50-analysis see description for FIG. 2). Next, disregarding the regions of edges 1 . . . 3 and 254 . . . 256 of the exemplary 256-point spectrum files and determining the abscissa value xmax of the maximum spectral value Vmax (cp. FIG. 5B).

Figure 13:
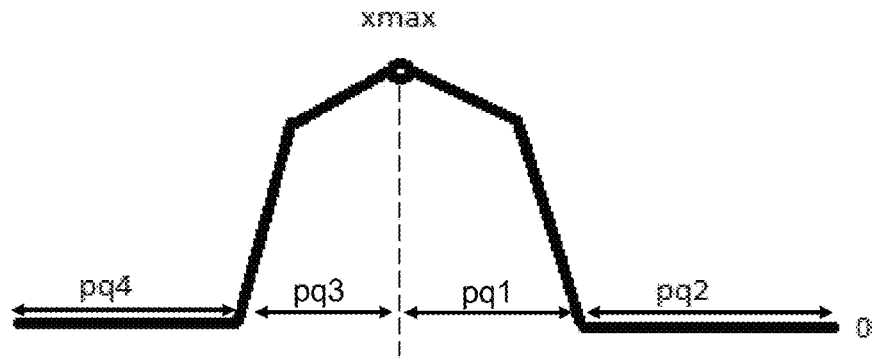
FIG. 13 illustrates definitions for numbers used for testing according to embodiments.

Referring to FIG. 13, a number of spe1-values >0 for abscissa-(x)-values >xmax is counted until a value is equal to zero. This number is called pq1. From the first value being equal to zero, the number of values=0 are counted until a value >0 occurs again. This number we define pq2.

Similarly, for the abscissa-(x)-values <xmax, the number of spe1-values >0 is counted until a value is equal to zero. This number is called pq3. From the first value being equal to zero, the number of values=0 is counted until a value >0 occurs again. This number is called pq4.

A drone flag can be assigned as follows. If:

$$\max(pq1, pq3) \leq 3 \text{ and } 2 \leq \min(pq2, pq4) \leq 15, \quad (3)$$

then: droflag=1, otherwise: droflag=0.

Next, the first modified spectrum spe1 is subject to a 7-fold averaging over 3 consecutive values each. The result is a further second modified spectrum spe2a. From spe2a, the abscissa value of the maximum spectral value is determined and called xmax2.

Next, the file uuux is defined based on spe2a by:

$$uuux = spe2a(xmax2 - 50 \ldots xmax2 - 50). \quad (4)$$

Thus, uuux may include 101 values, whereby the value 51 is representing the maximum spectral value Vmax. Next, the file ux is defined based on uuux, namely by setting all values to zero, which are not higher than uuux(51)/3 (i.e., keep all values that are higher than uuux(51)/3).

Next, it is examined whether the file ux for the values k=4, ..., 48 has high points HP (local maxima). If this is the case for one (or more) k, it is checked, whether there is also a local maximum on the other side of the spectral maximum at the same distance from this (abscissa value m=102−k). This condition is not only satisfied if at m is a local maximum, but it is sufficient if at m−2, m−1, m, m+1 or m+2 is a local maximum. If this is true, the value search is $$search = 1, \text{ otherwise: } search = 0. \quad (5)$$

If there are two associated local maxima of ux at k and m*, then the difference of the distances of the two high points to the spectral maximum at $x_m$=51 in the x-direction are calculated according to $$hpdix = \mathrm{abs}((m^* - 51) - (51 - k)). \quad (6)$$

Similarly, the difference of the two high points in the y-direction is calculated by:

$$hpdiy = \mathrm{abs}(ux(k) - ux(m^*)). \quad (7)$$

If now holds:

$$search = 1 \text{ and } \min(hpdix) \leq 2 \text{ and } \min(hpdiy) \leq 20,$$

then: the drone-feature 1 is fulfilled. It should be noted that "min" is to be seen as the minimum of all existing high-point-pairs.

Figure 14:
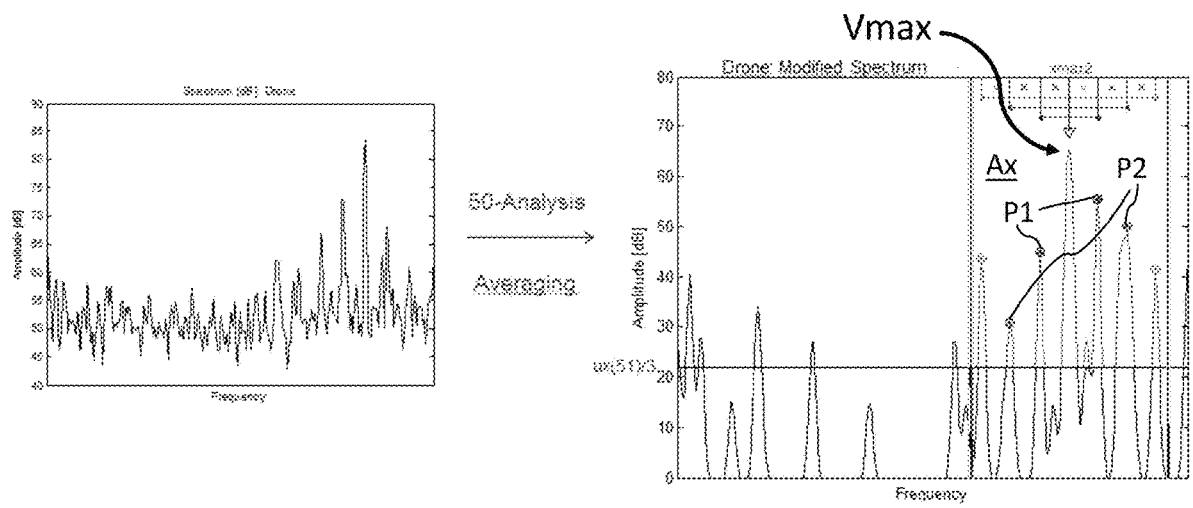
FIG. 14 illustrates an embodiment for a Drone Feature 1 (distance test), wherein the left-hand side shows the drone spectrum and the right-hand side the second modified spectrum spe2$a$.

FIG. 14 illustrates the drone feature 1 (distance test), wherein the left-hand side shows the drone spectrum the right-hand side the second modified spectrum spe2a (after the 50-analysis and the averaging). The area Ax includes the values of the file ux which is used for the actual study for the drone feature 1. The area Ax is limited to x-direction (xmax2−51, ..., xmax2+51) and y-direction (threshold ux (51)/3) for not to have too many maxima in the game. In this example, three maxima pairs P1, P2, P3 (high points being approximately a same distance away from the maximal value Vmax) are shown. Drone-Feature 8 (distance-Test 2):

If the drone feature 1 is not satisfied, the complete procedure of the drone feature 1 can be performed again, but for the determination of the abscissa value xmax for the spectral maximum Vmax of spe1 the edges 1 ... 3 and 254 ... 256 (of the 256 spectral values in total) are not left out as ground clutter, but are considered. The real spectral maximum can actually be at the edge. The further procedure remains the same, instead of using the flag "droflag" the flag "droflagrand" is used.

Drone-Feature 2 (Symmetry-Test)

As in drone feature 1, the file ux including 101 values with the center 51 (body, object), which are >0 or =0, is again used. For this test, the following steps may be performed:
1. count the relative maxima for ux (2 ... 100) and call this number "hopu";
2. count for ux (2 ... 101) how often a "sign change" from >0 to =0 or vice versa takes place and call this number "aw";
3. count for i=1, ..., 50, how often for ux(51−i) and ux(51+i) is on both sides at the same time >0 or =0 (symmetry) and call this number "ag".

The drone feature 2 is satisfied if it holds:

$$(aw \geq 6 \geq \text{ or } hopu \geq 3) \text{ and } ag \geq 25. \quad (8)$$

Figure 15:
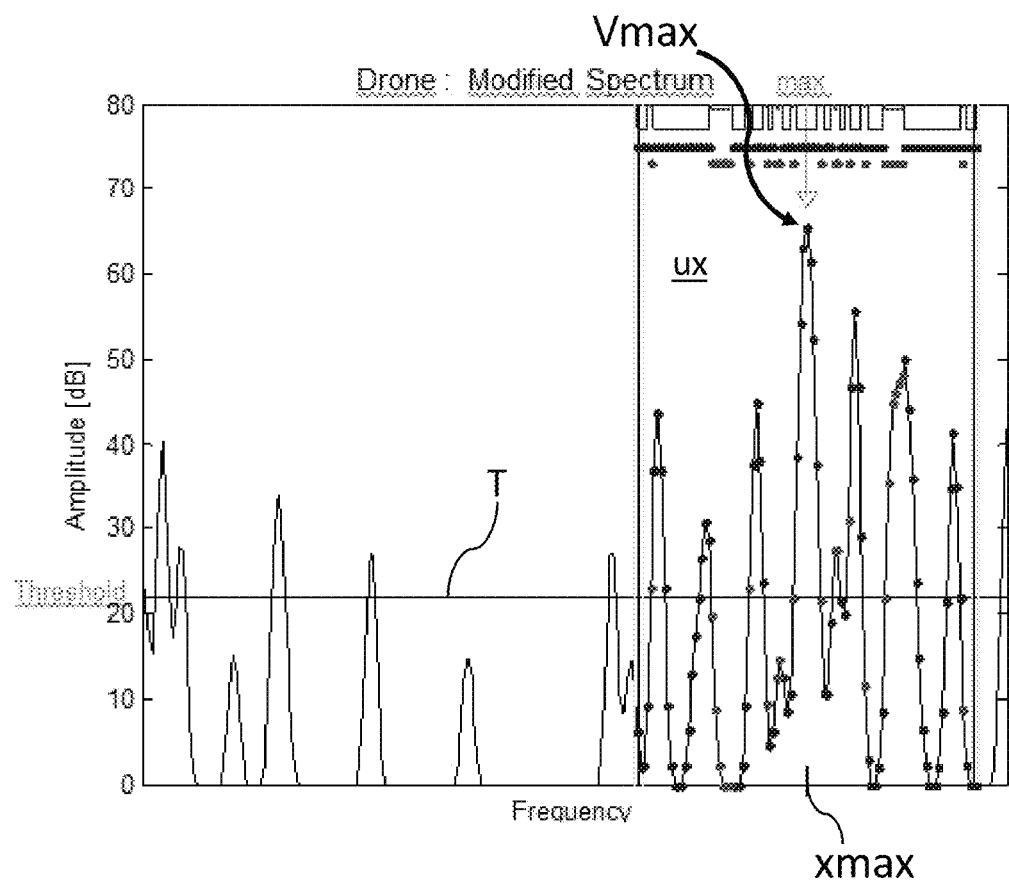
FIG. 15 illustrates an embodiment for a Drone Feature 2 in more detail.

FIG. 15 illustrates the drone feature 2 in more detail, wherein the file ux is located between the two vertical lines and the maximum spectral value Vmax is in the middle at ux(51)=ux(max). In addition, values smaller than threshold T=ux(51)/3 are set equal to zero (=0), otherwise they keep their value.

For the encircled values the symmetric is not fulfilled.

Drone Feature 3 (Anti-Pedestrian Test):

The positive answer to the 11 pedestrian questions/tests (no "identical" and "negation" features are taken into consideration here) yields a total of 100%. Add the answers of the 11 pedestrian questions/tests to the drone.

If the sum is <40%, the drone feature 3 is fulfilled.

Drone Feature 4 (Spectral Width Test 1):

Again, consider the first modified spectrum spe1, which means the spectrum after the 50-analysis. Ignoring the spectral edges 1 ... 3 and 254 ... 256, the abscissa value of the spectral maximum Vmax is determined and named xmax. Taking the Threshold T introduced with FIGS. 4A, 4B and starting from xmax (inclusive) to count the spectral values for higher and lower abscissa values that are higher than (spe1(xmax)+Threshold)/2 (i.e., above the average of the maximum and the threshold). The procedure aborts on each side, if a value occurs, which does not fulfill this requirement.

If the counted number s 4, then this feature is fulfilled.

Drone Feature 5 (Spectral Width Test 2):

Again, consider the first modified spectrum spe1. When looking to the left and right from the abscissa value xmax of the spectral maximum, at the latest the third value at least on one of the two directions is zero, this feature is fulfilled.

The edges ≤3 and ≥254 (if spe1 consists of 256 values) are considered only in one direction.

Drone Feature 6 (High Point—Distribution Density Function—Test):

Consider the spectrum (length 256) after 50-analysis and triple averaging according, which means the second modified spectrum spe1$a$. Next, the abscissa values (x-axis-values) of the local maxima (High Points=HP) are calculated, then the respective distances of successive High Points and finally the distribution density function (DDF; also known as histogram) of the distances of the High Points. In the DDF, the numbers of three successive digits (x−1, x, x+1) are added.

If the maximum of the "added up" DDF is ≥4 and the number of High Points is ≥10, then the Drone Feature 6 is fulfilled.

Drone Feature 7:

Consider the cepstrum cep including 128 values. For the cell under test i (for i=4 ... 125), the values i−3, i−2, i+2 and i+3 to "sum(i)" are added up. The CFAR threshold then results as $$cfar(i) = (sum(i)/4) + 0.25. \quad (9)$$

The number of exceedances of cfar by cep for i=4 ... 125 is called "anc".

For the 128 cepstral values, i=5 ... 104 is considered as cell under test. For the cell under test i, one goes to the right and left until the cepstral values are not getting smaller, but higher again (if cep(i) is a local minimum, one does not go to the right and left). For both sides the amount differences |cep (i)−smallest local cep value| is calculated. Then, the maximum of the two difference values is taken (if cep(i) is a local minimum, zero is taken) and the number of maximum difference values for i=5 ... 104, which are higher than 0.5, is called "as".

If as+anc≥10, the Drone Feature 7 is fulfilled.

Figure 16:
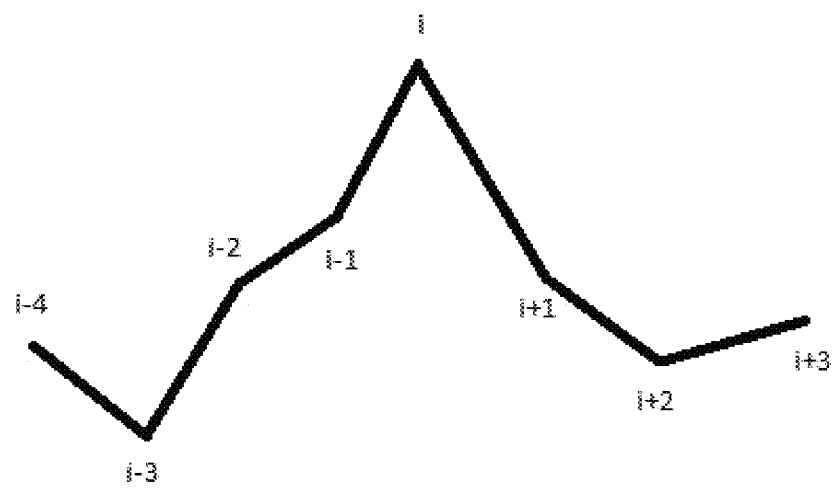
FIG. 16 illustrates an embodiment for a Drone Feature 7 in more detail.

FIG. 16 illustrate the Drone Feature 7, wherein for the cell under Test i, the values i−3 and i+2 are the local minimal cepstral values meaning the values are getting smaller until these values and thereafter higher again. The two local minima are thus cep(i+2) and cep(i−3). The maximum difference value is then |cep(i)−min[cep(i+2),cep(i−3)]|.

Drone Feature 9 (Dispersion Test; Dispersion15_40)

Consider the cepstral values 1 ... 128 and form the standard deviation of the values 15 ... 40. Dispersion s: for a random sampling x1, ... , xn is defined by $$s = \sqrt{\frac{1}{n}\sum_{i=1}^{n}(x_i - \bar{x})^2} \quad (10)$$

with the mean value $\bar{x}$.

If this value ≥0.175, Drone Feature 9 is fulfilled.

Figure 17:
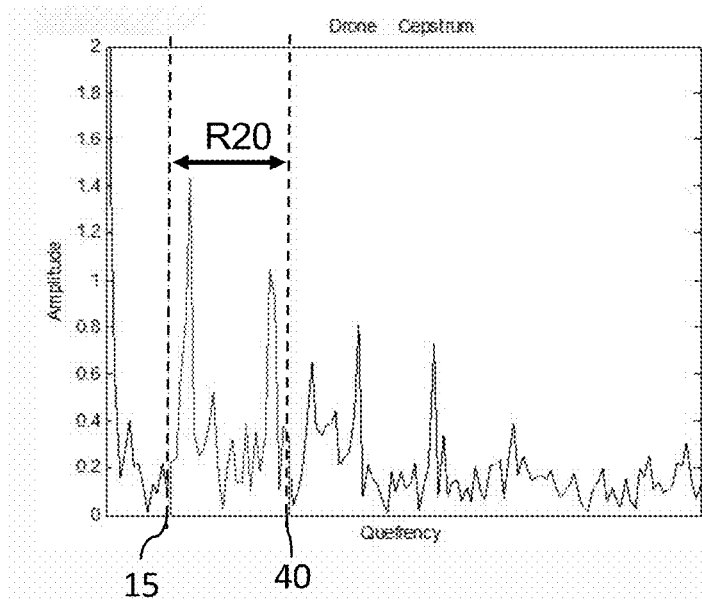
FIG. 17,18 illustrate an embodiment for a Drone Feature 9 and a comparable example for real data dispersion for drones.
Figure 18:
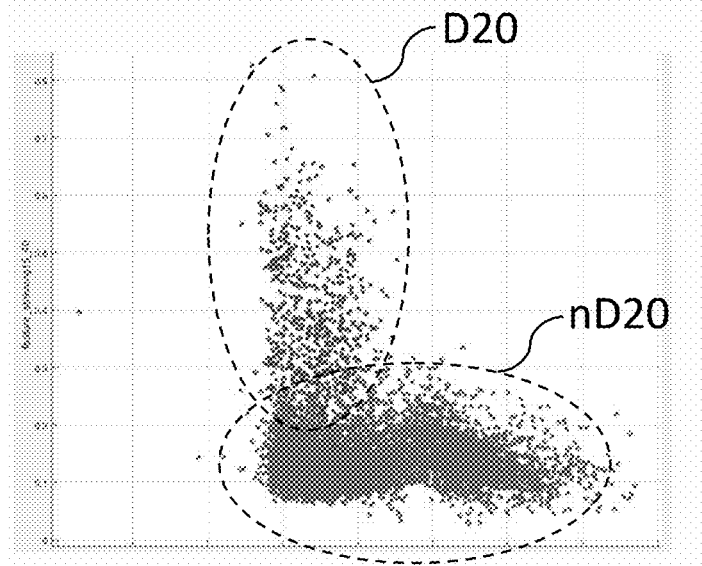

FIG. 17 and FIG. 18 illustrate the Drone Feature 9. FIG. 17 depicts a drone cepstrum. The dispersion is determined by the cepstral values in the region R20 bounded by border quefrencies 15 and 40 of the entire cepstrum file 1 ... 128. FIG. 18 provides a comparable example of real data dispersion for drones (region D20) and non-drones (region nD20).

Drone Features 1 and 8 (as a Combined Logic)

The following logic can be formed:

1: If only the Drone Feature 1 or 8 can be satisfied, then the Basic Drone Feature is fulfilled and a first flag is set to one (dro_gm=1).
2: If it holds: either droflag=1 or droflagrand=1, then the Drone Flag Condition is fulfilled and a second flag is set to one (dro_bed1=1).
3: If the Drone Feature 7 is met, then the Drone Cepstral Condition is met and a third flag is set to one (dro_bed2=1).

The combined logic becomes now: If $$dro\_gm = 1 \text{ and } (dro\_bed1 = 1 \text{ or } dro\_bed2 = 1), \quad (11)$$

the combined Drone Features 1/8 are fulfilled.

These 9 Drone Features are supplemented by 12 "Identical" and "Negation" Features:

Drone-Feature 10: Pedestrian-Feature 1 not fulfilled or Feature 11 not fulfilled.
Drone-Feature 11: Pedestrian-Feature 2 not fulfilled or Pedestrian-Feature 10 not fulfilled.
Drone-Feature 12: Pedestrian-Feature 5 not fulfilled or Feature 6 not fulfilled.
Drone-Feature 13: Pedestrian-Feature 8 is not fulfilled.
Drone-Feature 14: Pedestrian-Feature 9 is not fulfilled.
Drone-Feature 15: Vehicle-Feature 2 is fulfilled.
Drone-Feature 16: Vehicle-Feature 9 is fulfilled.
Drone-Feature 17: Vehicle-Feature 5 not fulfilled or Vehicle Feature 7 not fulfilled.
Drone-Feature 18: Vehicle-Feature 3 not fulfilled or Vehicle-Feature 4 not fulfilled or Vehicle-Feature 8 not fulfilled.
Drone-Feature 19: Helicopter-Feature 2 not fulfilled or Helicopter-Feature 3 not fulfilled or Helicopter-Feature 10 not fulfilled.
Drone-Feature 20: Bird-Feature 1 not fulfilled or Bird-Feature 7 not fulfilled or Bird-Feature 12 not fulfilled.
Drone-Feature 21: Helicopter-Feature 7 is fulfilled There are further features for Drones relying on the tests as defined in Section B:

Drone-Feature 1a: feature is fulfilled, if number_4≤5 or number_15>120.
Drone-Feature 2a: feature is fulfilled, if number_5≥10 or number_15>110.
Drone-Feature 3a: feature is fulfilled, if number_6≥3 and number_6≥6.
Drone-Feature 4a: feature is fulfilled, if number_7≤3 or number_16≥5.5.
Drone-Feature 5a: feature is fulfilled, if number_11≤4 or number_16≥5.5.
Drone-Feature 6a: feature is fulfilled, if number_15>100 or number_7≤3.
Drone-Feature 7a: feature is fulfilled, if number_15>84.
Drone-Feature 8a: feature is fulfilled, if number_16>4.2 or if it holds [number_15≥80 and number_7≤3].
Drone-Feature 9a: feature is fulfilled, if spe_sort(50)>2.0 and spe_sort(50)<7.1 (Test 17).
Drone-Feature 10a: feature is fulfilled, if spe_sort(30)>4.4 and spe_sort(30)<11.4 (Test 17).
Drone-Feature 11a: feature is fulfilled, if vdfspey≥22 and vdfspey≤40 (Test 19).
Drone-Feature 12a: feature is fulfilled, if nsdiff≥22 and nsdiff≤33 (Test 19).

Drone-Feature 13a: feature is fulfilled, if it holds [cep_sort(30)≥0.5 and cep_sort(30)≤0.67] and if it holds [cep_sort(50)≥0.34 and cep_sort(50)≤0.49](Test 18).

In addition, there are further Identical- and Negation-Features for Drones relying on the tests as defined in Section B:

Drone-Feature 14a: Pedestrian-Feature 1a is not fulfilled.
Drone-Feature 15a: Pedestrian-Feature 2a is not fulfilled.
Drone-Feature 16a: Pedestrian-Feature 3a is not fulfilled.
Drone-Feature 17a: Pedestrian-Feature 6a is not fulfilled.
Drone-Feature 18a: Pedestrian-Feature 7a is not fulfilled.
Drone-Feature 19a: Pedestrian 4a not fulfilled or Pedestrian 12a not fulfilled.
Drone-Feature 20a: Pedestrian 8a not fulfilled or Pedestrian 9a not fulfilled.
Drone-Feature 21a: Bird-Feature 10a is not fulfilled or Bird-Feature 13a is not fulfilled
Drone-Feature 22a: Bird-Feature 9a is not fulfilled or Bird-Feature 12a is not fulfilled
Drone-Feature 23a: Bird-Feature 5a is not fulfilled or Bird-Feature 11a is not fulfilled
Drone-Feature 24a: Bird-Feature 8a is fulfilled.
Drone-Feature 25a: Bird-Feature 1a is not fulfilled or Bird-Feature 7a is not fulfilled
Drone-Feature 26a: Bird-Feature 2a is not fulfilled or Bird-Feature 7a is not fulfilled
Drone-Feature 27a: Bird-Feature 3a is not fulfilled or Bird-Feature 7a is not fulfilled
Drone-Feature 28a: Helicopter-Feature 4a is fulfilled.
Drone-Feature 29a: Helicopter-Feature 6a is fulfilled.
Drone-Feature 30a: Helicopter-Feature 7a is fulfilled.
Drone-Feature 31a: Helicopter-Feature 8a is fulfilled.
Drone-Feature 32a: Helicopter-Feature 1a is not fulfilled or
Helicopter-Feature 2a is not fulfilled
Drone-Feature 33a: Helicopter-Feature 12a is not fulfilled or
Helicopter-Feature 14a is not fulfilled
Drone-Feature 34a: Helicopter-Feature 2a is not fulfilled or
Helicopter-Feature 3a is not fulfilled C.3 Features for Vehicles:

Vehicle-Feature 1 (Velocity-Test in the Spectrum):

Again, consider a spectrum including, for example, 256 samples. The spectral edges 1 . . . 3 and 254 . . . 256 may again not be taken into account (as possible ground clutter). For a vehicle, because of a typical vehicle speed, the position of the spectral maximum value should be ≤78 or ≥200.

Therefore, this feature is fulfilled if the maximal spectral value Vmax is at most at a frequency 78 or at least at the frequency 200 for the exemplary 256 sample spectrum (i.e., the first value is the lowest and the last value 256 is the highest frequency of the underlying spectral band). Usually, after an FFT, the spectral range will extend from frequency 0 to the sampling frequency fa. However, embodiments define the spectral range as follows:

| Frequency | 0 | fa/2 | −fa/2 | 0 |
|---|---|---|---|---|
| Abscissa number | 1 | 127 | 128 | 256. |

Because of this definition, the upper frequency range is taken into account for "lower" speeds. Hence, for less than 78 and greater than 200.

Vehicle-Features 2-5 (Sawtooth-Test in the Cepstrum; Coming from the Wheels of the Vehicle):

Consider a cepstrum, for example, of 128 samples and taking the second modified cepstrum cep1a, i.e. the cepstrum after 25-analysis and triple averaging. Then, the following steps are performed:

Determine, in the cepstral area 2 . . . 40, positions of the local high and low points;
Calculate the distances of successive high points and low points and the Distribution Density Function (DDF) for the distances of the highs and lows;
Add the DDF of the highs and the DDF of the lows;
Add, in this "new" DDF for the distances of highs and lows, the numbers of four successive digits (x−1, x, x+1, x+2) and call this modified DDF "ggg".

Vehicle Feature 2 (Test Number of High Points in the Cepstrum):

This feature is fulfilled, if there are at least three high points in the cepstral range 2 . . . 40 of cep1a.

Vehicle Feature 3 (Monotony-Test for High Points in the Cepstrum):

This feature is fulfilled, if there are at least three high points in the cepstral range 2 . . . 40 of cep1a and the cepstral values (cep1a) of these three high points are monotonically decreasing.

Vehicle Feature 4 (Distance-Test for High Points and Low Points in the Cepstrum):

This feature is fulfilled, if there are in the cepstral area 2 . . . 40 (samples in total 1 . . . 128) of the cep1a file, at least 3 high points and 3 low points occur. Thus, there are at least 2 distances of consecutively occurring high points and at least 2 distances of consecutively occurring low points. For this feature to be fulfilled, the two distances of the three high points and the two distances of the three low points differ by a maximum of 3.

Vehicle Feature 5:

This feature is fulfilled, if first the second modified cepstral file cep1a (cepstrum after 25-analysis and triple averaging) has at least 2 highs and 2 lows in the range 2 . . . 40. Next, adding for i=1 . . . 50 over all ggg(i) that are 24. If, in addition, the two high and low points exist and the added value is 28, then Vehicle Feature 5 is fulfilled.

Figure 19:
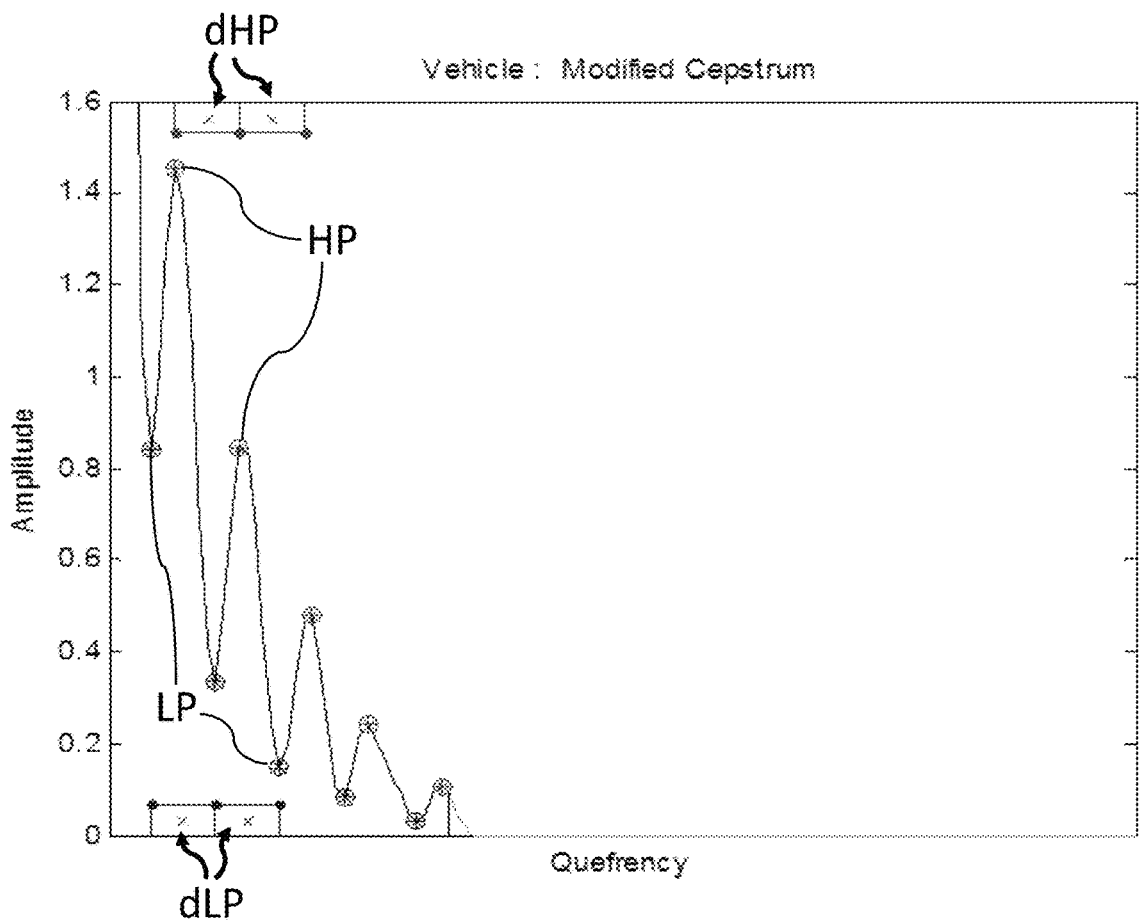
FIG. 19 shows an exemplary second modified cepstrum to illustrate an embodiment to identify Vehicle Features 2-4.

FIG. 19 shows an exemplary second modified cepstrum cep1a to illustrate the Vehicle Features 2-4. The local high points HP and the local low points LP are actually monotonically decreasing cepstral values with increasing quefrencies. In addition, the (almost) equal distances of successive high points dHP and the (almost) equal distances of successive low points dLP are indicated.

Vehicle Feature 6 (Monotony-Test II in the Cepstrum):

Starting from the cepstrum cep, the 4 maximum values (ma1, . . . , ma4) of the cepstral values and the 4 mean values (mi1, . . . , mi4) of the cepstral ranges 2 . . . 11, 12 . . . 21, 22 . . . 31 and 32 . . . 41 are calculated.

If ma1≥ma2≥ma3≥ma4 or mi1≥mi2≥mi3≥mi4, then the Vehicle Feature 6 is fulfilled.

Vehicle Feature 7:

This feature is a Double-Speed-Return (DSR)-Test in the Spectrum, coming from specific speed components of the moving vehicle. The DSR is a signal in the spectrum spe that occurs at twice the vehicle speed.

Again, the ground cutter with the values 1 . . . 3 and 254 . . . 256 of altogether 256 spectral values may not taken into consideration for this test. From the remaining spectral values 4 . . . 253, the position xmax of the spectral maximum Vmax is determined. In addition and to guarantee the feasibility of the subsequent calculation, two potential problematic cases for the spectral edges are avoided by setting:

$$xmax = 18, \text{ if } xmax \leq 18 \text{ and } xmax = 236, \text{ if } xmax \geq 236.$$

Next, two tests (Test A and Test B) are performed:
For Test A: three cases are distinguished for the spectrum spe:
1.) If 105<xmax<155, the DSR (located at second xmax) cannot be formed at the expected positions. Besides, these speeds are not provided for vehicles according to Vehicle Feature 1.
2.) If xmax≤105, it follows that DSR=second xmax.
3.) If xmax≥155, from this follows DSR=second xmax−256. Here, the DSR is considered for the upper (negative) Doppler range.

For the cases 2.) and 3.) [case 1.) does not occur], two averages (over 20 spectral values each) for the ranges DSR−30 . . . . DSR−11 and DSR+11 . . . DSR+30 (i.e., before and after the DSR) are calculated as well as a positive difference between the two averages. This difference is called "diff".

Figure 20:
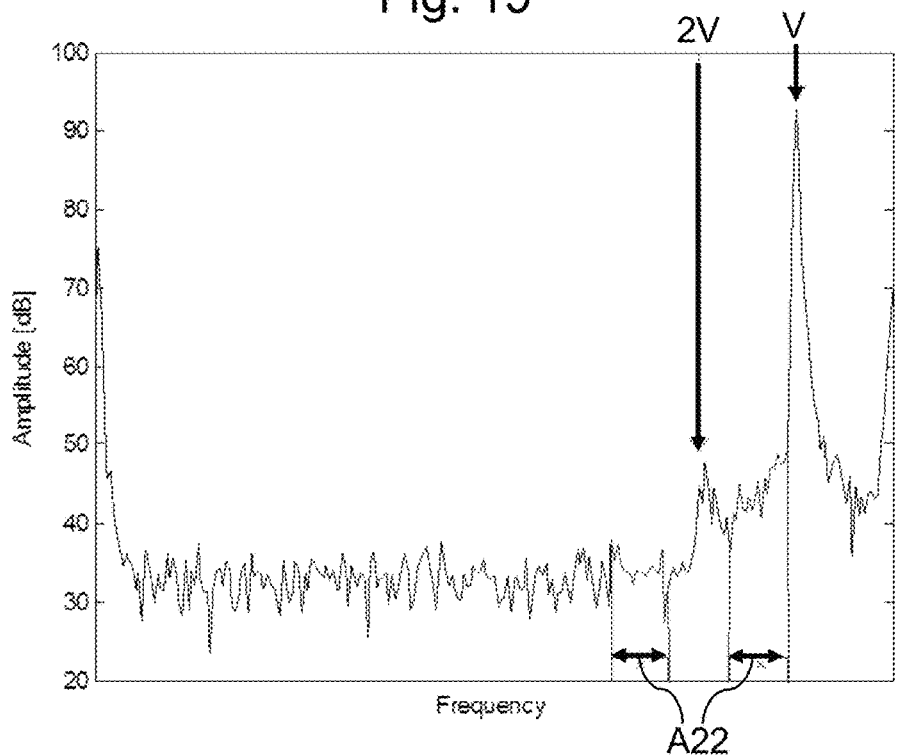
FIG. 20 illustrates an embodiment for Vehicle Feature 7.

FIG. 20 illustrates the Vehicle Feature 7 based on the DSR-Test and shows a typical spectrum of a vehicle, which due to its velocity V generates a Doppler shift that shows in the spectrum at a particular frequency. Hence, the velocity V of the vehicle gives rise to one (maximal) signal and a second, DSR-signal appears at a lower frequency corresponding to the doubled velocity 2V for the upper (negative) Doppler area. Moreover, two ranges A22 are marked, over which the averages are formed. It is apparent from FIG. 20 that the heights of the averaged value of the ranges A22 will differ. This effect shall be used in this test.

For Test B: Five cases will be distinguished for the first modified spectrum spe1 (spectrum spe after 50-analysis) or for the further second modified spectrum spe1b (spectrum after 50-analysis and triple averaging [=spe1a] and a further 50-analysis). This distinction is for the fact that, beyond the DSR, spe1 and/or spe1b is zero over a range of 30 to 50 values:
1.) If 100<xmax<160: The DSR cannot be formed at the expected positions. However, these speeds are not provided for vehicles according to Vehicle Feature 1. Hence, the following values are set: pik=1 and pik1=1.
2.) If 90<xmax≤100: For spe1 and spe1b all 30 values in the range DSR+11 . . . DSR+40 are equal to zero. Thus, it is set pik=0 and pik1=0.
3.) If max≤90: For spe1 and spe1b all 50 values in the range DSR+11 . . . DSR+60 are equal to zero. Thus, it is set pik=0 and pik1=0.
4.) If 160≤xmax<170: For spe1 and spe1b all 30 values in the range DSR−40 . . . DSR−11 are equal to zero. Thus, it is set: pik=0 and pik1=0.
5.) If xmax≥170: For spe1 and spe1b all 50 values in the range DSR−60 . . . DSR−11 are equal to zero. Thus, it is set pik=0 and pik1=0.

If now: diff>8 (Test A) or [pik=0 or pik1=0] (Test B), then Vehicle Feature 7 is fulfilled.

Vehicle Feature 8 (Spectral Collection Test):
Consider the first modified spectrum spe1, the margins 1 . . . 3 and 254 . . . 256 may again be disregarded as possible ground clutter and xmax can be calculated as the position of the spectral maximum of spe1.

Next, if xmax≥25 and xmax≤231, then for i=xmax−24 . . . xmax+25 (i.e. over 50 values around xmax) it is counted, how often the first modified spectrum spe1(i) (spectrum after 50-analysis) respectively spe1b(i) (spectrum after 50-analysis and triple averaging [=spe1a] and a further 50-analysis) are greater than zero. In other words, the values spe1(i)>0 and spe1b(i)>0 are counted. The counted numbers are called sum1 and sum2.

If xmax<25, the values spe1(i)>0 and spe1b(i)>0 are counted for i=1 . . . 50 and so sum1 and sum2 are determined.

If xmax>231, the values spe1(i)>0 and spe1b(i)>0 are counted for i=207 . . . 256 and so sum1 and sum2 are determined.

If max(sum1,sum2)≥18, then Vehicle Feature 8 is fulfilled.

Vehicle Feature 9 (Spectral Width- and "Block Length"-Test)

Consider the first modified spectrum spe1, a "Block Formation" in spe1 (spectrum after 50-analysis) is obtained by dividing spe1 into so-called "blocks". The first block starts with the first value of spe1 that is >0 and ends with the first value of spe1, which is >0 and which is followed by 5 values of spe1 that are =0. After the 5 values=0, a search for the next value of spe1 that is >0 takes place. This is then the beginning of the second block and so on. Each block is characterized by the position of the beginning, the end, and the number of spe1-values >0 inside the block.

The same "block formation" is performed for the other second modified spectrum spe1b (spectrum after 50-analysis, 3-times averaging and a further 50-analysis). Again, the margins 1 . . . 3 and 254 . . . 256 may be discarded as possible ground clutter and xmax is determined as the position of the spectral maximum of spe1.

Further, defining Th=(spe1(xmax)+Threshold)/2, where Threshold is the spectral threshold T introduced with FIG. 4A/4B. The values for which spe1(i)>Th are counted from the spectral maximum xmax (inclusive) to the left and to the right until a value ≤ Th occurs. This number is called wd.

If: wd≤4 or max(blanz,blanzx)≥23, then Vehicle Feature 9 is fulfilled, wherein "blanz" is the number of values >0 of the largest block of spe1 and "blanzx" is the number of values >0 of the largest block of spe1b.

These 9 Vehicle Features can now be supplemented by the following five "Negation"-Features:

Vehicle Feature 10: Pedestrian-Feature 1 not fulfilled or Pedestrian-Feature 9 not fulfilled.

Vehicle Feature 11: Pedestrian-Feature 2 not fulfilled or Pedestrian-Feature 8 not fulfilled.

Vehicle Feature 12: Drone-Feature 1 not fulfilled.

Vehicle Feature 13: Drone-Feature 8 not fulfilled.

Vehicle Feature 14: Helicopter-Feature 2 not fulfilled or Helicopter-Feature 3 not fulfilled There are further features for Vehicles relying on the tests as defined in Section B:

Vehicle-Feature 1a: The feature is fulfilled, if spe_sort(50)>6.7 or number_77<0.23.

Vehicle-Feature 2a: The feature is fulfilled, if spe_sort(50)<2.8 or number_77>0.21.

Vehicle-Feature 3a: The feature is fulfilled, if cep_sort(5)>1.7 or number_77<0.23.

Vehicle-Feature 4a: The feature is fulfilled, if cep_sort(5)<1.03 or number_77>0.21.

In addition, there are further Identical- and Negation-Features for Drones relying on the tests as defined in Section B:

Vehicle-Feature 5a: Pedestrian-Feature 5a is fulfilled or Pedestrian-Feature 13a is fulfilled.
Vehicle-Feature 6a: Either
  [Pedestrian-Feature 12a is not fulfilled or Pedestrian-Feature 8a is not fulfilled or Pedestrian-Feature 2a is not fulfilled] or the Pedestrian-Features 1a to 13a are all 13 fulfilled.
Vehicle-Feature 7a: Either [Pedestrian-Feature 4a is not fulfilled or Pedestrian-Feature 7a is not fulfilled] or the Pedestrian-Features 1a to 13a are all 13 fulfilled.
Vehicle-Feature 8a: Either [Pedestrian-Feature 3a is not fulfilled or Pedestrian-Feature 8a is not fulfilled] or the Pedestrian-Features 1a to 13a are all 13 fulfilled.
Vehicle-Feature 9a: Drone-Feature 1a is fulfilled.
Vehicle-Feature 10a: Drone-Feature 3a is not fulfilled or Drone-Feature 10a is not fulfilled.
Vehicle-Feature 11a: Drone-Feature 7a is not fulfilled or Drone-Feature 9a is not fulfilled.
Vehicle-Feature 12a: Drone-Feature 2a is not fulfilled or Drone-Feature 3a is not fulfilled.
Vehicle-Feature 13a: Drone-Feature 8a is not fulfilled or
  Drone-Feature 9a is not fulfilled or
  Drone-Feature 7a is not fulfilled.
Vehicle-Feature 14a: Drone-Feature 12a is not fulfilled or
  Drone-Feature 13a is not fulfilled or
  Drone-Feature 3a is not fulfilled.
Vehicle-Feature 15a: Bird-Feature 1a is fulfilled or Bird-Feature 8a is fulfilled.
Vehicle-Feature 16a: Either [Bird-Feature 12a is not fulfilled or Bird-Feature 5a is not fulfilled or Bird-Feature 13a is not fulfilled] or
  the Bird-Features 1a to 7a are all 7 fulfilled.
Vehicle-Feature 17a: Bird-Feature 6a is fulfilled or Bird-Feature 2a is fulfilled.
Vehicle-Feature 18a: Helicopter-Feature 9a is fulfilled.
Vehicle-Feature 19a: Helicopter-Feature 5a is fulfilled or Helicopter-Feature 6a is fulfilled.
Vehicle-Feature 20a: Helicopter-Feature 1a is not fulfilled or
  Helicopter-Feature 13a is not fulfilled or
  Helicopter-Feature 14a is not fulfilled.
Vehicle-Feature 21a: Helicopter-Feature 11a is not fulfilled or
  Helicopter-Feature 12a is not fulfilled or
  Helicopter-Feature 4a is not fulfilled.
Vehicle-Feature 22a: Either [Helicopter-Feature 1a is not fulfilled or Helicopter-Feature 10a is not fulfilled] or
  [Helicopter-Feature 12a is fulfilled and Helicopter-Feature 13a is fulfilled] or
  [Helicopter-Feature 12a is not fulfilled and Helicopter-Feature 13a is not fulfilled].

C.4 Features for Helicopters:

Helicopter-Feature 1:
Consider the first modified cepstrum cep1 after the 25-analysis.
Next, for the cepstral range 1 . . . 128 it is determined how often cep1 in the ranges 55 . . . 60, 60 . . . 70 and 70 . . . 80 is greater than zero and call these quefrencies c5560, c6070 and c7080. Then, it shall hold ccc=c5560+c6070+c7080.
Again, the edges 1 . . . 3 and 254 . . . 256 can be ignored for possible ground clutter and the position xmax of the spectral maximum of spe1 (i.e. the spectrum after the 50-analysis) is determined. Next, the file tesk=spe1(xmax−80 . . . xmax+80) is considered, i.e. a file with the values 1 . . . 161 with xmax at position 81.

For xmax<81, the values of xmax+80 downwards over xmax to 3, 2, 1 are used for the file tesk. Then, it is continued with the values 256, 255, 254, and so on.

For xmax>176, the values of xmax−80 upwards over xmax to 254, 255, 256 are used for tesk. Then, it continues with 1, 2, 3, and so on.

Therefore, for the "tesk"-consideration the spectral values 1 . . . 256 are used, and it is then started again if needed. It is counted how often "tesk" is greater than zero for the range 1 . . . 80 and this number is called "li_sum". Then, it is counted how often "tesk" is greater than zero for the range 82 . . . 161 and this number is called "re_sum". Finally, we define insg_sum=li_sum+re_sum.

Helicopter Feature 1 is satisfied if ccc>0 or max (li_sum, re_sum)≥24.

Helicopter-Feature 2:
Here, the same conditions and variables are applied as in Helicopter Feature 1. Helicopter Feature 2 is satisfied if $$\max(\text{li\_sum}, \text{re\_sum}) \geq 23 \text{ or insg\_sum} \geq 43.$$

Helicopter-Feature 3:
Consider the first modified spectrum spe1 after the 50-analysis.
For i=1 . . . 100 and for all k=1 . . . 256 spectral values are counted, if i−0.99<spe1(k)≤i−1+5. In other words: for i=1, the count determines for how many k=1 . . . 256 it holds 0<spe1(k)≤5. Similarly, for i=2, the count determines the number of k for which 1<spe1(k)≤6. If i=3, then the interval of interest is (2,7], and so on.

For i=1 . . . 100, a vector is created that represents these counted k-values. This vector is called "anzfue" [anzfue(i) with i=1 . . . 100]. Next, it is asked for rising I starting from i=1, up to which i it holds: anzfue(i)<10. This i-value is then called u10. Then, starting from i=100, it is asked for falling i, down to which i it holds: anzfue(i)<10. This i-value is then called o10.

Accordingly, starting from i=1, it is asked for rising i, up to which i it holds anzfue(i)<25. This i-value is then called u25. And from i=100, for falling i, it is asked, down to which i it holds anzfue(i)<25. This i-value is then called o25.

Finally, the differences d10=o10−u10 and d25=o25−u25 are defined.

If now: 6≤d10≤8 and 3≤d25≤4, then Helicopter Feature 3 is fulfilled.

Helicopter-Feature 4:
Consider the function "anzfue" from feature 3 and starting from k=1, the variable k is increased by 1, as long as anzfue(k)=0. Then k is further increased by 1 as long as anzfue(k)>0. Lastly, reach a $k_0$, where the function anzfue is zero (=0) again. This means, with $k_0$ the "first zero point" of the function"anzfue" is reached.

Helicopter Feature 4 is satisfied, if it holds: max(anzfue $(k_0$ . . . 100))≤2. In other words, after the "first zero" $k_0$, the function "anzfue" no longer reaches values that are >2.

Helicopter-Feature 5:
Consider the function "tesk" (see Helicopter Feature 1), which was derived from the spectrum after the 50-analysis, which means from spe1, and was given by tesk=spe1(xmax−80 . . . xmax+80), id est a file with the values 1 . . . 161 with xmax at 81. The value xmax was the maximum spectral value of the first modified spectrum spe1 in the spectral value range 4 . . . 253. The maximum value of tesk, tesk(81), is of course >0.

Next, the variable "bodyanz" shall indicate how many values of "tesk" are continuously around the value tesk(81) higher than zero (>0) (tesk(81) inclusive). The variable "groessernull" shall indicate how many consecutive values of tesk—considered consecutively the tesk-values 1 . . . 161—are uninterrupted in maximum length >0. The variable "gleichnull" shall indicate how many consecutive values of tesk are uninterrupted in maximum length=0.

Next, looking at the Distribution Density Function (DDF) of the function "tesk" and name it "vdfn". The maximum value of this DDF is defined with "vdfmax". Starting from p=1, the variable p of the tesk-DDF is increased by 1 as long as vdfn(p)=0. Then p is further increased by 1 as long as vdfn(p)>0. Lastly, we reach a $p_0$, where the function vdfn is zero (=0) again. This means, with $p_0$ the "first zero point" of the function "vdfn" is reached. The variable "vdfanzwerte" describes the total number of values of "vdfn", starting from this "first zero" $p_0$ up to the end of "vdfn". This means $$vdfanzerte = \sum_{i=p_O}^{100} vdfn(i) \quad (12)$$

Helicopter Feature 5 is then satisfied if:
vdfanzwerte≤8 or groessernull≥15 or bodyanz≥13.
Helicopter-Feature 6:
Consider the variables of Helicopter Feature 5. Then Helicopter Feature 6 is satisfied, if it holds:
vdfmax≥10 or gleichnull≥20.
Helicopter-Feature 7:
Consider the first five cepstral values 1 . . . 5, id est cep (1 . . . 5).
Helicopter-Feature 7 is satisfied, if the smallest of these five values is smaller than 1, i.e., min(cep(1 . . . 5))<1.

These 7 Helicopter Features are now supplemented by 8 "Identical" and "Negation"-Features:
Helicopter-Feature 8: Pedestrian-Feature 8 is not fulfilled
Helicopter-Feature 9: Pedestrian-Feature 9 is not fulfilled
Helicopter-Feature 10: Drone-Feature 1 is not fulfilled
Helicopter-Feature 11: Drone-Feature 8 is not fulfilled
Helicopter-Feature 12: Vehicle-Feature 2 is fulfilled
Helicopter-Feature 13: Vehicle-Feature 9 is fulfilled
Helicopter-Feature 14: Pedestrian-Feature 1 is not fulfilled or
Pedestrian-Feature 5 is not fulfilled
Helicopter-Feature 15: Pedestrian-Feature 2 is not fulfilled or
Pedestrian-Feature 7 is not fulfilled There are further features for Helicopters relying on the tests as defined in Section B:
Helicopter-Feature 1a: The feature is fulfilled, if number_12>0 and number_7=0.
Helicopter-Feature 2a: The feature is fulfilled, if number_16≥2.6 and number_16≤4.1.
Helicopter-Feature 3a: The feature is fulfilled, if number_7=0.
Helicopter-Feature 4a: The feature is fulfilled, if number_6≥3 and number_6≤8.
Helicopter-Feature 5a: The feature is fulfilled, if number_1≥number_2 and number_2≥number_3 and number_1≥221.
Helicopter-Feature 6a: The feature is fulfilled, if Pedestrian-Feature 3a is not fulfilled, which means number_12≠0.
Helicopter-Feature 7a: The feature is fulfilled, if Pedestrian-Feature 4a is not fulfilled or if Pedestrian-Feature 7a is not fulfilled.
Helicopter-Feature 8a: The feature is fulfilled, if Pedestrian-Feature 6a is not fulfilled or if Pedestrian-Feature 7a is not fulfilled.
Helicopter-Feature 9a: The feature is fulfilled, if Drone-Feature 2a is not fulfilled or if Drone-Feature 7a is not fulfilled or if Bird-Feature 5a is not fulfilled.
Helicopter-Feature 10a: The feature is fulfilled, if spe_sort(30)>3.1 and spe_sort(30)<6.2.
Helicopter-Feature 11a: The feature is fulfilled, if spe_sort(50)>2.1 and spe_sort(50)<4.3.
Helicopter-Feature 12a: The feature is fulfilled, if vdfspey≥24 and vdfspey≤33.
Helicopter-Feature 13a: The feature is fulfilled, if nsdiff≥20 and nsdiff≤27.
Helicopter-Feature 14a: The feature is fulfilled, if number_77>0.13 and number_77<0.20.

In addition, there are further Identical- and Negation-Features for Drones relying on the tests as defined in Section B:
Helicopter-Feature 15a: Pedestrian-Feature 3a is fulfilled.
Helicopter-Feature 16a: Pedestrian-Feature 6a is not fulfilled or
Pedestrian-Feature 9a is not fulfilled.
Helicopter-Feature 17a: Pedestrian-Feature 1a is not fulfilled or
Pedestrian-Feature 11a is not fulfilled.
Helicopter-Feature 18a: Pedestrian-Feature 2a is not fulfilled or
Pedestrian-Feature 12a is not fulfilled.
Helicopter-Feature 19a: Pedestrian-Feature 7a is not fulfilled or
Pedestrian-Feature 13a is not fulfilled.
Helicopter-Feature 20a: Pedestrian-Feature 7a is not fulfilled or
Pedestrian-Feature 10a is not fulfilled.
Helicopter-Feature 21a: Pedestrian-Feature 9a is not fulfilled or
Pedestrian-Feature 4a is not fulfilled.
Helicopter-Feature 22a: Drone-Feature 4a is fulfilled.
Helicopter-Feature 23a: Drone-Feature 6a is fulfilled.
Helicopter-Feature 24a: Drone-Feature 13a is not fulfilled.
Helicopter-Feature 25a: Drone-Feature 2a is not fulfilled or
Drone-Feature 7a is not fulfilled or
Drone-Feature 12a is not fulfilled or
Drone-Feature 3a is not fulfilled.
Helicopter-Feature 26a: Bird-Feature 1a is not fulfilled or
Bird-Features 1a, 2a und 3a are all three not fulfilled.
Helicopter-Feature 27a: Bird-Feature 3a is fulfilled or
Bird-Features 1a, 2a und 3a are all three not fulfilled.
Helicopter-Feature 28a: Either [Bird-Feature 9a is not fulfilled or Bird-Feature 11a is not fulfilled]
or the Bird-Features 1a to 13a are all 13 fulfilled.
Helicopter-Feature 29a: Either [Bird-Feature 10a is not fulfilled or
Bird-Feature 12a is not fulfilled] or
Bird-Features 1a to 13a are all 13 fulfilled.
Helicopter-Feature 30a: Either [Bird-Feature 5a is not fulfilled or
Bird-Feature 10a is not fulfilled] or
Bird-Features 1a to 13a are all 13 fulfilled.

C.5 Features for Birds:

For birds, there are 12 "Identical" and "Negation" Features.

Bird-Feature 1: Pedestrian-Feature 6 is fulfilled
Bird-Feature 2: Helicopter-Feature 6 is fulfilled
Bird-Feature 3: Vehicle-Feature 1 is fulfilled or Vehicle-Feature 2 is fulfilled
Bird-Feature 4: Vehicle-Feature 2 is fulfilled or Vehicle-Feature 9 is fulfilled
Bird-Feature 5: Pedestrian-Feature 1 is not fulfilled or Pedestrian-Feature 7 is not fulfilled
Bird-Feature 6: Helicopter-Feature 2 is not fulfilled or Helicopter-Feature 3 is not fulfilled
Bird-Feature 7: Drone-Feature 5 is not fulfilled or Drone-Feature 7 is not fulfilled
Bird-Feature 8: Vehicle-Feature 4 is not fulfilled or Vehicle-Feature 5 is not fulfilled or Vehicle-Feature 7 is not fulfilled
Bird-Feature 9: Pedestrian-Feature 8 is not fulfilled
Bird-Feature 10: Pedestrian-Feature 9 is not fulfilled
Bird-Feature 11: Drone-Feature 8 is not fulfilled
Bird-Feature 12: Drone-Feature 1 is not fulfilled There are further features for birds relying on the tests as defined in Section B:

Bird-Feature 1a: feature is fulfilled, if number_16≥2.2 and number_16≤4.1.
Bird-Feature 2a: feature is fulfilled, if number_15≥63 and number_15≤95.
Bird-Feature 3a: feature is fulfilled, if it holds [number_16≥2.2 and number_16≤4.1] or if it holds [number_15≥63 and number_15≤79].
Bird-Feature 4a: feature is fulfilled, if number_4≥1 and number_4≤9.
Bird-Feature 5a: feature is fulfilled, if number_5≥0 and number_5≤6.
Bird-Feature 6a: feature is fulfilled, if number_6≥4 and z≤1.
z is the minimum of z1 and z2. z1 indicates how many of the three pedestrian features 4, 5 and 6 (i.e. 1, 2 or 3) are met. z2 indicates how many of the three pedestrian features 1, 2 and 7 (ie 1, 2 or 3) are met.
Bird-Feature 7a: feature is fulfilled, if it holds [number_8≥2 und number_8≤8] and z≤1.
z, z1 und z2 are defined as in Bird-Feature 6a.
Bird-Feature 8a: feature is fulfilled, if [number_11≤9 or number_12≤11] and z≤1. z, z1 und z2 are defined as in Bird-Feature 6a.
Bird-Feature 9a: feature is fulfilled, if it holds spe_sort(30)>2.7 and spe_sort(30)<3.8 (see Test 17).
Bird-Feature 10a: feature is fulfilled, if it holds spe_sort(50)>1.8 and spe_sort(50)<2.5 (see Test 17).
Bird-Feature 11a: feature is fulfilled, if it holds vdfspey≥30 and vdfspey≤39 (see Test 19).
Bird-Feature 12a: feature is fulfilled, if it holds nsdiff 2:16 and nsdiff≤22 (see Test 19).
Bird-Feature 13a: feature is fulfilled, if it holds [breitcep7≥5 and breitcep7≤9] and [breitcep10≥2 and breitcep10≤7] (see Test 20).

In addition, there are further Identical- and Negation-Features for Birds relying on the tests as defined in Section B:

Bird-Feature 14a: Pedestrian-Feature 4a is not fulfilled or Pedestrian-Feature 5a is not fulfilled or Pedestrian-Feature 12a is not fulfilled.
Bird-Feature 15a: Pedestrian-Feature 7a is not fulfilled or Pedestrian-Feature 8a is not fulfilled.
Bird-Feature 16a: Pedestrian-Feature 10a is fulfilled.
Bird-Feature 17a: Drone-Feature 2a is not fulfilled.
Bird-Feature 18a: Drone-Feature 8a is not fulfilled.
Bird-Feature 19a: Drone-Feature 12a is not fulfilled or Drone-Feature 13a is not fulfilled.
Bird-Feature 20a: Drone-Feature 9a is fulfilled or Drone-Feature 13a is fulfilled.
Bird-Feature 21a: Drone-Feature 11a is fulfilled.
Bird-Feature 22a: Drone-Feature 3a is not fulfilled or Drone-Feature 7a is not fulfilled.
Bird-Feature 23a: Drone-Feature 5a is not fulfilled or Drone-Feature 10a is not fulfilled.
Bird-Feature 24a: Helicopter-Feature 5a not fulfilled.
Bird-Feature 25a: Helicopter-Feature 9a not fulfilled.
Bird-Feature 26a: Helicopter-Feature 13a is not fulfilled or Helicopter-Feature 14a is not fulfilled or Helicopter-Feature 6a is not fulfilled.
Bird-Feature 27a: Helicopter-Feature 1a is not fulfilled or Helicopter-Feature 2a is not fulfilled or Helicopter-Feature 8a is not fulfilled.
Bird-Feature 28a: Helicopter-Feature 10a is not fulfilled or Helicopter-Feature 12a is not fulfilled or Helicopter-Feature 3a is not fulfilled.

Figure 21:
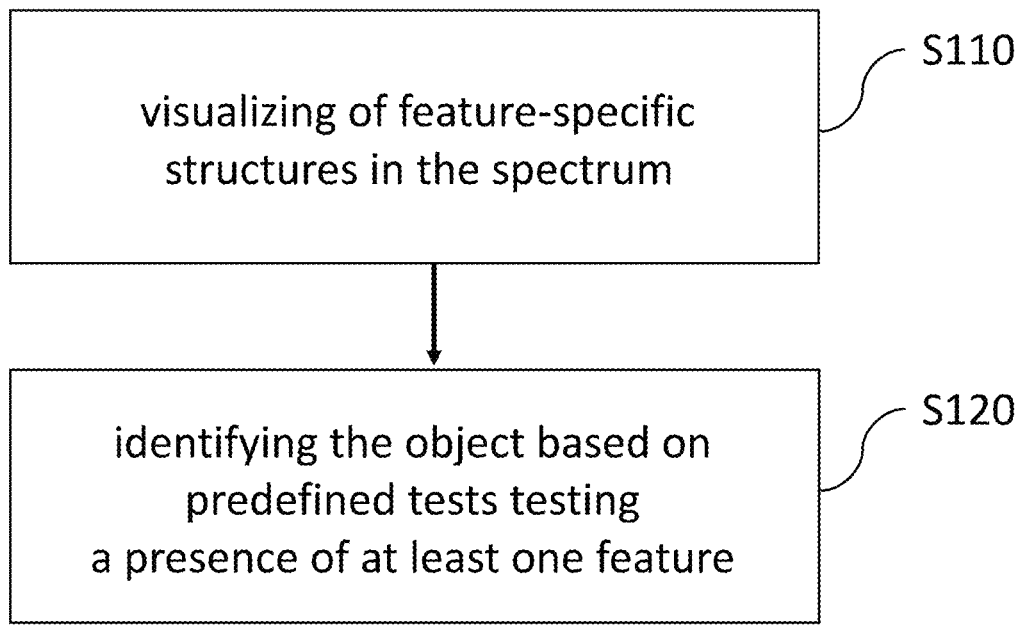
FIG. 21 depicts a schematic flow chart for a method for automatic identification of a drone according to an embodiment.

FIG. 21 shows a schematic flow chart for a method for automatic identification of an object (such as a helicopter, a vehicle, a bird, a drone, a pedestrian or other objects/targets) in radar signals based on features of spectral data of the radar signals, wherein the spectral data includes at least a spectrum, spe, as function of frequencies. The method comprises the steps of:

visualizing S110, by a visualization module 110, of feature-specific structures in the spectrum spe; and
identifying S120, by a classification module 120, the object based on predefined tests testing a presence of at least one feature and on an outcome of the visualization step S110.

The step of visualizing S110 may include one or more of the following steps:

generating a first modified spectrum, spe1, by keeping a predefined number (e.g., 50) of data points V1 with largest amplitude values in the spectrum spe, while setting all other amplitude values to a default value (or zero),
generating a second modified spectrum, spe1a, spe1b, spe2, by repeated averaging of consecutive amplitude values in the first modified spectrum spe1,
defining a threshold T based on a statistical upper limit for variations of the spectrum spe in a range dS spaced from a maximal value Vmax.

The predefined tests may by based on at least one of the following values:

a number_6 of data points around a maximum in the first modified spectrum spe1 that are all greater or equal to the threshold T [cp. test 5],
a number_15 given by a sum of differences, wherein, when the spectrum spe is split into multiple blocks, each difference is a difference between a maximum and a minimum of amplitude values within a respective block [cp. test 15],
a number_5 of crossings of the threshold T in the spectrum spe [see test 6],
a number_16 based on a standard deviation of data points of the spectrum spe while omitting data points that starting from maximal value Vmax are larger than the threshold T in an uninterrupted order [see test 16];

entries at one or more predetermined position(s) in an ordered statistic, wherein the data points of the spectrum spe are ordered in size [see test 17];

at least one difference, hpdix, hpdiy, of distances from high points HP in the second modified spectrum, spe2a, to its maximal value.

The order of steps may be different as long as the desired effect is achievable. In addition, any function of the apparatus described before can be implemented as further optional feature in the method.

The method may also be implemented in software on a computer program product. Therefore, embodiment relate also to a computer program having a program code for performing the method, when the computer program is executed on a processor.

D. Conclusions

Embodiments as described before provide a feature-based identification of target types such as pedestrian, vehicle, drone, helicopter and bird. It is understood that the number of features can be steadily expanded for each of these target types. In addition, embodiments may also identify other types of targets (air targets such as gliders, airplanes and jet and water targets such as swimmers, rowboats and motorboats, but also a split into wheeled and tracked vehicles). Thereby the reliability of the algorithm is successively increased further by having more and more features.

For each target type the extracted features were converted into questions. In optimum case, the classification algorithm will answer all questions positive for the current target type. And it will decide the questions negative for preferably all other target types.

According to embodiments, the evaluation for the identification of the objects can go as follows. For x questions asked for a target type, each positive answer will be charged with 100/x % so that, in the best-case scenario, 100% can be achieved for the given target type. Of course, a different weighting of the questions than the equal weighting is conceivable, almost obligatory. The target type that achieves the most percentage points based on the feature questions is the actual target type. If two or even more target types come to a similar high percentage, the true target type cannot be determined with certainty. It may then be decided on "Unknown".

According to further embodiments the presented method may be combined with classification models and their learning and training styles (techniques such as Classification Tree Method, K-Nearest-Neighbor-Algorithm, Support Vector Machine, Ensemble Learning and Discriminant Analysis, etc.). This may further increase the reliability of the method.

The classification obtained by embodiments is further stabilized in the subsequent tracking and may be compared with the kinematics of the target. This further increases the probability of a correct classification.

Embodiments relate, in particular to the detection of drones. It should be noted that the algorithm with its drone features is not just designed for any type of drone, but can detect as wide as possible all types of drones.

Especially by the possibility of being able to supplement the algorithm at any time by further features and also further target types without great effort, one sees, which enormous potential for the classification is already today and also for the future in the present procedure.

Embodiments provide high quality results which are at least partly due to the fact, that method does not rely on simulated data for the target types (i.e., the spectrum and/or cepstrum), but really recorded data (I/Q signals)—actually as many as possible. The spectrum and cepstrum are formed from each of these many data.

The comparative examples (cp. FIG. 5A, 5B) show the achieved advantages or, in other words, it becomes apparent why the tests work so well. In contrast hereto, it is mostly understandable why conventional methods produce less reliable results, because they are largely black boxes due to the learning algorithms.

Embodiments have major advantages over the conventional learning algorithms. Usual learning and training algorithms use all measuring points and try to identify patterns in them. This pattern recognition is based on a weighting and summation of the individual measuring points with subsequent comparison to an existing class. However, it is not possible for these algorithms to divide the measuring points into different sections or classes. The learning algorithms use relatively little a priori information. They work on a statistical basis, whereby only the measured values are learned. As a consequence, the learning algorithms need significant resources.

In contrast to the conventional learning algorithms, the classification algorithm that according to embodiments is based on feature extraction uses many complex strategies to create features. Ideas and aspects from different sources are used. The spectrum and the cepstrum are used. The measuring points can be divided into sections and these can be examined separately. Information about physical properties is used to determine the characteristics. As a consequence, the novel classification algorithm is characterized by a high degree of flexibility due to the large number of features. This is what ultimately makes the algorithm so successful.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e., a particular feature descripted in one embodiment may also be realized in other embodiments. Such combinations are covered by the disclosure herein unless it is stated that a specific combination is not intended.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

HP,LP high/low points (local extrema) in (modified) spectrum/cepstrum dHP, dLP distances of high or low points Vmax maximal value in spectrum/cepstrum (global maximum)

xmax frequency(quefrency) of global maximal in spectrum/cepstrum
V1 set of largest spectral/cepstral values of the spectrum/cepstrum
T threshold(s)
dS range for determining the threshold(s)
spe: the spectrum (also called "lin")
cep: the cepstrum derived from the spectrum
spe1: the first modified spectrum (spe after the 50-analysis)
cep1: the first modified cepstrum (cep after the 25-analysis)
spe1a: second modified spectrum (after 50-analysis and 3 times averaging)
cep1a: second modified cepstrum (after 25-analysis und 3 times averaging)
spe1b: another second modified spectrum (spe1a plus a further 50-analysis)
cep1b: another second modified cepstrum (cep1a plus a further 25-analysis)
spe2a: a further second modified spectrum (after 50-analysis and 7 times averaging)
R14 values near the lower/upper boundary (in spectrum/cepstrum)
R20 set of "internal" values in cepstrum (e.g. $15^{th}$-$40^{th}$) that are spaced from the lower boundary
V10 set of first in cepstrum (e.g. first 10)
pq1, pq2, . . . count number of frequencies/quefrencies
P1, P2, . . . pairs of high points around the maximal value
D20, nD20 data distribution for drones/non-drones
v, 2v maximum in spectrum correlated to velocity, double velocity
A22 neighboring spectral ranges of "2v maximum"

The invention claimed is:

1. An apparatus for automatic identification of a bird in radar signals, the apparatus comprising:
    a processor executing a visualization module (110) and a classification module (120),
    the visualization module (110) being configured to receive spectral data of the radar signals, the spectral data including a spectrum (spe) as function of frequencies and a cepstrum (cep) as function of quefrencies, and configured to visualize structures in the spectrum (spe) corresponding to bird-features by
        generating a first modified spectrum (spe1) by keeping a predefined number (number_50) of data points (V1) with largest amplitude values in the spectrum (spe), while setting all other amplitude values to a default value,
        generating a second modified spectrum (spe1a, spe1b, spe2) by repeated averaging of consecutive amplitude values in the first modified spectrum (spe1), and
        defining a threshold (T) based on a statistical upper limit for variations of the spectrum (spe) in a range (dS) spaced from a maximal value (Vmax); and
    the classification module (120) being configured to identify the bird based on at least in part on a result produced by the visualization module (110), by testing for presence of more than 35 bird-features, wherein the testing for the presence of the more than 35 bird-features comprises determining
        a number_6 of data points on one or both sides of a maximum in the first modified spectrum (spe1) that are all greater or equal to the threshold (T) or all greater than the default value,
        a number_7 of data points at least one spectral edge in the first modified spectrum (spe1) that are all greater or equal to the threshold (T) or all greater than the default value,
        a number_15 given by a sum of differences, wherein, when the spectrum (spe) is split into multiple blocks, each difference is a difference between a maximum and a minimum of amplitude values within a respective block,
        a number_5 of crossings of the threshold (T) in the spectrum (spe),
        a number_16 based on a standard deviation of data points of the spectrum (spe) while omitting data points that, starting from maximal value (Vmax), are larger than the threshold (T) in an uninterrupted order,
        entries (sort_30, sort_50) at one or more predetermined positions (30th, 50th) in an ordered statistic, wherein the data points of the spectrum (spe) are ordered in size,
        the number_16 is at least 2.2 and at most 4.1, which defines a first bird-feature,
        the number 15 is at least 63 and at most 95, which defines a second bird-feature,
        the number_5 is at least zero and at most 6, which defines a third bird-feature,
        a number_4 is at least 1 and at most 9, wherein the number 4 is the number of spectral values in the range (dS) used to define the threshold (T), which defines a fourth bird-feature,
        wherein the classification module (120) is further configured to identify the bird if the following drone-features is not satisfied
        the number 5 is at least 10 or the number 15 is at least 110, which defines a first drone-feature,
        wherein, for a number of samples that differ from 256 samples, parameters are adjusted accordingly.

2. The apparatus according to claim 1, wherein the testing for the presence of the more than 35 bird-features further comprises determining:
    the number_15 is at least 63 and at most 79, which defines a fifth bird-feature,
    an entry (sort_30) at position 30 of the ordered statistic is greater than 2.7 and less than 3.8, which defines a sixth bird-feature, and
    an entry (sort_50) at position 50 of the ordered statistic is greater than 1.8 and less than 2.5, which defines a seventh bird-feature.

3. The apparatus according to claim 1, wherein the classification module (120) is further configured to identify the bird if at least one of the following drone-features is not satisfied:
    the number_16 is at least 4.2 or the following is satisfied: number_15 is at least 80 and number_7 is at most 3, which defines a second drone-feature,
    the number 6 is at least 3 and at most 6, which defines a drone-feature 3a, or number_15 is smaller than 84, which defines a third drone-feature, and
    a number 11 is at most 4 or the number_16 is at least 5.5, the number_11 counting data points at both spectral edges in the first modified spectrum (spe1) that are all greater than the default value, which defines a fourth drone-feature, or
    an entry (sort_30) at position 30 of the ordered statistic is greater than 4.4 and less than 11.4, which defines a fifth drone-feature.

4. A method for automatically identifying a drone in radar signals, the method comprising:
  receiving, by a processor, spectral data of the radar signals, the spectral data including a spectrum (spe) as function of frequencies and a cepstrum (cep) as function of quefrencies;
  visualizing, by the processor, structures in the spectrum (spe) corresponding to drone-features by
    generating a first modified spectrum (spe1) by keeping a predefined number (number_50) of data points (V1) with largest amplitude values in the spectrum (spe), while setting all other amplitude values to a default value,
    generating a second modified spectrum (spela, spe1$b$, spe2) by repeated averaging of consecutive amplitude values in the first modified spectrum (spe1), and
    defining a threshold (T) based on a statistical upper limit for variations of the spectrum (spe) in a range (dS) spaced from a maximal value (Vmax);
  identifying, by the processor, the drone based on at least in part on a result produced by the visualization module (110), by testing for presence of more than 35 drone-features, wherein the testing for the presence of the more than 35 drone-features comprises determining
    a number_6 of data points around a maximum in the first modified spectrum (spe1) that are all greater or equal to the threshold (T) or all greater than the default value,
    a number_15 given by a sum of differences, wherein, when the spectrum (spe) is split into multiple blocks, each difference is a difference between a maximum and a minimum of amplitude values within a respective block,
    a number_5 of crossings of the threshold (T) in the spectrum (spe),
    a number_16 based on a standard deviation of data points of the spectrum (spe) while omitting data points that starting from maximal value (Vmax) are larger than the threshold (T) in an uninterrupted order;
    entries at one or more predetermined position(s) in an ordered statistic, wherein the data points of the spectrum (spe) are ordered in size;
    at least one difference (hpdix, hpdiy) of distances from high points (HP) in the second modified spectrum (spe2$a$) to its maximal value,
  wherein the processor identifies the drone if the following drone-features are satisfied
    the number_5 is at least 10 or the number_15 is more than 110 defining a first drone-feature,
    the number_6 is at least 3 and at most 6 defining a second drone-feature,
    the number_15 is greater than 84 defining a third drone-feature,
    when considering the first modified spectrum (spe1), at least a third spectral value in one or both directions from the maximal spectral value (Vmax) is the default value,
    if the spectral data further includes a cepstrum (cep) as function of quefrencies, a standard deviation is at least 0.175, where the standard deviation is calculated for quefrencies in the cepstrum (cep) while omitting the first 11% and last 68% of quefrencies,
  and the following features are not satisfied:
    if from spectral values 1 . . . 30 and 226 . . . 256 at least 9 values are greater than a value defined by: a value of the threshold (T)+0.5 * (maximum value of the first modified spectrum (spe1)-the value of the threshold (T)),
    if for the second modified spectrum (spe1$b$) at least 30 values from the values 1 . . . 20 and 240 . . . 256 are higher than zero,
  wherein for a number of samples that differs from 256 samples parameters are adjusted accordingly.

5. A method for automatically identifying a helicopter in radar signals, the method comprising:
  receiving, by a processor, receive spectral data of the radar signals, the spectral data including a cepstrum (cep) as function of quefrencies and a spectrum (spe) as function of frequencies, the spectrum including a power of two samples, and the cepstrum (cep) includes another power of two samples;
  visualizing, by the processor, structures in the spectrum (spe) corresponding to helicopter-features by
    (a) generating a first modified cepstrum (cep1) by keeping a predefined number (number_25) of data points (V1) with largest amplitude values in the cepstrum (cep), while setting all other amplitude values to a default value,
    (b) determining how often cepstral values in the first modified cepstrum (cpe1) are greater than zero between the 55th and 60th cepstral values and between the 60th and 70th cepstral values and between the 70th and 80th cepstral values and adding up resulting values to a sum-value (ccc),
    (c) ignoring first three samples and last three samples of the spectrum (spe) as ground clutter,
    (d) generating a first modified spectrum (spe1) by keeping a predefined number (number_50) of data points (V1) with largest amplitude values in the spectrum (spe), while setting all other amplitude values to a default value,
    (e) determining a maximum (Vmax) of the first modified spectrum (spe1) at a frequency (xmax) and building a tesk-function by 161 spectral values, whose frequencies are closest to the frequency (xmax) of the maximum (Vmax) when ordered in a circular buffer, wherein the tesk-function is defined as a file of spectral values;
  wherein the processor identifies the helicopter if the following helicopter-features are satisfied
    the sum-value (ccc) is greater than zero,
    a maximum of a first sum (li_sum) and a second sum (re_sum) is at least 24, if the first sum (li_sum) is defined by a sum over the first 80 values of the tesk-function and second sum (re_sum) is defined by a sum over the last 80 values of the tesk-function defining a helicopter-feature-1,
    the maximum of the first sum (li_sum) and the second sum (re_sum) is at least 23,
    a sum of the first sum (li_sum) and the second sum (re_sum) is at least 43 defining a helicopter-feature-2,
    a minimum of the first 4% of cepstral values of the cepstrum (cep) is smaller than 1,
    if a number_12 is not zero and is defined as a number of spectral values of the first modified spectrum (spe1) that are greater than the threshold (T) in a range that is outside the first 16% and the last 16% of values in the first modified spectrum (spe1),
  and the following features are not satisfied:
    from spectral values 1 . . . 30 and 226 . . . 256 at least 9 values are greater than a value defined by: a value of the threshold (T)+0.5 * (maximum value of the first modified spectrum (spe1)-the value of the threshold (T)),
for a second modified spectrum (spe1b) at least 30 values from the values 1 . . . 20 and 240 . . . 256 are higher than zero,
wherein for a number of samples that differs from 256 samples parameters are adjusted accordingly, and wherein a number of tested features is more than 35.

* * * * *